United States Patent
Lemay et al.

(10) Patent No.: US 11,875,013 B2
(45) Date of Patent: Jan. 16, 2024

(54) DEVICES, METHODS, AND GRAPHICAL USER INTERFACES FOR DISPLAYING APPLICATIONS IN THREE-DIMENSIONAL ENVIRONMENTS

(71) Applicant: Apple Inc., Cupertino, CA (US)

(72) Inventors: Stephen O. Lemay, Palo Alto, CA (US); Gregg S. Suzuki, Daly City, CA (US); Matthew J. Sundstrom, Campbell, CA (US); Jonathan Ive, San Francisco, CA (US); Robert T. Tilton, Los Angeles, CA (US); Jeffrey M. Faulkner, San Francisco, CA (US); Jonathan R. Dascola, San Francisco, CA (US); William A. Sorrentino, III, Mill Valley, CA (US); Kristi E. S. Bauerly, Los Gatos, CA (US); Giancarlo Yerkes, San Carlos, CA (US); Peter D. Anton, Portola Valley, CA (US)

(73) Assignee: APPLE INC., Cupertino, CA (US)

( * ) Notice: Subject to any disclaimer, the term of this patent is extended or adjusted under 35 U.S.C. 154(b) by 47 days.

(21) Appl. No.: 17/118,487

(22) Filed: Dec. 10, 2020

(65) Prior Publication Data

US 2021/0191600 A1    Jun. 24, 2021

Related U.S. Application Data

(60) Provisional application No. 62/953,125, filed on Dec. 23, 2019.

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/013* (2013.01); *G06F 3/017* (2013.01);
(Continued)

(58) Field of Classification Search
None
See application file for complete search history.

(56) References Cited

U.S. PATENT DOCUMENTS 10,353,532 B1 *  7/2019  Holz .................... G06F 3/04815
10,754,418 B1 *  8/2020  Ruppert .................... G06T 7/70
(Continued)

FOREIGN PATENT DOCUMENTS

EP        2 423 795 A2      2/2012

OTHER PUBLICATIONS

International Search Report and Written Opinion, dated May 11, 2021, received in International Application No. PCT/US2020/064613, which corresponds with U.S. Appl. No. 17/118,487, 18 pages.

*Primary Examiner* — Stella Higgs
(74) *Attorney, Agent, or Firm* — Morgan, Lewis & Bockius LLP

(57) ABSTRACT

A computer system detects a wrist. In accordance with a determination that first criteria that require an inner side of the wrist facing toward a viewpoint are met, the computer system displays a first user interface object including a plurality of representations of different applications at a first position corresponding to a first location on the wrist. While displaying the first user interface object, the computer system detects that the wrist's position or orientation has changed to satisfying second criteria that requires an outer side of the wrist facing toward the viewpoint. In response, the computer system switches from displaying the first user interface object at the first position to displaying a second (Continued)

(A)

(B)

user interface object including a plurality of controls for controlling functions at a second position corresponding to a location on a back of a hand attached to the wrist.

39 Claims, 17 Drawing Sheets

(51) Int. Cl.
*G06F 3/04845* (2022.01)
*G06F 3/04883* (2022.01)
*G06F 3/0485* (2022.01)
*G06F 3/041* (2006.01)

(52) U.S. Cl.
CPC ........ *G06F 3/0485* (2013.01); *G06F 3/04845* (2013.01); *G06F 3/04883* (2013.01); *G06F 3/041* (2013.01)

(56) References Cited

U.S. PATENT DOCUMENTS

| | | | |
|---|---|---|---|
| 11,003,307 B1* | 5/2021 | Ravasz | G06F 3/0482 |
| 2012/0113223 A1 | 5/2012 | Kim et al. | |
| 2012/0117514 A1 | 5/2012 | Hilliges et al. | |
| 2015/0309264 A1* | 10/2015 | Abovitz | G02B 6/32 |
| | | | 385/33 |
| 2017/0090747 A1* | 3/2017 | Dash | G06F 1/163 |
| 2018/0053337 A1 | 2/2018 | Nakashima et al. | |
| 2019/0377464 A1* | 12/2019 | Zhou | G06F 3/0482 |
| 2020/0202121 A1* | 6/2020 | Konin | G06F 3/0219 |

* cited by examiner

8000

At a computer system including a display generation component and one or more input devices:

8002
Detecting a wrist at a location that corresponds to a respective position within a view of a three-dimensional environment that is provided via the display generation component without displaying representations of applications at the respective position within the view of the respective three-dimensional environment that corresponds to the location of the wrist.

8004
While detecting the wrist at the location that corresponds to the respective position within the view of the three-dimensional environment that is provided via the display generation component:

8006
In accordance with a determination that first criteria are met by a navigational state of the wrist, displaying, via the display generation component, a plurality of representations corresponding to different applications in a first region within the view of the three-dimensional environment provided via the display generation component, including displaying a first representation corresponding to a first application at a first position within the view of the three-dimensional environment that corresponds to a first portion of the wrist, and a second representation corresponding to a second application at a second position within the view of the three-dimensional environment that corresponds to a second portion of the wrist.

8008
While displaying the plurality of representations corresponding to different applications in the first region within the view of the three-dimensional environment provided via the display generation component, detecting a first input at a first location on the wrist that meets predetermined selection criteria.

8010
In response to detecting the first input at the first location on the wrist that meets the predetermined selection criteria:

8012
In accordance with a determination that the first location corresponds to the first portion of the wrist and that at least a portion of a palm that is connected to the wrist is facing toward a viewpoint corresponding to the view of the three-dimensional environment that is provided via the display generation component, causing the display generation component to display a user interface of the first application at a third position within the view of the three-dimensional environment that corresponds to at least the portion of the palm.

8014
In accordance with a determination that the first location corresponds to the second portion of the wrist and that at least a portion of the palm that is connected to the wrist is facing toward the viewpoint corresponding to the view of the three-dimensional environment that is provided via the display generation component, causing the display generation component to display a user interface of the second application at the third position within the view of the three-dimensional environment that corresponds to at least the portion of the palm.

At a computer system including a display generation component and one or more input devices:

9002
Displaying, via the display generation component, a first view of a user interface of a first application at a first position within a view of a three-dimensional environment that corresponds to a location of at least a portion of a palm that is currently facing a viewpoint corresponding to the view of a three-dimensional environment that is provided via the display generation component, wherein the first view of the user interface of the first application is displayed with a first size.

9004
While displaying the first view of the user interface of the first application at the first position within the view of the three-dimensional environment that corresponds to the location of at least the portion of the palm that is currently facing the viewpoint corresponding to the view of the three-dimensional environment that is provided via the display generation component, detecting a first input that corresponds to a request to transfer display of the first application from the palm to a first surface that is within a first proximity of the viewpoint corresponding to the view of the three-dimensional environment that is provided via the display generation component.

9006
In response to detecting the first input, displaying a second view of the user interface of the first application with an orientation that corresponds to the first surface at a second position defined by the first surface, wherein the second view of the user interface of the first application is displayed with a second size that is distinct from the first size.

At a computer system including a display generation component and one or more input devices:

10002
Detecting presence of a wrist at a location that corresponds to a position within a view of a three-dimensional environment that is provided via the display generation component.

10004
In response to detecting the presence of the wrist at the location that corresponds to the position within the view of the three-dimensional environment that is provided via the display generation component:

10006
In accordance with a determination that first criteria are met by the presence of the wrist at the location that corresponds to the position in the view of the three-dimensional environment that is provided via the display generation component, wherein the first criteria require that an inner side of the wrist is facing toward a viewpoint corresponding to the view of a three-dimensional environment that is provided via the display generation component, displaying, via the display generation component, a first user interface object, including a plurality of representations corresponding to different applications, at a first position within the view of the three-dimensional environment that corresponds to a first location on the wrist.

10008
While displaying the first user interface object at the first position within the view of the three-dimensional environment that corresponds to the first location on the wrist, detecting that the wrist has changed from satisfying the first criteria to satisfying second criteria, wherein the second criteria require that an outer side of the wrist is facing toward the viewpoint corresponding to the view of a three-dimensional environment that is provided via the display generation component.

10010
In respond to detecting that the wrist has changed from satisfying the first criteria to satisfying the second criteria, switching from displaying the first user interface object at the first position within the view of the three-dimensional environment that corresponds to the location on the wrist to displaying, via the display generation component, a second user interface object, including a plurality of controls for controlling functions for the computer system, at a second position within the view of the three-dimensional environment that corresponds to a location on a back of a hand that is attached to the wrist.

At a first computer system including a first display generation component and one or more first input devices:

11002
While displaying one or more user interface objects in a first view of a three-dimensional environment to a first user that includes a representation of a second user, receiving a request to display a second view of the three-dimensional environment.

11004
In response to receiving the request to display the second view of the three-dimensional environment:

11006
In accordance with a determination that the second view of the three-dimensional environment includes a location corresponding to a first portion of a user interface object associated with the second user where the location is not obscured by other objects or other portions of the user interface object in the three-dimensional environment and the user interface object associated with the second user meets respective criteria, displaying the user interface object that is associated with second user, including the first portion of the user interface object, at the location, wherein the respective criteria include a criterion that is met when the user interface object that is associated with the second user has a predetermined spatial relationship to the second user.

11008
In accordance with a determination that the second view of the three-dimensional environment includes the location corresponding to the first portion of the user interface object associated with the second user where the location is not obscured by other objects or other portions of the user interface object in the three-dimensional environment and the user interface object associated with the second user does not meet the respective criteria, forgoing displaying at least a portion of the user interface object that is associated with the second user, including forgoing displaying the first portion of the user interface object.

Figure 11

DEVICES, METHODS, AND GRAPHICAL USER INTERFACES FOR DISPLAYING APPLICATIONS IN THREE-DIMENSIONAL ENVIRONMENTS

RELATED APPLICATIONS

This application claims priority to U.S. Provisional Patent Application 62/953,125, filed Dec. 23, 2019, which is incorporated by reference in its entirety.

TECHNICAL FIELD

This disclosure relates generally to a computer system with a display generation component and one or more input devices that provide computer-generated experiences, including but not limited to electronic devices that provide virtual reality and mixed reality experiences via a display.

BACKGROUND

The development of computer systems for augmented reality has increased significantly in recent years. Example augmented reality environments include at least some virtual elements that replace or augment representations of the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer-generated experiences to users that make interaction with the computer systems more efficient and intuitive for a user. Such methods and interfaces optionally complement or replace conventional methods for providing computer-generated reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for a computer system with a display generation component and one or more input devices are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI or the user's body as captured by cameras and other movement sensors, and voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

As disclosed herein, different types of content or applications are optionally displayed with different display sizes and display ranges (e.g., in hand, on tabletops, in air, or on a wall) and/or designed to respond to user inputs in accordance with different user interaction models, thereby achieving better interaction efficiency (e.g., fewer inputs, fewer mistakes, faster response time, etc.) and better user experience (e.g., timely and intuitive feedback, and less cognitive burden, etc.). Similarly, the same application or content may be selectively displayed with different display sizes, display ranges, and display orientations (e.g., in accordance with the user's hand postures and gesture inputs), and designed to respond to user inputs in accordance with different user interaction models when displayed with the different sizes, ranges, and orientations, to achieve better interaction efficiencies and user experiences. As described in the present disclosure, application icons are displayed at positions in a computer-generated three-dimensional environment that correspond to a location of a user's wrist (e.g., inner side of the wrist), such that user inputs directed to the user's wrist are used to activate the application icons and launch corresponding applications. Various heuristics are used to determined where and how content and/or applications are displayed relative to the user, and how the displayed user interfaces respond to user inputs. Using a user's wrist as a display surface and an input surface is convenient and intuitive, and reduces user's efforts required to interact with the application icons and thereby reduce user mistakes and improve interaction efficiency.

Computer-generated environments, including augmented reality environments and virtual environments, can be shared among multiple users using different display generation components (e.g., head-mounted displays, touch-screens, etc.). For example, the different display generation components may display different perspectives of an augmented reality environment that are based on the same three-dimensional physical environment and different users' relative locations in the physical environment; and the shared augmented reality environment includes at least one virtual element with respective display positions in the views provided via the different display generation components that correspond to the same spatial location in the three-dimensional physical environment. Similarly, the different display generation components may display different perspectives of the same three-dimensional virtual environment, where each virtual element in the virtual environment have respective display positions on the different display generation components that correspond to the same spatial location in the three-dimensional virtual environment. Shared experiences delivered through computer-generated environments provided via different display generation components enable improved communication efficiency and enhanced user experience in computer-aided collaboration and social engagement activities. However, privacy and control remain important when users engaged in shared computer-generated experiences. For example, a user may wish to keep private certain content or applications activated in a computer-generated three-dimensional environment when the user shares the computer-generated three-dimensional environment with another user. The user may also wish to briefly share the content or application that she/he has been viewing in private mode with another user and to stop sharing the content or application at any time without terminating the sharing of the three-dimensional environment in general. As described in the present disclosure, the privacy modes and interaction modes of the application/content activated in the three-dimensional environment by a first user are controlled by the position and/or orientation of the application/content (or of a user interface object on which the application/content is displayed) relative to the first user in the computer-generated three-dimensional environment, and/or by the first user's hand postures and hand gestures in an intuitive and efficient manner. As a result, privacy protection and user control of a user's application/content are seamlessly integrated into the process of sharing a computer-generated experience with another user, without the requirements of a prior configuration process for the application/content or a reconfiguration process being performed during the sharing experience.

In accordance with some embodiments, a method is performed at a computer system including a display generation component and one or more input devices, including: detecting a wrist at a location that corresponds to a respective position within a view of a three-dimensional environment that is provided via the display generation component without displaying representations of applications at the respective position within the view of the respective three-dimensional environment that corresponds to the location of the wrist; while detecting the wrist at the location that corresponds to the respective position within the view of the three-dimensional environment that is provided via the display generation component: in accordance with a determination that first criteria are met by a navigational state of the wrist, displaying, via the display generation component, a plurality of representations corresponding to different applications in a first region within the view of the three-dimensional environment provided via the display generation component, including displaying a first representation corresponding to a first application at a first position within the view of the three-dimensional environment that corresponds to a first portion of the wrist, and a second representation corresponding to a second application at a second position within the view of the three-dimensional environment that corresponds to a second portion of the wrist; while displaying the plurality of representations corresponding to different applications in the first region within the view of the three-dimensional environment provided via the display generation component, detecting a first input at a first location on the wrist that meets predetermined selection criteria; and in response to detecting the first input at the first location on the wrist that meets the predetermined selection criteria: in accordance with a determination that the first location corresponds to the first portion of the wrist and that at least a portion of a palm that is connected to the wrist is facing toward a viewpoint corresponding to the view of the three-dimensional environment that is provided via the display generation component, causing the display generation component to display a user interface of the first application at a third position within the view of the three-dimensional environment that corresponds to at least the portion of the palm; and in accordance with a determination that the first location corresponds to the second portion of the wrist and that at least a portion of the palm that is connected to the wrist is facing toward the viewpoint corresponding to the view of the three-dimensional environment that is provided via the display generation component, causing the display generation component to display a user interface of the second application at the third position within the view of the three-dimensional environment that corresponds to at least the portion of the palm.

In accordance with some embodiments, a method is performed at a computer system including a display generation component and one or more input devices, including: displaying, via the display generation component, a first view of a user interface of a first application at a first position within a view of a three-dimensional environment that corresponds to a location of at least a portion of a palm that is currently facing a viewpoint corresponding to the view of a three-dimensional environment that is provided via the display generation component, wherein the first view of the user interface of the first application is displayed with a first size; while displaying the first view of the user interface of the first application at the first position within the view of the three-dimensional environment that corresponds to the location of at least the portion of the palm that is currently facing the viewpoint corresponding to the view of the three-dimensional environment that is provided via the display generation component, detecting a first input that corresponds to a request to transfer display of the first application from the palm to a first surface that is within a first proximity of the viewpoint corresponding to the view of the three-dimensional environment that is provided via the display generation component; and in response to detecting the first input, displaying a second view of the user interface of the first application with an orientation that corresponds to the first surface at a second position defined by the first surface, wherein the second view of the user interface of the first application is displayed with a second size that is distinct from the first size.

In accordance with some embodiments, a method is performed at a computer system including a display generation component and one or more input devices, including: detecting presence of a wrist at a location that corresponds to a position within a view of a three-dimensional environment that is provided via the display generation component;

in response to detecting the presence of the wrist at the location that corresponds to the position within the view of the three-dimensional environment that is provided via the display generation component: in accordance with a determination that first criteria are met by the presence of the wrist at the location that corresponds to the position in the view of the three-dimensional environment that is provided via the display generation component, wherein the first criteria require that an inner side of the wrist is facing toward a viewpoint corresponding to the view of a three-dimensional environment that is provided via the display generation component, displaying, via the display generation component, a first user interface object, including a plurality of representations corresponding to different applications, at a first position within the view of the three-dimensional environment that corresponds to a first location on the wrist; while displaying the first user interface object at the first position within the view of the three-dimensional environment that corresponds to the first location on the wrist, detecting that the wrist has changed from satisfying the first criteria to satisfying second criteria, wherein the second criteria require that an outer side of the wrist is facing toward the viewpoint corresponding to the view of a three-dimensional environment that is provided via the display generation component; and in response to detecting that the wrist has changed from satisfying the first criteria to satisfying the second criteria, switching from displaying the first user interface object at the first position within the view of the three-dimensional environment that corresponds to the first location on the wrist to displaying, via the display generation component, a second user interface object, including a plurality of controls for controlling functions for the computer system, at a second position within the view of the three-dimensional environment that corresponds to a location on a back of a hand that is attached to the wrist.

In accordance with some embodiments, a method is performed at a first computer system including a first display generation component and one or more first input devices, including: while displaying one or more user interface objects in a first view of a three-dimensional environment to a first user that includes a representation of a second user, receiving a request to display a second view of the three-dimensional environment; and in response to receiving the request to display the second view of the three-dimensional environment: in accordance with a determination that the second view of the three-dimensional environment includes a location corresponding to a first portion of a user interface object associated with the second user where the location is not obscured by other objects or other portions of the user interface object in the three-dimensional environment and the user interface object associated with the second user meets respective criteria, displaying the user interface object that is associated with second user, including the first portion of the user interface object, at the location, wherein the respective criteria include a criterion that is met when the user interface object that is associated with the second user has a predetermined spatial relationship to the second user; and in accordance with a determination that the second view of the three-dimensional environment includes the location corresponding to the first portion of the user interface object associated with the second user where the location is not obscured by other objects or other portions of the user interface object in the three-dimensional environment and the user interface object associated with the second user does not meet the respective criteria, forgoing displaying at least a portion of the user interface object that is associated with the second user, including forgoing displaying the first portion of the user interface object.

In accordance with some embodiments, a computer system includes a display generation component (e.g., a display, a projector, a head-mounted display, etc.), one or more input devices (e.g., one or more cameras, a touch-sensitive surface, optionally one or more sensors to detect intensities of contacts with the touch-sensitive surface), optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by a computer system with a display generation component, one or more input devices (e.g., one or more cameras, a touch-sensitive surface, optionally one or more sensors to detect intensities of contacts with the touch-sensitive surface), and optionally one or more tactile output generators, cause the device to perform or cause performance of the operations of any of the methods described herein. In accordance with some embodiments, a graphical user interface on a computer system with a display generation component, one or more input devices (e.g., one or more cameras, a touch-sensitive surface, optionally one or more sensors to detect intensities of contacts with the touch-sensitive surface), optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes: a display generation component, one or more input devices (e.g., one or more cameras, a touch-sensitive surface, optionally one or more sensors to detect intensities of contacts with the touch-sensitive surface), and optionally one or more tactile output generators; and means for performing or causing performance of the operations of any of the methods described herein. In accordance with some embodiments, an information processing apparatus, for use in a computer system with a display generation component, one or more input devices (e.g., one or more cameras, a touch-sensitive surface, optionally one or more sensors to detect intensities of contacts with the touch-sensitive surface), and optionally one or more tactile output generators, includes means for performing or causing performance of the operations of any of the methods described herein.

Thus, computer systems with display generation components are provided with improved methods and interfaces for interacting with a three-dimensional environment and facilitating the user's user of the computer systems when interacting with the three-dimensional environment, thereby increasing the effectiveness, efficiency, and user safety and satisfaction with such computer systems. Such methods and interfaces may complement or replace conventional methods for interacting with a three-dimensional environment and facilitating the user's user of the computer systems when interacting with the three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 8 is a flowchart of a method of interacting with a computer-generated three-dimensional environment (e.g., including displaying application icons at positions corresponding to a location of a user's wrist, and displaying an application at a position corresponding to a location of the user's palm in response to an input directed to the wrist), in accordance with some embodiments.

FIG. 9 is a flowchart of a method of interacting with a computer-generated three-dimensional environment (e.g., including moving an application user interface from a first display position corresponding to a location of the user's palm to a second display position corresponding to another surface in the physical environment, and resizing the application user interface relative to the three-dimensional environment in conjunction with the movement to the second display position), in accordance with some embodiments.

FIG. 10 is a flowchart of a method of interacting with a computer-generated three-dimensional environment (e.g., including displaying controls at display positions corresponding to the back of a user's hand and displaying application icons at display positions corresponding to the inner side of the user's wrist (and, optionally, displaying application user interfaces at a display position corresponding to the user's palm)), in accordance with some embodiments.

FIG. 11 is a flowchart of a method of facilitating user interaction with a computer-generated environment that is shared between multiple users (e.g., including displaying or hiding (or forgoing display of) a user interface object associated with another user based on whether the spatial relationship between the user interface object and its associated user meets preset criteria), in accordance with some embodiments.

DESCRIPTION OF EMBODIMENTS

Figure 1:
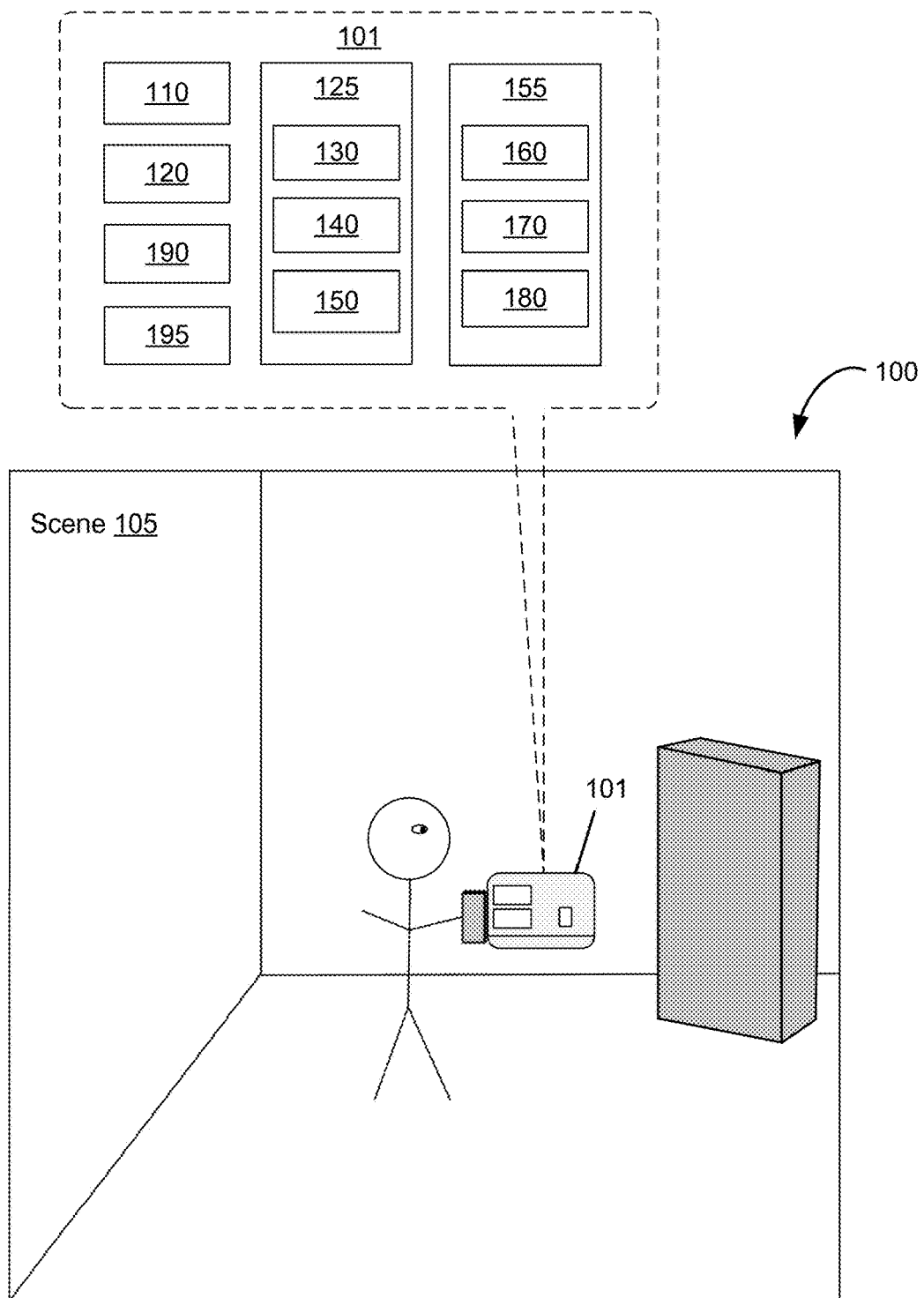
FIG. 1 is a block diagram illustrating an operating environment of a computer system for providing CGR experiences in accordance with some embodiments.

The present disclosure relates to user interfaces for providing a computer generated reality (CGR) experience to a user, in accordance with some embodiments.

The systems, methods, and GUIs described herein improve user interface interactions with virtual/augmented reality environments in multiple ways.

In some embodiments, a computer system displays application icons at positions in a computer-generated three-dimensional environment that correspond to a location of a user's wrist when preset criteria are met by a navigation state of the wrist. A user input directed to the wrist (e.g., by another hand not connected to the wrist) is used to activate an application icon displayed at a position corresponding to the input location on the wrist, and causes display of an application user interface at a position in the computer-generated environment that corresponds to a location of the user's palm (e.g., the palm connected to the wrist). The size and/or orientation of the application user interface are optionally selected based on the posture of the user's palm. Using the user's wrist as a surface for displaying application icons and using the palm connected to the wrist as the surface for displaying an application user interface are natural and intuitive. The user can easily reach and interact with the application user interface through changing the user's hand posture or inputs directed to the user's palm. This method of displaying application icons and application user interfaces does not require availability of another input surface and/or display surface. The user's natural movement (e.g., raising the user's arm and turning the inner side of the wrist and the palm toward the user's face) is utilized as inputs to cause display of the application icons, and to provide a surface for displaying an application user interface. This reduces equipment cost, reduces the number, extent, and/or the nature of the inputs from a user, and produces a more efficient human-machine interface.

In some embodiments, when an application user interface is displayed at a position corresponding to a location of a user's palm, the application user interface is displayed with a first size, and optionally, with a first orientation and responds to user inputs in accordance with a first interaction model. In response to a request to move the application user interface from a display position corresponding to the user's palm to a display position corresponding to another surface in the three-dimensional environment (e.g., a nearby tabletop or a wall in the physical environment), the application user interface is displayed with a different size, and optionally, a different orientation relative to the three-dimensional environment and responds to user inputs in accordance with a different interaction model. In some embodiments, the application user interface is restored to a display position corresponding to the user's palm in response to a predefined gesture of the user's hand. In some embodiments, the privacy mode of the application is adjusted (e.g., the privacy mode controls the type and amount of content shown in the user interface of the application, and optionally the types of operations permitted to be performed in the user interface of the application) when switching between display positions respectively corresponding to the user's palm and other surfaces in the three-dimensional environment. By automatically adjusting the display size and optionally the display orientation and interaction model of the application user interface based on display positions of the application user interface (and based on characteristics of corresponding physical locations), the computer system helps the user to easily choose the optimal interaction mode for an application under a usage scenario (e.g., large display size on a wall for enjoying content in a private environment or for fully engaged collaboration with others in a shared environment, medium display size on a tabletop for working in solitude or in pairs, or small display size on the palm for working privately in a shared environment, etc.) and reduces the number, extent, and/or the nature of the inputs from a user and produce a more efficient human-machine interface.

In some embodiments, controls and application icons are displayed respectively in a computer-generated three-dimensional environment in accordance with whether the back side of the user's hand or the inner sides of the user's wrist or palm are facing toward the user's face (or correspondingly, a viewpoint corresponding to a current view of the computer-generated three-dimensional environment). Showing controls at positions corresponding to the back of the hand in conjunction with showing application icons at positions corresponding to the inner side of the wrist connected to the hand and/or showing application user interfaces at positions corresponding to the palm connected to the wrist provide efficient divisions of functions that are made available based on the user's natural body movement, and reduces the number, extent, and/or the nature of the inputs from a user and produces a more efficient human-machine interface.

In some embodiments, when a computer system displays a shared three-dimensional environment (e.g., virtual environment or augmented reality environment) via a first display generation component, an application user interface is either hidden or displayed in the three-dimensional environment shown via the first display generation component based on a privacy mode of the application user interface as determined based on a spatial relationship between the application user interface and its owner (e.g., the user that started the application) in the shared three-dimensional environment as displayed via a second display generation component used by the owner of the application user interface. Automatically displaying or hiding an application user interface associated with another user in a shared computer-generated three-dimensional environment based on the spatial relationship between the application user interface and its associated user in the computer-generated three-dimensional environment allows each user to easily control the privacy of its own applications in the shared computer environment, and enable improved communication efficiency and enhanced user experience in computer-aided collaboration and social engagement activities. By controlling the privacy modes and interaction modes of the application/content based on the position of the application/content relative to the controlling user (e.g., the owner of the application or the user that activated the application in the three-dimensional environment) in the computer-generated three-dimensional environment, and/or based on the user's hand postures and gestures, privacy protection and user control of a user's application/content are seamlessly integrated into the process of sharing a computer-generated experience with another user in real time, thereby reducing the number, extent, and/or the nature of the inputs from a user during a sharing session and producing a more efficient human-machine interface.

FIGS. 1-6 provide a description of example computer systems for providing CGR experiences to users. FIGS. 7A-7D are block diagrams illustrating user interactions with a computer-generated three-dimensional environment in accordance with some embodiments. FIGS. 7E-7G are block diagrams illustrating interactions with a computer-generated three-dimensional environment that is shared among multiple users, in accordance with some embodiments. FIG. 8 is a flowchart of a method of interacting with a computer-generated three-dimensional environment (e.g., including displaying application icons at positions corresponding to a location of a user's wrist, and displaying an application at a position corresponding to a location of the user's palm in response to an input directed to the wrist), in accordance with some embodiments. FIG. 9 is a flowchart of a method of interacting with a computer-generated three-dimensional environment (e.g., including moving an application from a first display position corresponding to a location of the user's palm to a second display position corresponding to another surface in the physical environment, and resizing the application user interface relative to the three-dimensional environment in conjunction with the movement to the second display position), in accordance with some embodiments. FIG. 10 is a flowchart of a method of interacting with a computer-generated three-dimensional environment (e.g., including displaying controls at display positions corresponding to the back of a user's hand and displaying application icons at display positions corresponding to an inner side of the user's wrist (and, optionally, displaying application user interface at a display position corresponding to the user's palm)), in accordance with some embodiments. FIG. 11 is a flowchart of a method of facilitating user interaction with a computer-generated environment that is shared between multiple users (e.g., including displaying or hiding (or forgoing display of) a user interface object associated with another user based on whether the spatial relationship between the user interface object and its associated user meets preset criteria), in accordance with some embodiments. The user interfaces in FIGS. 7A-7G are used to illustrate the processes in FIGS. 8-11, respectively.

In some embodiments, as shown in FIG. 1, the CGR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical setting/environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the CGR experience (e.g., at least a visual component of the CGR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a CGR experience to the user while the user is virtually and/or physically present within the scene 105.

In some embodiments, the display generation component is worn on a part of the user's body (e.g., on his/her head, on his/her hand, etc.). As such, the display generation component 120 includes one or more CGR displays provided to display the CGR content. For example, in various embodiments, the display generation component 120 encloses the field-of-view of the user. In some embodiments, the display generation component 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CGR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
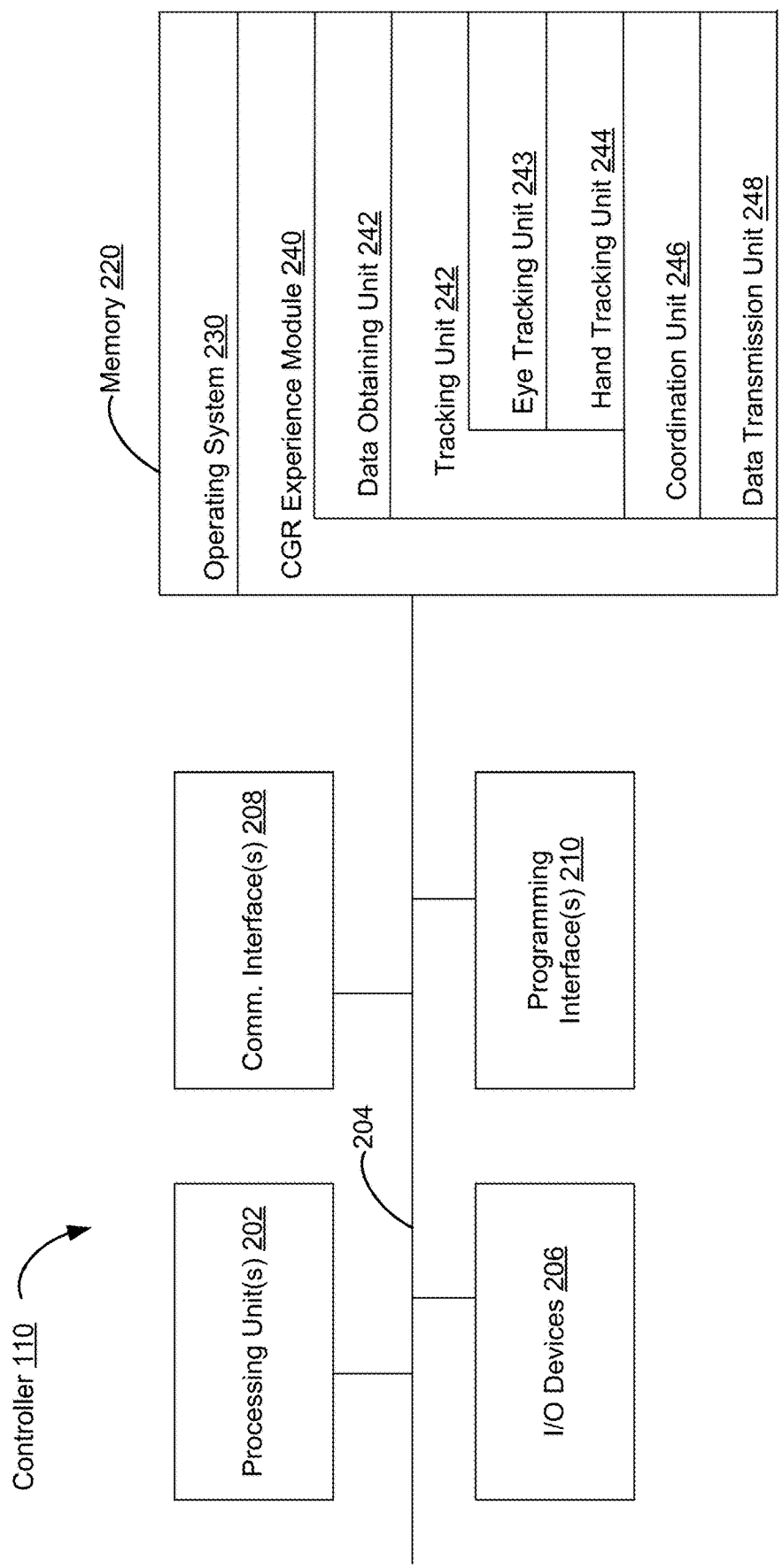
FIG. 2 is a block diagram illustrating a controller of a computer system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 243 and/or eye tracking unit 245. In some embodiments, the hand tracking unit 243 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 243 is described in greater detail below with respect to FIG. 4. In some embodiments, the eye tracking unit 245 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via the display generation component 120. The eye tracking unit 245 is described in greater detail below with respect to FIG. 5.

In some embodiments, the coordination unit 246 is configured to manage and coordinate the CGR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
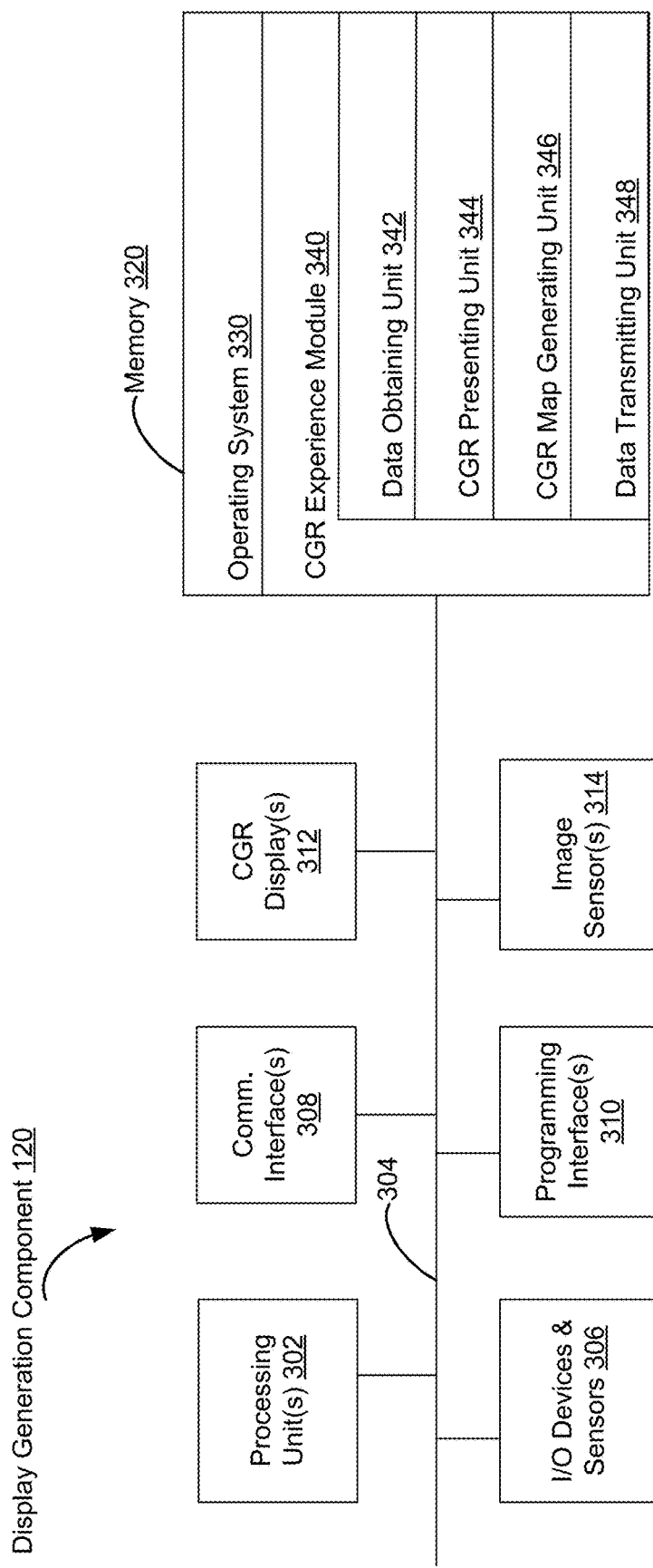
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some embodiments, the one or more CGR displays 312 are capable of presenting MR and VR content. In some embodiments, the one or more CGR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
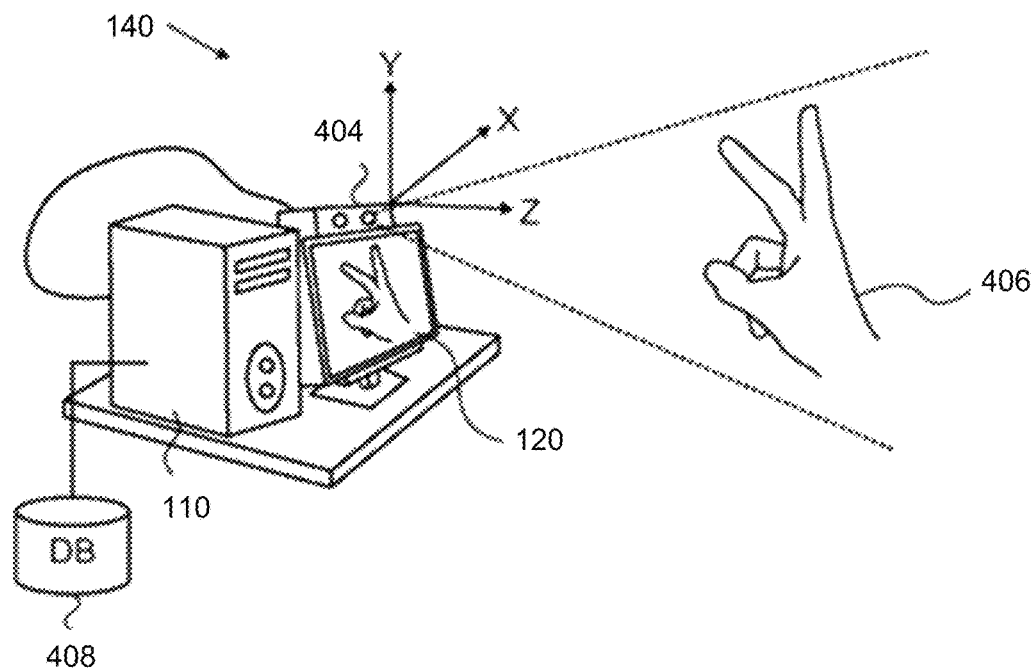
FIG. 4 is a block diagram illustrating a hand tracking unit of a computer system that is configured to capture gesture inputs of the user in accordance with some embodiments.
Figure 4:
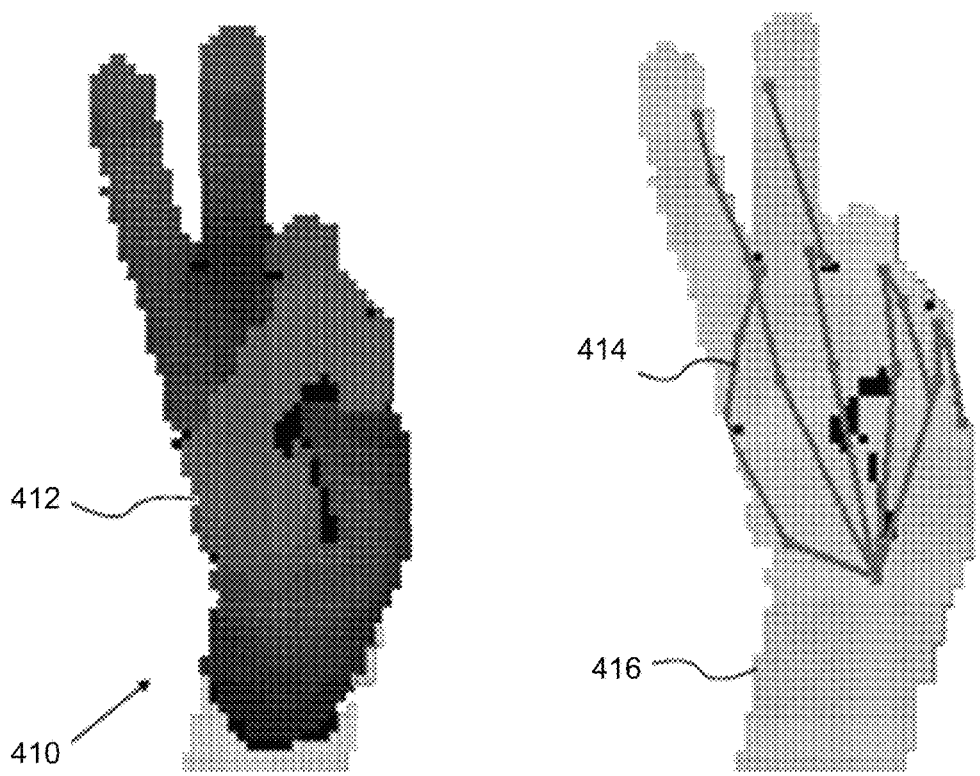

FIG. 4 is a schematic, pictorial illustration of an example embodiment of the hand tracking device 140. In some embodiments, hand tracking device 140 (FIG. 1) is controlled by hand tracking unit 243 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 408 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
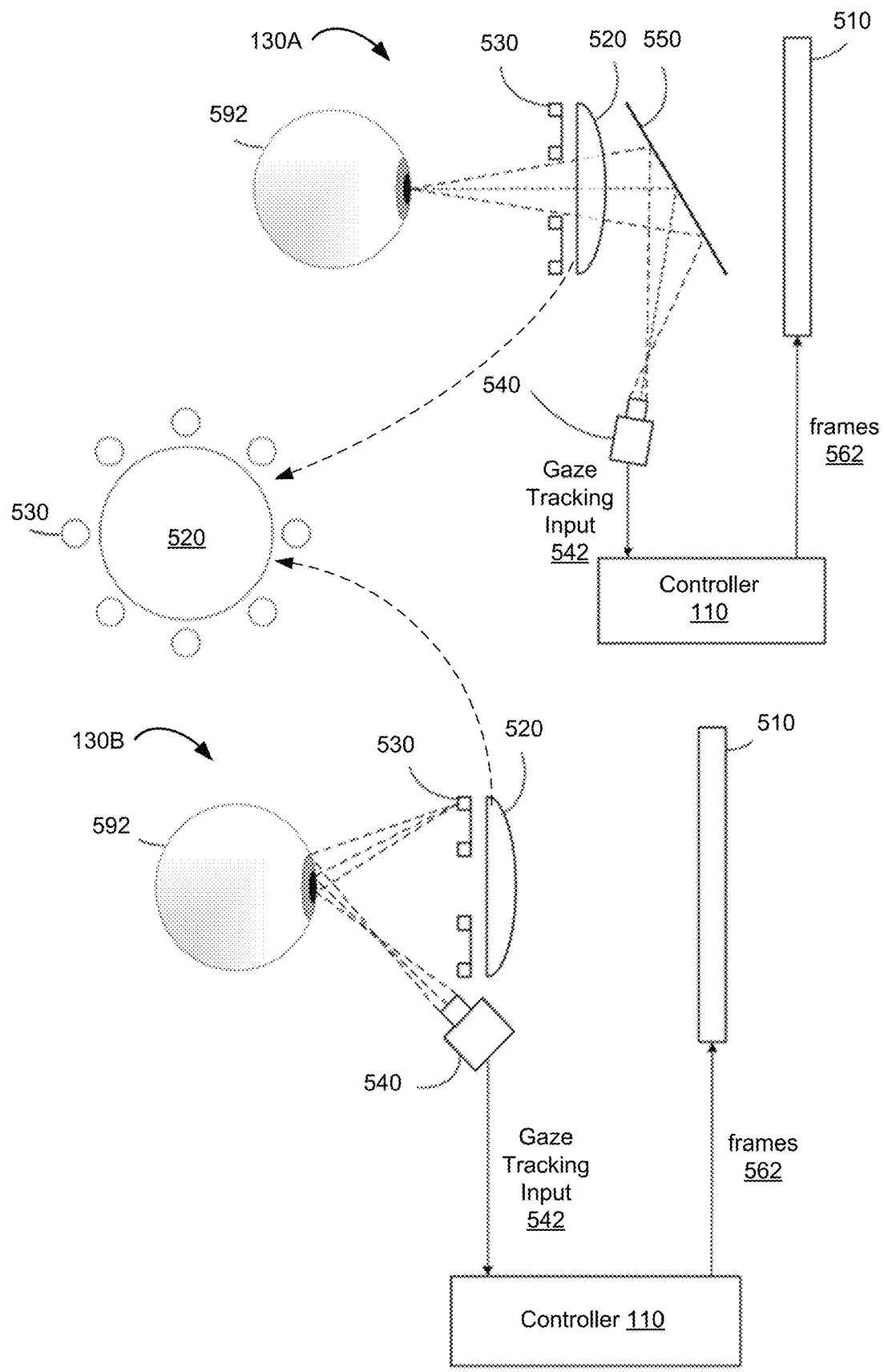
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 245 (FIG. 2) to track the position and movement of the user's gaze with respect to the scene 105 or with respect to the CGR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component 120. For example, when display generation component is a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environment of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality (e.g., including virtual reality, and/or mixed reality) applications to provide computer-generated reality (e.g., including virtual reality, augmented reality, and/or augmented virtuality) experiences to the user.

Figure 6:
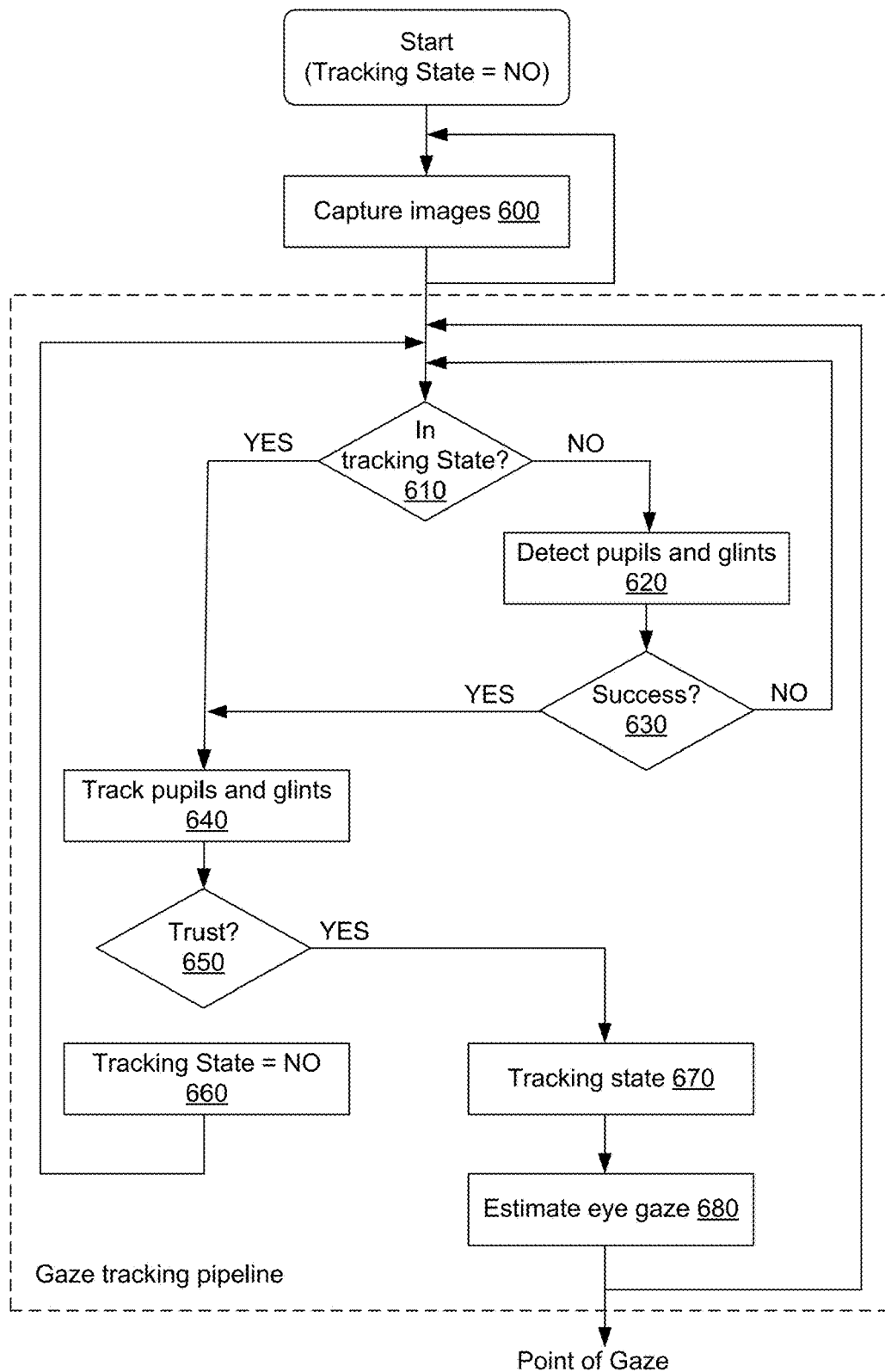
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serves as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7D are block diagrams illustrating user interactions with a computer-generated three-dimensional environment, in accordance with some embodiments. FIGS. 7A-7D are used to illustrate the processes described below, including the processes in FIGS. 8-11.

In some embodiments, the presence of conditions, inputs and/or gestures described with regard to FIGS. 7A-7D are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, depth cameras, etc.). For example, the one or more imaging sensors are components of or provide data to a computer system (e.g., computer system 101 in FIG. 1 (e.g., a portable electronic device as illustrated in FIGS. 7A-7D or an HMD)) that includes a display generation component (e.g., display generation component 120 in FIGS. 1, 3, and 4 or display generation components 7100 and 7200 in FIGS. 7A-7G (e.g., a touch-screen display that serves as a display and a touch-sensitive surface, a stereoscopic display, a display with a pass-through portion, etc.)). In some embodiments, the one or more imaging sensors include one or more rear-facing cameras on a side of a device opposite from a display of the device. In some embodiments, the inputs and/or gestures are detected by a sensor system of a head mounted system (e.g., a VR headset that includes a stereoscopic display that provides a left image for the user's left eye and a right image for the user's right eye). For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads up device (such as a heads up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand (e.g., hand 7020, hand 7022, and/hand 7214, as described with regard to FIGS. 7A-7D), an image of the hand under illumination of the light is captured by the one or more cameras and the captured image is analyzed to determine a position and/or configuration of the hand. For example, while light (e.g., light from an array of infrared light emitters having a predetermined pattern) is projected onto a wrist (e.g., wrist 7028, and/or wrist 7228, as described with regard to FIGS. 7A-7G), an image of the wrist under illumination of the light is captured by the one or more cameras and the captured image is analyzed to determine a position and/or configuration of the wrist. Using signals from image sensors directed to the hand and the wrist to determine input gestures, as opposed to using signals of touch-sensitive surfaces or other direct contact mechanism or proximity-based mechanisms allow the user to freely choose whether to execute large motions or remaining relatively stationary when providing the input gestures with his/her hand, without experiencing constraints imposed by a specific input device or input region. Similarly, image sensors are also used to detect presence of other body parts, such as the wrist (e.g., including an inner side of the wrist connected to the palm, and the back of the wrist connected to the back of the hand) and the arm (e.g., including an inner side of the arm connected to the inner side of the wrist, and an outer side of the arm connected to the back side of the wrist) of the user, and their positions relative to the physical environment and/or the user's face (e.g., with a position corresponding to a viewpoint corresponding to a current view of a three-dimensional environment displayed via the display generation component).

Figure 7A:
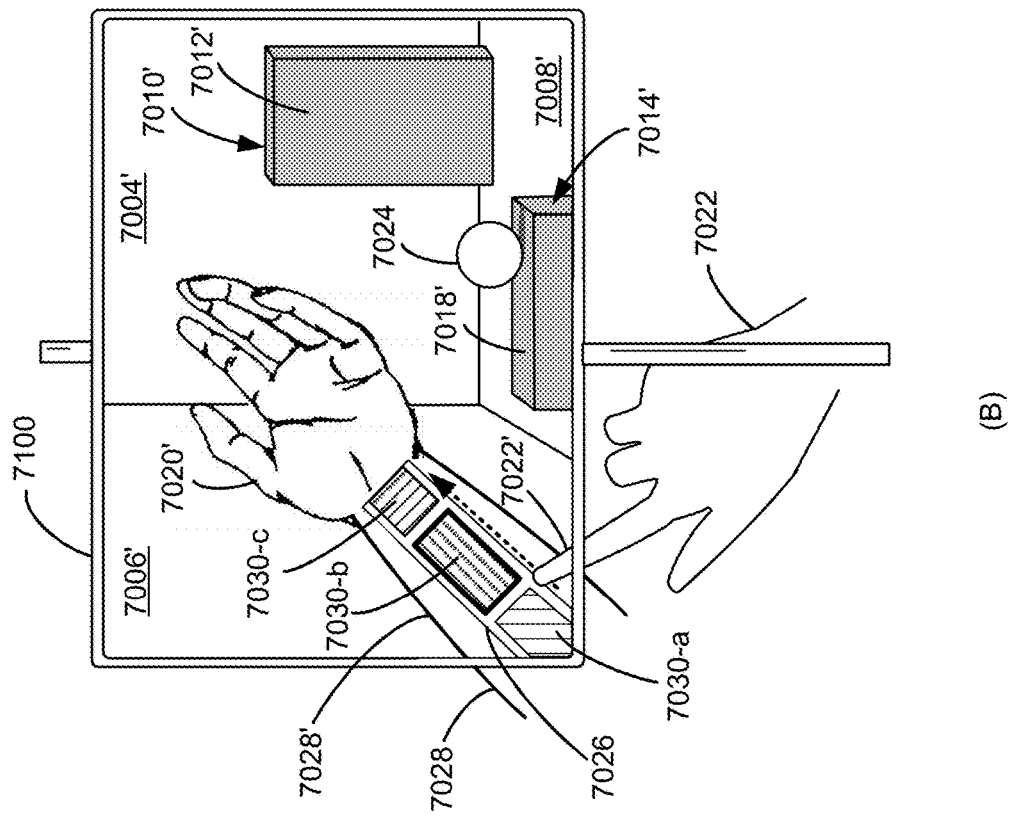
FIGS. 7A-7D are block diagrams illustrating user interactions with a computer-generated three-dimensional environment (e.g., including interactions to display and/or move an application, content, or control in the computer-generated three-dimensional environment, and optionally changing the privacy modes thereof), in accordance with some embodiments.
Figure 7A:
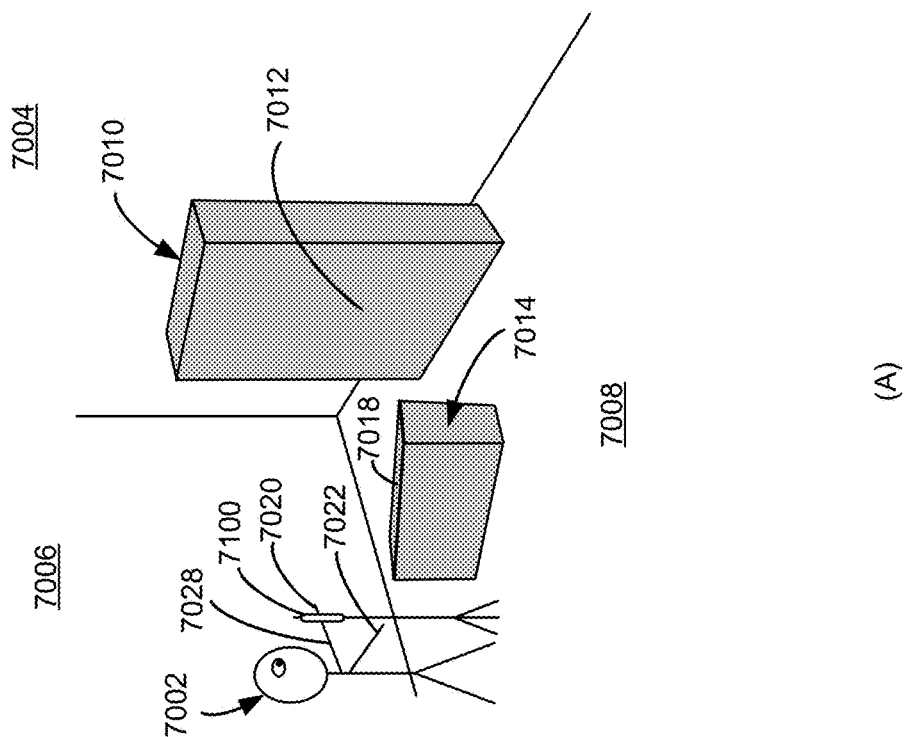

As shown in FIG. 7A(A), a user (e.g., user 7002) is present in a physical environment (e.g., scene 105) that includes a plurality of physical surfaces (e.g., vertical surfaces such as front wall 7004, side wall 7006, and front surface 7012 of object 7010 (e.g., a shelf, a refrigerator, a door, etc.), horizontal surfaces such as floor surface 7008 and top surface 7018 of object 7014 (e.g., a desk or table)) at various locations. The user 7002 has a first hand (e.g., left hand 7020) and a second hand (e.g., right hand 7022).

As shown in FIG. 7A(B), in some embodiments, the user 7002 is provided with a view of at least a portion of the physical environment (e.g., a view with a pass-through portion (e.g., a camera view or transparent portion of the display)) via the display generation component (e.g., display generation component 7100) of a computer system (e.g., an HMD, a handheld electronic device, or a computer). In some embodiments, the user is able to view the physical environment directly (e.g., in the case that the display generation component is a computer monitor, a display of a handheld device, or a display of a tablet device, etc.), in addition to seeing a portion of the physical environment through the pass-through portion of the display generation component. For example, as shown in FIG. 7A(B), the view of the physical environment shown on the display generation component 7100 includes a pass-through view of the scene 105, including representation of the physical objects and surfaces in the scene 105 (e.g., representation 7004' of vertical front wall 7004, representation 7006' of the vertical side wall 7006, representation 7008' of the horizontal floor surface 7008, representation 7010' of the physical object 7010, representation 7014' of the physical object 7014, representation 7012' of the vertical front surface 7012 of the object 7010, and representation 7018' of the horizontal top surface 7018 of the object 7014). In some embodiments, the user's direct view of the physical environment is completely blocked by the display generation component and parts connecting thereto (e.g., casing, and other hardware parts). For example, in the case that the display generation component is a display of an HMD worn by the user, or a large heads-up display of a vehicle, the user's only view of the physical environment is through the pass-through portion provided via the display generation component.

As shown in FIG. 7A(B), in some embodiments, the user is provided with a real-time view of his/her arm(s), wrist(s), and/or hand(s) (e.g., as part of the view of the physical environment, or in a separate region on the display from the view of the physical environment) when the arm(s), wrist(s), and/or hand(s) or portions thereof are moved into predefined regions in the physical environment (e.g., moved into the field of view of one or more cameras of the computer system, raised up to the upper portion of the user's torso, and/or raised by a threshold amount from a resting position, etc.).

In some embodiments, the view of the physical environment provided via the display generation component 7100 is not the physical environment surrounding the user 7002 (e.g., scene 105), and the view of the user's arm(s), wrist(s), and/or hand(s) (e.g., as captured by one or more cameras of the computer system, or stylized versions of the arm(s), wrist(s) and/or hand(s) based on information captured by various sensors) is provided by the display generation component 7100 to replace a portion of the view of the physical environment or in a separate region on the display from that showing the view of the physical environment.

In some embodiments, the display generation component 7100 does not provide a view of a physical environment, and provides a completely virtual environment (e.g., no camera view or transparent pass-through portion) and real-time visual representation(s) (e.g., a stylized representation or segmented camera images) of the user's arm(s), wrist(s), and/or hand(s) as presently captured by one or more sensors (e.g., cameras, motion sensors, other posture sensors, etc.) are provided with the virtual environment (e.g., in the virtual three-dimensional environment).

As shown in FIG. 7A(B), the current view of the user's arm(s), wrist(s), and hand(s) includes a representation 7020' of the user's hand 7020 (e.g., left hand), a representation 7028' of the user's wrist 7028 that is connected to the user's hand 7020. As described herein, the user's wrist includes the portion of the arm immediately connected to the user's hand and optionally extends to a portion of the user's arm that is between the hand and the user's elbow. In addition, the current view of the user's arm(s), wrist(s), and hand(s) also includes a representation 7022' of the user's other hand 7022 (e.g., right hand or one or more fingers thereof) that is hovering over or touching a portion of the inner side of the user's wrist 7028. The real-time view of the user's arm(s), wrist(s) and hand(s) is provided in response to the user's arm(s), wrist(s) and hand(s) being moved into predefined regions in the physical environment (e.g., moved into the field of view of one or more cameras of the computer system, raised up to the upper portion of the user's torso, and/or raised by a threshold amount from a resting position, etc.).

In some embodiments, the display generation component 7100 displays one or more virtual objects in the three-dimensional environment (e.g., an augmented reality environment or a virtual reality environment showing representations of the user's arm(s), wrist(s) and/or hand(s)) provided via the display generation component 7100. In some embodiments, the virtual objects include user interface objects (e.g., menus, application icons, notifications of events occurring in the operating system or applications of the computer system, controls of device settings, representations of media objects, a voice-based virtual assistant, etc.), stylized representations of physical objects (e.g., virtual overlays (e.g., virtual windows, wall art), virtual wall clock, virtual handheld devices, etc.), and virtual objects (e.g., animated characters, media content, virtual three-dimensional models (e.g., a virtual ball 7024 resting on the representation 7018' of the top surface 7018 and casting a virtual shadow on the representation 7018' of the top surface 7018), etc.). In some embodiments, the plurality of virtual objects optionally are displayed floating in space or replacing at least portion of the view of a physical object in the three-dimensional environment. In some embodiments, each user interface object optionally has one or more corresponding operations that can be performed within the three-dimensional environment or causing an effect in a physical environment that is in communication with the computer system (e.g., controlling another device (e.g., a speaker or smart lamp) that is in communication with the computer system controlling the display generation component).

As shown in FIG. 7A(B), when the computer system detects, e.g., by one or more cameras or other sensors, that the user's wrist has been raised to a predefined region in the physical environment (e.g., into the field of view of the one or more cameras, in front of the user's upper torso, or above a predefined distance from a resting position), the computer system displays, via the display generation component 7100, a scrollable container object (e.g., menu 7026) containing a plurality of selectable options 7030 (e.g., application icons 7030-a, 7030-b, and 7030-c) at respective display positions within the view of the three-dimensional environment that correspond to a location of the inner side of the user's wrist 7028. As the wrist 7028 moves in the physical environment, the position of the representation 7028' of the wrist 7028 moves in the view of the three-dimensional environment shown via the display generation component 7100, and the display position of the menu 7026 containing the plurality of selectable options 7030 is updated to continue to correspond to the location of the wrist 7028 (e.g., the menu 7026 is locked to the position of the representation 7028' of the wrist 7028 in the three-dimensional environment). In some embodiments, the menu 7026 including the selectable options 7030 replaces at least a portion of the view of the physical environment captured by one or more cameras of the computer system (e.g., the menu 7026 replacing a portion of the view of the inner side of the user's wrist 7028 (e.g., replacing a portion of the representation 7028')). In some embodiments, the menu 7026 including the selectable options 7030 is displayed on a transparent or semi-transparent display of the computer system (e.g., a heads up display, or an HMD) through which the physical environment is visible (e.g., the menu 7026 blocking a portion of the view of the inner side of the user's wrist 7028 (e.g., overlaying a portion of the representation 7028')). In some embodiments, the menu 7026 including the selectable options 7030 replaces display of a portion of an inner side of a stylized version of the user's wrist 7028 (e.g., the menu 7026 replacing a portion of the representation 7028' that is a stylized version of the user's wrist 7028)).

In some embodiments, as shown in FIG. 7A(B), the menu 7026 of selectable options 7030 is displayed along the longitudinal direction of the user's arm, and is scrollable up and down along the longitudinal direction of the user's arm. For example, in response to a swipe of a finger (e.g., index finger of the right hand 7022) on the wrist 7028 in the longitudinal direction of the user's arm (e.g., left arm), the selectable options 7030-a, 7030-b, and 7030-c move in the view of the three-dimensional environment provided via the display generation component 7100 in accordance with the movement of the finger on the user's wrist 7028, and the selectable option 7030-c ceases to be displayed when it moves past a position corresponding to the end of the wrist 7028 adjacent to the palm of the hand 7020. Optionally, a portion of another selectable option 7030-d that was not previously visible in the menu 7026 is displayed in the menu 7026 in accordance with the scrolling of the menu 7026. In some embodiments, the menu 7026 of selectable options 7030 are displayed along an azimuthal direction around the user's wrist 7028, and is scrollable leftward or rightward along the azimuthal direction around the user's wrist. For example, in response to a swipe of a finger (e.g., index finger of the right hand 7022) across the wrist 7028 in the azimuthal direction, the selectable options 7030 move in the view of the three-dimensional environment in accordance with the movement of the finger across the user's wrist 7028, and one or more selectable options 7030 cease to be displayed when they move past a position corresponding to a side boundary of the wrist 7028. Optionally, one or more other selectable options 7030 that were not previously visible in the menu 7026 are displayed in the menu 7026 in accordance with the scrolling of the menu 7026.

In some embodiments, the menu 7026 of selectable options is displayed at a position in the view of the three-dimensional environment that corresponds to the location of the user's wrist 7028 in accordance with a determination that certain preset criteria have been met (e.g., by the navigation state of the wrist 7028, and optionally, by the presence of other conditions). The computer system does not display the menu 7026 when the preset criteria have not been met, and/or ceases to display the menu when the preset criteria are no longer met.

In some embodiments, the preset criteria for displaying the menu 7026 include a requirement that the user's wrist is moved to a predefined region in the physical environment (e.g., into the field of view of the one or more cameras, raised to the upper portion of the user's torso, raised above a preset distance above a predefined resting position, etc.), a requirement that the inner side of the user's wrist is facing toward the user's head or eyes (e.g., corresponding to a viewpoint of the current view of the three-dimensional environment provided via the display generation component), a requirement that the user's palm connected to the wrist is open with fingers extended out, a requirement that user's palm connected to the wrist is not fully closed (e.g., forming a fully closed fist), a requirement that a representation (e.g., the representation 7020') of the user's palm connected to the wrist (e.g., the wrist 7028) is also shown within the view of the three-dimensional environment (e.g., within the field of view of the one or more cameras), a requirement that the wrist is on a predefined side of the user (e.g., left side or right side), a requirement that the user's gaze is directed to the location of the wrist or a display position in the view of the three-dimensional environment corresponding to the location of the wrist and the gaze meets predefined stability and/or duration criteria, or a combination of two or more of the above, in order for the preset criteria to be met.

In some embodiments, the menu 7026 of selectable options include application icons (e.g., an application icon is a user interface object that, when activated (e.g., in response to various predefined activation inputs), causes performance of an operation specific to a corresponding application (e.g., an operation to launch a corresponding application, an operation to display a preview of the corresponding application, and/or an operation to display a quick action menu corresponding to a respective application, etc.)). In some embodiments, the selectable options 7030 in the menu 7026 optionally include controls for trigger display of other user interface objects (e.g., user interface objects for performing device control functions (e.g., increasing volume, decreasing volume, initiating communication with a remote device, terminating communication with a remote device, displaying a configuration user interface for configuring the menu (e.g., adding or removing application icons from the menu, etc.)). In some embodiments, the selectable options 7030 in the menu 7026 optionally include respective representations (e.g., avatars) of users of remote devices that, when activated, cause an operation to be performed with respect to the remote users (e.g., an operation to initiate communication with the respective users of the remote devices). In some embodiments, the selectable options 7030 in the menu 7026 optionally include representations (e.g., thumbnails, two-dimensional images, or album covers) of media items (e.g., images, virtual objects, audio files, and/or video files) and activating a selectable option that is a representation of an image causes the image to be displayed (e.g., at a location that corresponds to a surface detected by one or more cameras).

In some embodiments, the computer system displays an affordance (e.g., a "+" button) at a position in the view of the three-dimensional environment corresponding to the inner side of the user's wrist (e.g., wrist 7028), where the affordance, when activated (e.g., by a tap input directed to a portion of the wrist that corresponds to a position of the affordance in the view of the three-dimensional environment), causes display of a user interface for selecting at least one application (or a place, an experience, or a person) for which a representation (e.g., a selectable option) is to be added to the menu of selectable options (e.g., the menu 7026) displayed at a position corresponding to the inner side of the user's wrist (e.g., the wrist 7028).

Figure 7B:
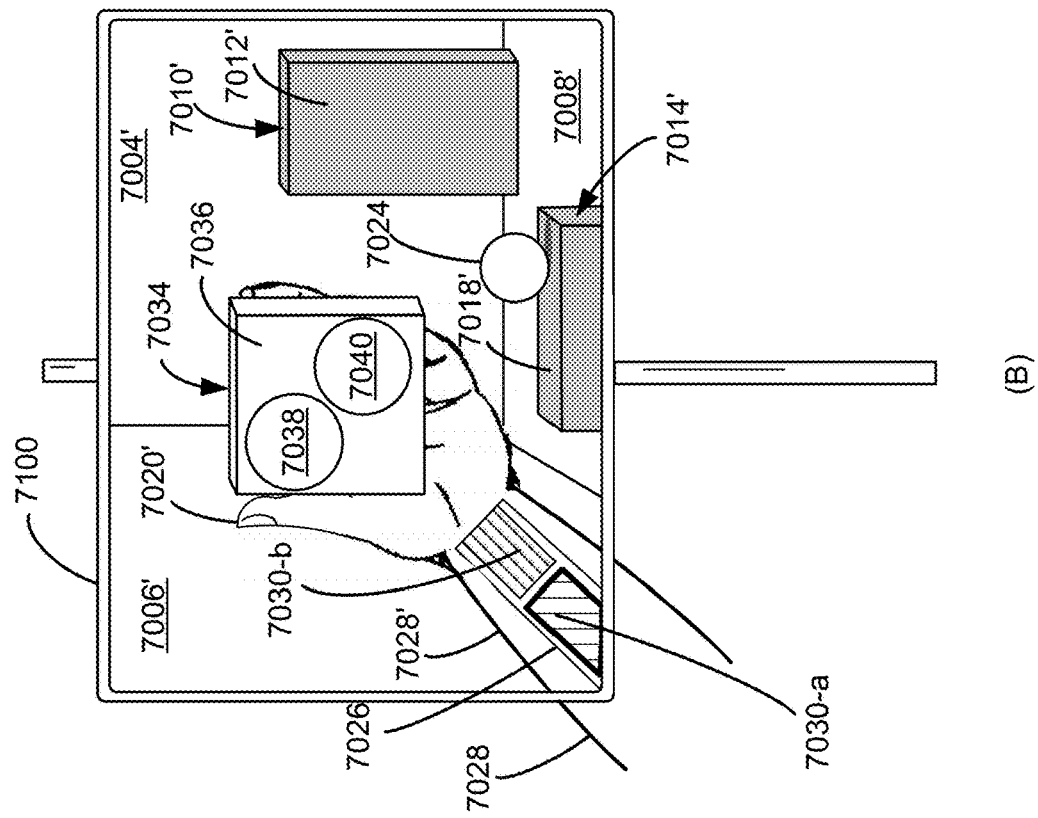
Figure 7B:
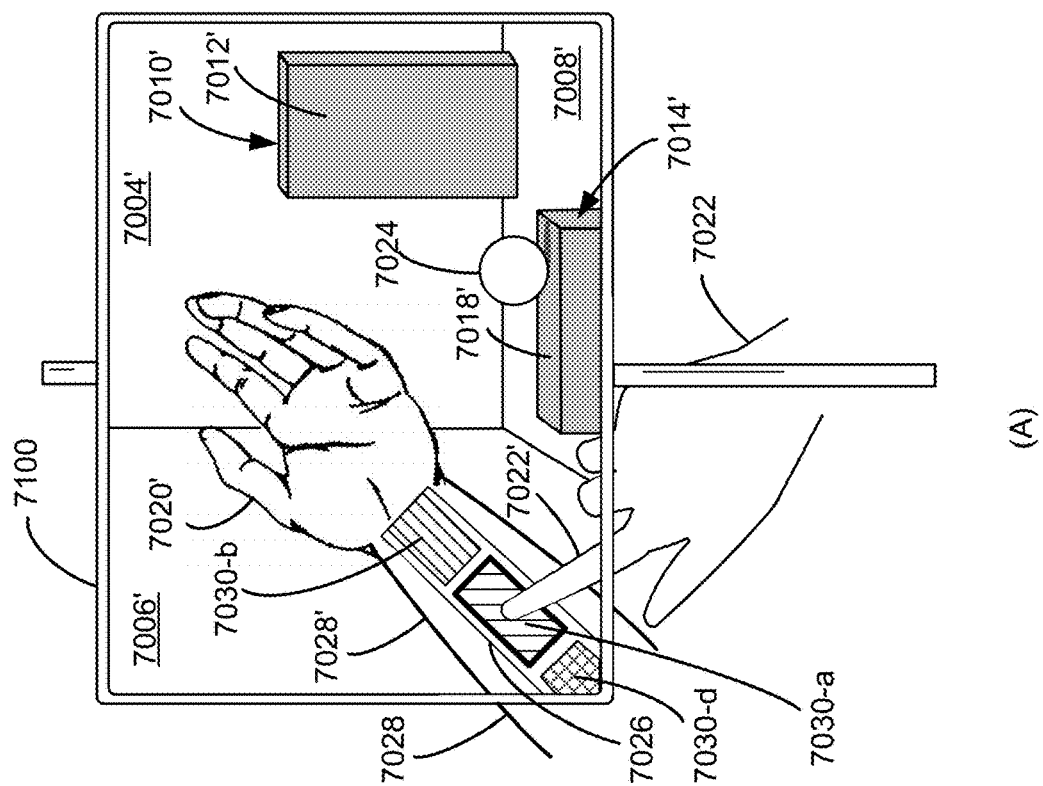

As shown in FIGS. 7A-7B, distinct operations are performed with respect to the selectable options 7030 in the three-dimensional environment in response to different types of gesture inputs provided by the hand 7022 on the wrist 7028, while the selectable options 7030 are displayed at positions in the view of the three-dimensional environment corresponding to different portions of the wrist 7028.

In FIG. 7A(B) followed by FIG. 7B(A), the hand 7022 performs a drag gesture by moving on or over the wrist 7028 in the longitudinal direction of the arm. In some embodiments, the drag gesture is performed while a current selection indicator (e.g., a selector object or a movable visual effect such as highlighting of the object by an outline or change in appearance of the object) is located on the menu 7026, indicating the currently selected status of a selectable option. In some embodiments, in response to detecting the drag gesture by the hand 7022, the computer system moves the current selection indicator from one selectable option to another selectable option in accordance with the drag gesture. In some embodiments, the current selection indicator moves in accordance with movement of a gaze input directed to the menu 7026, and the drag gesture scrolls the selectable options within the menu 7026, as shown in FIGS. 7A(B) and 7B(A).

In FIG. 7B(A), while the display generation component 7100 displays the menu 7026 containing the selectable options 7030 corresponding to different applications (e.g., application icons, representation of users, etc. representations of media items) at a position in the view of the three-dimensional environment corresponding to a location of the wrist 7028 while the preset criteria are satisfied (e.g., the wrist 7028 is within the field of view of the one or more cameras), a first input that meets predetermined selection criteria is detected at a location on the wrist 7028. In the example shown in FIG. 7B(A), the first input meeting the predetermined selection criteria is a tap input provided by an index finger of the hand 7022 on the wrist 7028. In accordance with a location of the tap input on the wrist 7028, the computer system determines which selectable option 7030 has a display position in the three-dimensional environment that corresponds to the location of the tap input on the wrist. In accordance with a determination that the location of the tap input corresponds to a display position of a first selectable option in the menu, the computer system displays a user interface of a first application corresponding to the first selectable option, and in accordance with a determination that the location of the tap input corresponds to a display position of a second selectable option in the menu, the computer system displays a user interface of a second application corresponding to the second selectable option. As shown in FIG. 7B, in response to a tap input at a location on the wrist that corresponds to a display position of the selectable option 7030-*a* (e.g., shown in FIG. 7B(A)), the computer system displays a user interface of an application corresponding to the selectable option 7030-*a* at a position in the view of the three-dimensional environment corresponding to the user's palm 7020 connected to the wrist 7028 (e.g., shown in FIG. 7B(B)).

In some embodiments, the first input that meets the preset selection criteria includes a tap input on the wrist 7028 or a preset speech input (e.g., "Activate."), while a gaze input is directed to a display position of a respective selectable option in the view of the three-dimensional environment. In accordance with a determination that the gaze input is directed to a display position of a first selectable option in the menu, the computer system displays a user interface of a first application corresponding to the first selectable option, and in accordance with a determination that the gaze input is directed to a display position of a second selectable option in the menu, the computer system displays a user interface of a second application corresponding to the second selectable option. In some embodiments, the computer system displays visual feedback to indicate which selectable option has been selected by the first input. In some embodiments, the visual feedback includes a change in the visual appearance (e.g., glow, expansion or reduction in size, movement away from its current position, etc.) of the selected selectable option in the view of the three-dimensional environment.

In some embodiments, as shown in FIG. 7B(B), the computer system displays a first view 7036 of the user interface of a first application corresponding to the selectable option 7030-*a* at a position in the view of the three-dimensional environment corresponding to a location of the user's palm 7020 connected to the wrist 7028. In some embodiments, the first view 7036 of the user interface of the first application is displayed on a three-dimensional object 7034 (e.g., on a front surface of the three-dimensional object 7034). As the hand 7020 and the wrist 7028 move together in the physical environment, the position of the representation 7020' of the hand 7020 moves in the view of the three-dimensional environment shown via the display generation component 7100, and the display position of the first view 7036 of the user interface of the first application (and the position of the object 7034) are updated to continue to correspond to the location of the palm of the hand 7020 (e.g., the first view 7036 of the user interface (and the object 7034) are locked to the position of the representation 7020' of the hand 7020 in the three-dimensional environment). In some embodiments, the object 7034 including the first view 7036 of the user interface of the first application replaces at least a portion of the view of the physical environment captured by one or more cameras of the computer system (e.g., the object 7034 replacing a portion of the view of the user's hand 7020 (e.g., replacing a portion of the representation 7020')). In some embodiments, the object 7034 including the first view 7036 of the user interface of the first application is displayed on a transparent or semi-transparent display of the computer system (e.g., a heads up display, or an HMD) through which the physical environment is visible (e.g., the object 7034 blocking a portion of the view of the user's hand 7020 (e.g., overlaying a portion of the representation 7020')). In some embodiments, the object 7034 including the first view 7036 of the user interface of the first application replaces display of a portion of a stylized version of the user's hand 7020 (e.g., replacing a portion of the representation 7020' that is a stylized version of the user's hand 7020)).

In some embodiments, the user interface 7036 of the first application includes user interface objects (e.g., user interface objects 7038 and 7040) that, when activated, cause performance of corresponding operations within the application (e.g., navigating to a different user interface of the application, changing a configuration of the application, displaying content within the application, establishing communication through the application, etc.). In some embodiments, the user interface objects in the first view 7036 of the user interface of the first application respond to gesture inputs (e.g., tap input, swipe input, press input, etc.) by another hand (e.g., the hand 7022) directed to locations on the palm of the hand 7020 that correspond to display positions of the different user interface objects (e.g., the user interface objects 7038 and 7040). In some embodiments, a magnitude of the operation that is performed in response to activation of the user interface object in the first view 7036 of the user interface (e.g., a magnitude for dragging a slider control, increasing volume, or drawing a line, moving an object, etc.) is based on a magnitude of the gesture input performed by the other hand (e.g., the hand 7022). In some embodiments, the operation is started in response to liftoff of the hand 7022 from the palm of the hand 7020.

In some embodiments, the size of the first view 7036 of the user interface of the first application relative to the three-dimensional environment (e.g., relative to the physical size of the user's hand) is selected based on the size of the user's palm or hand 7020 (e.g., the three-dimensional object 7034 displaying the user interface 7036 fits within the user's hand 7020). In some embodiments, the first view 7036 of the user interface of the first application is resizable in response to a preset resizing gesture (e.g., a pinch and drag gesture by the hand 7022 that includes a pinch gesture directed to a location that corresponds to the display position of a corner, an edge, or a resizing handle (e.g., an application identifier sticking out above a corner or edge of the three-dimensional object 7034) of the first view 7036 of the user interface or the object 7034, followed by movement of the hand 7022 away or toward the center of the palm on the hand 7020 while the pinch gesture is maintained by the hand 7022). In some embodiments, the size of the first view 7036 of the user interface of the first application (and the size of the object 7034) displayed at a position corresponding to the location of the palm is limited to a preset size range between a first maximum size and a first minimum size that are predetermined based on the size of the user's hand 7020 or an average size of a user's hand. In some embodiments, the size of the first view 7036 of the user interface of the first application (and the size of the object 7034) are adjusted in response to movement of the fingers of the hand 7020. For example, in response to the user's fingers on the hand 7020 extending outward, the computer system expands the size of the first view 7036 of the user interface of the first application relative to the three-dimensional environment; and in response to the user's fingers on the hand 7020 bending inward, the computer system reduces the size of the first view 7036 of the user interface of the first application relative to the three-dimensional environment. In some embodiments, the first views of the user interfaces of different applications optionally have different default starting sizes (e.g., different default starting sizes and dimensions relative to the same hand size). In some embodiments, the size of the first view 7036 of the user interface of the first application (and the size of the object 7034) are adjusted in response to a gesture performed by the hand 7022 on the palm of the hand 7020. For example, in response to a pinch gesture performed by the hand 7022 (e.g., thumb and index finger moving toward each other) on the palm of the hand 7020, the computer system reduces the size of the first view 7036 of the user interface of the first application relative to the three-dimensional environment (e.g., relative to the size of the hand 7020); and in response to a reverse pinch gesture performed by the hand 7020 (e.g., thumb and index finger moving away from each other) on the palm of the hand 7022, the computer system expands the size of the first view 7036 of the user interface of the first application relative to the three-dimensional environment (e.g., relative to the size of the hand 7020).

In some embodiments, as shown in FIG. 7B(B), the first view 7036 of the user interface of the first application (or the object 7034) is oriented in accordance with an orientation of a viewpoint corresponding to the current view of the three-dimensional environment (e.g., in accordance with an orientation of the user's head or face). For example, when the user tilts his/her head to the left side while facing the palm of the hand 7020 and while the hand 7020 remains stationary relative to the physical environment, the first view 7036 of the user interface (and the object 7034) remain upright on the display while the representation of the palm of the hand 7020 rotates clockwise along with other visible parts of the physical environment in the view of the three-dimensional environment; and as a result, the first view 7036 of the user interface (and the object 7034) is rotated counterclockwise relative to the representation of the palm of the hand 7028 in the view of the three-dimensional environment. In another example, while the user keeps his/her head stationary while facing the palm of the hand 7020 and rotates the hand 7020 sideways (e.g., leftward or rightward) around the wrist joint, the representation of the palm of the hand 7020 rotates sideways relative to other visible parts of the physical environment in the view of the three-dimensional environment, and relative to the first view 7036 of the user interface (and the object 7034) in the view of the three-dimensional environment.

In some embodiments, the first view 7036 of the user interface of the application (and the object 7034) are oriented in accordance with an orientation of the user's hand 7020 facing the user's head. For example, when the user tilts his/her head to the left side while facing the palm of the hand 7020 and while the hand 7020 remains stationary relative to the physical environment, the first view 7036 of the user interface (and the object 7034) rotates clockwise on the display along with the representation of the palm of the hand 7020 and other visible parts of the physical environment in the view of the three-dimensional environment; and as a result, the first view 7036 of the user interface (and the object 7034) maintain their orientation relative to the representation of the palm of the hand 7028 in the view of the three-dimensional environment. In another example, while the user keeps his/her head stationary while facing the palm of the hand 7020 and rotates the hand 7020 sideways (e.g., leftward or rightward) around the wrist joint, while other visible parts of the physical environment remains stationary in the view of the three-dimensional environment, the first view 7036 of the user interface (and the object 7034) are rotated (e.g., clockwise or counterclockwise) with the representation of the palm of the hand 7020 in the view of the three-dimensional environment.

In some embodiments, the first views of the user interfaces of different applications optionally have different default starting orientations (e.g., different default starting orientations relative to the same head orientation or hand orientation). In some embodiments, the orientation of the first view 7036 of the user interface of the first application (and the orientation of the object 7034) is adjusted in response to a gesture performed by the hand 7022 on the palm of the hand 7020. For example, in response to a pivot gesture performed by the hand 7022 (e.g., movement of thumb and/or index fingers defines a clockwise or counterclockwise rotation) on the palm of the hand 7020, the computer system rotates (e.g., clockwise, or counterclockwise) the orientation of the first view 7036 of the user interface of the first application relative to the three-dimensional environment (e.g., relative to the orientation of the hand 7020).

In some embodiments, the first view 7036 of the user interface of the first application includes a first portion of the user interface corresponding to a first function of the first application (e.g., user interface object 7038) and a second portion of the user interface corresponding to a second function of the first application (e.g., user interface object 7040). A first touch input (e.g., a double tap input, a touch-hold input, or a swipe input) detected at a location on or proximate to the palm of the hand 7020 that corresponds to the first portion of the user interface in the view of the three-dimensional environment (e.g., user interface object 7038) causes performance of the first function of the first application (e.g., starting a preview of the first media item or starting a communication session with a first user corresponding to the first contact name), and a second touch input (e.g., a double tap input, a touch-hold input, a swipe input) detected at a location on or proximate to the palm that corresponds to the second portion of the user interface in the view of the three-dimensional environment (e.g., user interface object 7040) causes performance of the second function of the first application (e.g., starting a preview of the second media item or starting a communication session with a second user corresponding to the second contact name). For a given touch input, the computer system determines which operation to perform based on which portion of the user interface corresponds to the location of the input. In some embodiments, when the first view 7036 of the user interface of the first application is displayed at the first position within the view of the three-dimensional environment that corresponds to the location of the palm, the user interface responds to user input based on a direct manipulation interaction model in which the precise location of the user input, as well as spatial and timing characteristics of the user input, such as starting location, ending location, speed of movement, distance of movement, direction of movement, intensity of contact, timing of the input or portions of the input, etc., that are detected on or proximate to the palm are mapped to the locations on the first view of the user interface and used to determine the function that is triggered and the quantitative attributes (e.g., amount and timing) of the function that is performed. For example, a counter-clock swipe on the surface of the palm causes counter-clock rotation of a user interface object in the first view 7036 of the user interface of the first application, where the user interface object is selected based on the starting location of the swipe input, and the amount and speed of rotation of the user interface object corresponds the distance and speed of the swipe on the palm.

In some embodiments, the first view 7036 of the user interface of the first application corresponds to a private mode of the user interface and/or a private mode of the first application, where the presence or content of the user interface of the application is not visible to other users viewing the same three-dimensional environment (e.g., whether from the same perspective or from a different perspective as the user that activated the first application in the three-dimensional environment). In some embodiments, the private mode of a user interface or application that is currently displayed in the three-dimensional environment is activated when the user shares the three-dimensional environment with another user. In some embodiments, the private mode is activated for the user interface or the application displayed at a position that corresponds to the user's hand 7020 when preset criteria are met (e.g., the preset criteria include a requirement that the user's palm of the hand 7020 is facing toward the user's face, or a requirement that the user's palm of the hand 7020 is not facing toward another user with whom the user 7002 is sharing the three-dimensional environment, or a requirement that the user's palm of the hand 7020 is not facing away from the user 7002, etc.). In some embodiments, by moving the user interface of the application away from the position corresponding to the user's hand to a position corresponding to another surface in the physical environment (e.g., a tabletop or wall surface), the private mode of the user interface is also terminated. More details regarding the privacy modes of the user interface of the application are provided with respect to FIGS. 7C-7G, and FIGS. 8-11, and accompanying descriptions.

Figure 7C:
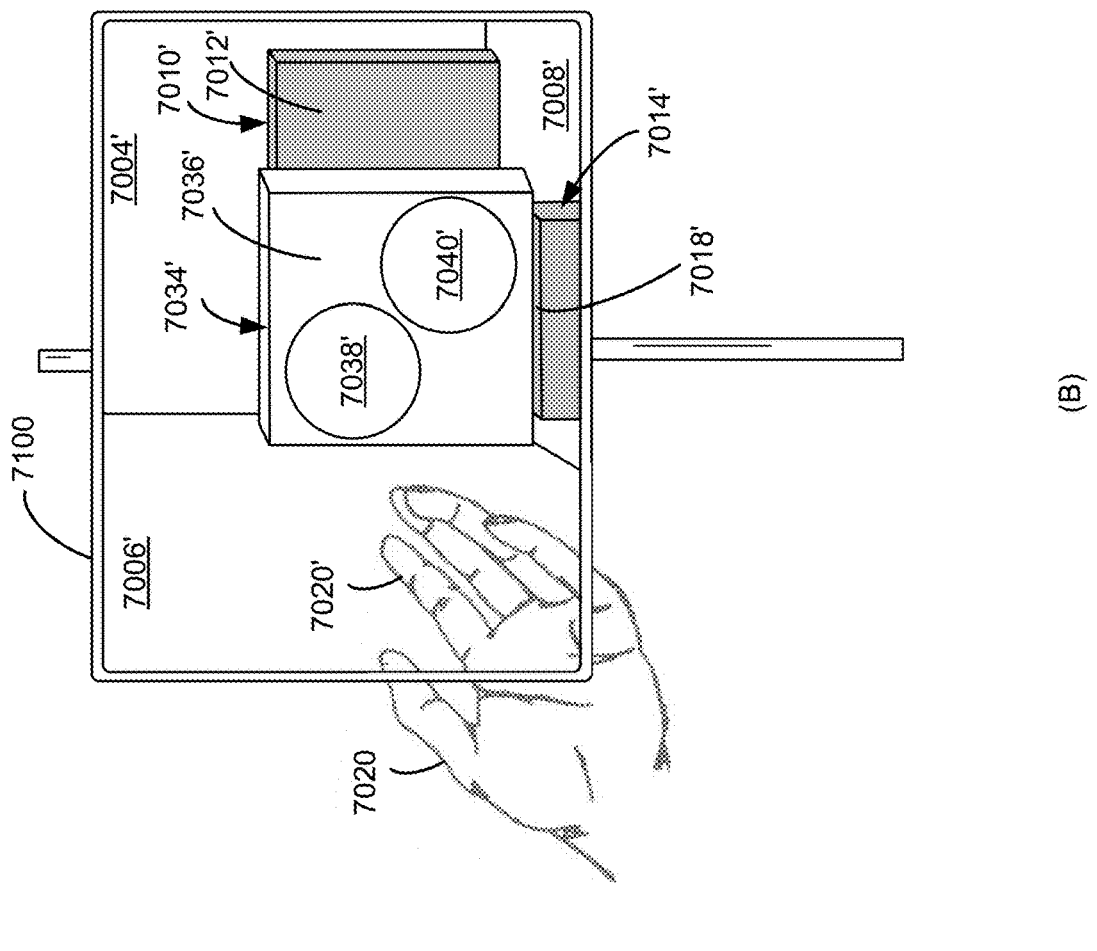
Figure 7C:
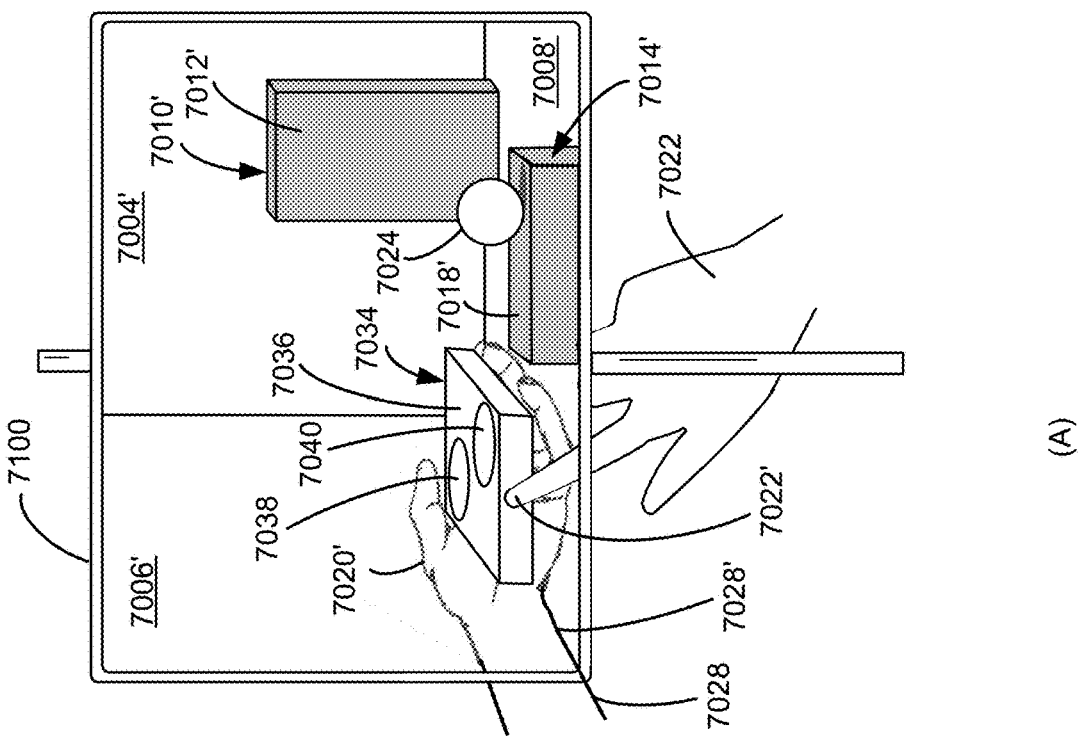

FIG. 7C(A) follows FIG. 7B(B) and illustrates that the object 7034 responds to direct manipulation by the hand 7020 in the three-dimensional environment. For example, as shown in FIG. 7C(A), the user's hand 7020 turns from facing the user 7002 (e.g., facing toward a viewpoint corresponding to a current view of the three-dimensional environment) to facing upward. The object 7034 also turns such that the front face of the object 7034 transitions from facing toward the user 7002 to facing upward. In this example, the position and orientation of the first view 7036 of the user interface and the object 7034 are locked relative to the position and orientation of the user's palm of the hand 7020. As a result, a bottom edge of the object 7034 is now facing toward the user 7002. As shown in FIG. 7C(A), while the bottom edge of the object 7034 is facing toward the user 7002, a tap input performed by the hand 7022 is detected at a location on or proximate to the hand 7020 that corresponds to the display position of the bottom edge of the object 7034 in the view of the three-dimensional environment displayed via the display generation component 7100. In response to detecting the tap input provided by the hand 7022, the computer system moves the user interface of the first application from the display position corresponding to the user's hand 7020 to a display position corresponding to another surface detected in the physical environment. In some embodiments, in accordance with the type and/or characteristics of the input detected, the computer system chooses the target surface in the physical environment and use the location of the target surface to determine the new display position of the user interface of the application (e.g., as well as the display size, interaction model, display orientation, and/or privacy mode of the user interface at the new display position). As shown in FIG. 7C(B), in response to the tap input by the hand 7022, the computer system displays a second view 7036' of the user interface of the first application at a display position that corresponds to the location of the physical object 7014. In some embodiments, as shown in FIG. 7C(B), the second view 7036' of the user interface of the first application is displayed with an upright orientation relative to the user 7002 on a front surface of a three-dimensional object 7034', where the front surface is perpendicular or approximately perpendicular to the representation 7018' of the top surface 7018 of the object 7014). In some embodiments, the second view 7036' of the user interface of the first application is displayed with an upright orientation relative to the user 7002 on a top surface of a three-dimensional object, where the top surface of the three-dimensional object is parallel or approximately parallel to the representation 7018' of the top surface 7018 of the object 7014. In some embodiments, the angle between the surface of the object that presents the second view of the user interface and the surface of the physical object that serves as the target surface for the second view of the user interface is a preset angle (e.g., 30 degrees, 70 degrees, 120 degrees, etc.) and is adjustable in accordance with subsequent user inputs.

In some embodiments, while the display generation component 7100 displays the first view 7036 of the user interface of the first application (e.g., on the front surface of the object 7034) at a position in the view of the three-dimensional environment corresponding to a location of the palm of the hand 7020, a respective input that meets predetermined mode switching criteria (e.g., criteria for displaying the user interface of the application at a different location, with a different size, with a different orientation or position lock, with a different interaction model, and/or with a different privacy setting, etc.) is detected. In the example shown in FIG. 7B(A), the respective input that meets the predetermined mode switching criteria is movement of the hand 7020 that turns of the object 7034 such that it lies flat on its back side (and optionally, release of the hand 7020 letting go of the object 7034 such that the object 7034 floats in the three-dimensional environment on its back side), followed by a tap input by the hand 7022 (or by the hand 7020 if the object 7034 is already floating in the three-dimensional environment) at a location in the physical environment that corresponds to the display position of the bottom edge of the object 7034 in the view of the three-dimensional environment.

In some embodiments, the respective input that meets the predetermined mode switching criteria is a toss or throw gesture by the hand 7020 while the hand 7020 is in an object holding posture (e.g., holding the object 7034). In some embodiments, a tap input that meets the predetermined mode switching criteria causes the user interface of the first application to be displayed at a position in the three-dimensional environment that corresponds to a horizontal and/or nearby surface in the physical environment (e.g., a tabletop or top surface 7018 of the object 7014), while a toss or throw gesture that meets the predetermined mode switching criteria causes the user interface of the application to be displayed at a position in the three-dimensional environment that corresponds to a vertical and/or far away surface (e.g., the wall 7004) in the physical environment.

In some embodiments, the respective input that meets the predetermined mode switching criteria includes a gesture input (e.g., a tap input on or near the palm of the hand 7020, a predefined micro-gesture (e.g., a thumb flick) performed by the hand 7022) or a preset speech input (e.g., "Move."), while a gaze input is directed to a representation of a target surface (e.g., representation 7018' of the horizontal surface 7018, or representation 7012' of the vertical surface 7012, representation 7004' of wall 7004, representation 7006' of wall 7006, representation 7008' of floor 7008, etc.) in the view of the three-dimensional environment provided via the display generation component 7100. In accordance with a determination that the gaze input is directed to a display position corresponding to a location of a first target surface (e.g., tabletop, floor, coffee table, monitor screen, etc.), the computer system displays the second view 7036' of the user interface of the application at a display position corresponding to the location of the first target surface, and in accordance with a determination that the gaze input is directed to a display position corresponding to a location of a second target surface (e.g., front wall, side wall, door of refrigerator, TV screen, etc.), the computer system displays the second view of the user interface of the application at a display position corresponding to the location of the second target surface. In some embodiments, the computer system displays visual feedback to indicate which target surface has been selected for the second view 7036' of the user interface of the first application. In some embodiments, the visual feedback includes a change in the visual appearance (e.g., glow, outline, dimming, etc.) of the representation of the selected target surface in the view of the three-dimensional environment.

In some embodiments, as shown in FIG. 7C(B), the computer system displays the second view 7036' of the user interface of the first application corresponding to the selectable option 7030-a at a position in the view of the three-dimensional environment corresponding to the location of the top surface 7018 of the object 7014. In some embodiments, the second view 7036' of the user interface of the first application is displayed on a three-dimensional object 7034' (e.g., on a front surface of the three-dimensional object 7034'). The size of the three-dimensional object 7034' displaying the second view 7036' of the user interface of the first application is larger than the size of the object 7034 that displays the first view 7036 of the user interface of the first application. Once placed at the display position corresponding to the location of the top surface 7018 of the object 7014, the object 7034' is locked to the representation 7018' of the top surface 7018 of the object 7014 in the three-dimensional environment (e.g., until a gesture input that meets the predetermined mode switching criteria moves it to another target surface (e.g., to wall 7004 or back to palm of the hand 7020)). As the user's head moves relative to the physical environment, the position of the representation 7018' of the top surface 7018 moves in the view of the three-dimensional environment shown via the display generation component 7100, the display position of the second view 7036' of the user interface of the first application (and the object 7034') is updated to continue to correspond to the location of the top surface 7018 of the object 7014 (e.g., the second view 7036' of the user interface (and the object 7034') are locked to the position of the representation 7018' of the top surface 7018).

In some embodiments, the object 7034' including the second view 7036' of the user interface of the first application replaces at least a portion of the view of the physical environment captured by one or more cameras of the computer system (e.g., replacing a portion of the view of the top surface 7018 (e.g., the object 7034' replacing a portion of the representation 7018'), replacing a portion of the view of the object 7010 (e.g., replacing a portion of the representation 7010'), and replacing a portion of the view of the wall 7004 (e.g., replacing a portion of the representation 7004')). In some embodiments, the object 7034' including the second view of the user interface is displayed on a transparent or semi-transparent display of the computer system (e.g., a heads up display, or an HMD) through which the physical environment is visible (e.g., the object 7034' blocking a portion of the view of the top surface 7018 (e.g., overlaying a portion of the representation 7018'), blocking a portion of the view of the object 7010 (e.g., overlaying a portion of the representation 7010'), and blocking a portion of the view of the wall 7004 (e.g., overlaying a portion of the representation 7004')). In some embodiments, the object 7034' including the second view 7036' of the user interface replaces display of a portion of the three-dimensional environment that includes other virtual objects (e.g., the object 7034' replacing the virtual object 7024 previously displayed on representation 7018' of the top surface 7018).

In some embodiments, the computer system displays an animated transition showing the object 7034 moving from the position corresponding to the user's palm to the position corresponding to the target surface 7018, increasing in size from a first size to a second size, and transforming into the object 7034' displaying the second view 7036' of the user interface. In some embodiments, an indicator (e.g., an identifier of the first application) is displayed at a position corresponding to the user's hand 7020 to indicate to the user 7002 that the user interface of the first application has been sent to a different display location away from the hand 7020.

In some embodiments, the second view 7036' of the user interface of the first application includes the user interface objects (e.g., user interface objects 7038' and 7040' corresponding to user interface objects 7038 and 7040) that, when activated, cause performance of corresponding operations within the first application (e.g., navigating to a different user interface of the application, changing a configuration of the application, displaying content within the application, establishing communication through the application, etc.). In some embodiments, the user interface objects in the second view 7036' of the user interface of the first application respond to gesture inputs (e.g., tap input, swipe input, press input, etc.) directed to locations on or near the top surface 7018 that correspond to display locations of the different user interface objects (e.g., user interface objects 7038' and 7040'). In some embodiments, the user's gaze input is used to select the target user interface object in the second view 7036' of the user interface and the gesture input in combination with the selected target user interface object is used to determine which operation of the target user interface object is to be performed. In some embodiments, a magnitude of the operation that is performed in response to activation of the user interface object in the second view 7036' of the user interface (e.g., a magnitude for dragging a slider control, increasing volume, or drawing a line, moving an object, etc.) is based on a magnitude of the gesture input performed by the user, while the gaze input is directed to the second view 7036' of the user interface of the first application.

In some embodiments, the size of the second view 7036' of the user interface of the first application relative to the three-dimensional environment (e.g., relative to the physical size of the target surface) is selected based on the size of the target surface (e.g., the surface 7018, or the surface 7012) for placing the second view 7036' of the user interface of the first application. For example, the size of the object (e.g., the object 7034') relative to the three-dimensional environment (e.g., as opposed to the size of the object 7034' on the display which changes depending on the viewing distance and viewing angle) is larger for a first target surface (e.g., a desktop) than it is for a second target surface (e.g., a display screen) if the first target surface is larger than the second target surface. In some embodiments, the size of the second view 7036' of the user interface of the first application relative to the three-dimensional environment is selected based on the distance between the target surface (e.g., surface 7018, or surface 7004, or surface 7012) from the user 7002. For example, the size of the object for displaying the second view of the user interface relative to the three-dimensional environment is larger for a first target surface (e.g., surface 7012) than it is for a second target surface (e.g., surface 7018) if the first target surface is farther away from the user (e.g., user 7002) than the second target surface. In some embodiments, the size of the second view 7036' of the user interface of the first application relative to the three-dimensional environment is preset according to the type of surface (e.g., horizontal surface vs. vertical surface, object surface vs. wall surface, etc.) of the target surface, and does not change based on different sizes or different distances of the target surfaces for a given surface type.

In some embodiments, the second view 7036' of the user interface of the first application is resizable in response to a preset resizing gesture (e.g., a pinch and drag gesture by the hand 7022 that includes a pinch gesture directed to a location that corresponds to the display position of a corner, an edge, or a resizing handle (e.g., an application identifier sticking out above a corner or edge of the three-dimensional object 7034) of the user interface or object 7034', followed by movement of hand 7022 away or toward the center of the front surface of the object 7034' while the pinch gesture is maintained by the hand 7022). In some embodiments, the size of the second view 7036' of the user interface of the first application (and the size of the object 7034') displayed at a position corresponding to the location of a target surface (e.g., the surface 7018, or the surface 7012) is limited to a preset size range between a second maximum size and a second minimum size that are predetermined based on the size of the target surface (e.g., the surface 7018, or the surface 7012). In some embodiments, the size of the second view 7036' of the user interface of the first application (and the size of the object 7034') is adjusted in response to relative movement of the hand 7020 and the hand 7022 (e.g., while both hands maintain a pinch gesture). For example, in response to the user's two hands moving apart from each other, the computer system expands the size of the second view 7036' of the user interface of the first application relative to the three-dimensional environment; and in response to the user's two hands moving toward each other, the computer system reduces the size of the second view 7036' of the user interface of the application relative to the three-dimensional environment. In some embodiments, the second views of the user interfaces of different applications optionally have different default starting sizes (e.g., different default starting sizes and dimensions relative to the same target surface).

In some embodiments, as shown in FIG. 7C(B), the second view 7036' of the user interface of the first application (and the object 7034') are oriented in accordance with an orientation of the target surface in the current view of the three-dimensional environment (e.g., in accordance with whether the target surface is horizontal or vertical or some other orientation that is at an angle relative to the horizontal plane or the vertical plane of the physical environment). In some embodiments, the second view 7036' of the user interface is displayed facing the user in an upright orientation and perpendicular to a horizontal target surface (e.g., surface 7018). In some embodiments, when the user walks around the horizontal target surface in the physical environment, the second view 7036' of the user interface optionally rotates around a vertical axis passing through the horizontal target surface, such that the second view 7036' of the user interface remains perpendicular to the horizontal target surface and continues to face toward the user (or toward a viewpoint corresponding to the view of the three-dimensional environment). In some embodiments, the second view 7036' of the user interface is displayed substantially parallel to a horizontal target surface (e.g., the surface 7018) or with its top edge slightly tilted up from the horizontal target surface. In some embodiments, when the user walks around the horizontal target surface, the second view 7036' of the user interface optionally rotates around a vertical axis passing through the horizontal target surface, such that the second view 7036' of the user interface remains parallel or slightly tilted up from the horizontal target surface and continues to face the user with the same upright orientation (e.g., content runs from top to bottom of the user interface in a direction pointing toward the user). In another example, the orientation of the second view 7036' of the user interface of the first application is fixed relative to the target surface and does not change when the user walks around the target surface (e.g., user's view of the second view of the user interface will change when the user walks around the target surface). When the target surface rotates or moves in the physical environment, the orientation and position of the second view 7036 of the user interface of the application is fixed relative to the target surface in the view of the three-dimensional environment.

In some embodiments, the second views of the user interfaces of different applications optionally have different default starting orientations (e.g., different default starting orientations relative to the same user location or target surface orientation). In some embodiments, the orientation of the second view 7036' of the user interface of the first application (and the orientation of the object 7034') are adjusted in response to a gesture performed by the hand 7022, or the hand 7020, or both together. In some embodiments, when the second view 7036' of the user interface is placed in a plane parallel to a horizontal target surface, the second view 7036' of the user interface is optionally rotated upward and downward around its bottom edge or around a horizontal axis embedded in the plane of the user interface, in response to a first predefined rotational gesture (e.g., hand(s) pulling or pushing in the air in front of the user 7002). For example, the user can adjust the viewing angle of the second view 7036' of the user interface slightly to make the top of the user interface tilt upward toward the user 7002.

In some embodiments, when the second view 7036' of the user interface is placed in a plane parallel to a horizontal target surface, the second view 7036' of the user interface is optionally rotated clockwise or counterclockwise around a vertical axis that is perpendicular to the horizontal target surface and passing through the center of the second view of the user interface, in response to a second predefined rotational gesture (e.g., a pivot gesture performed by a hand (e.g., movement of thumb and/or index finger defines a clockwise or counterclockwise rotation)). For example, the user can rotate the second view of the user interface to make the user interface easier to read to another user that is sharing the same three-dimensional environment and viewing the target surface from an opposite side across from the user 7002.

In some embodiments, when the second view 7036' of the user interface is placed in a plane perpendicular to a horizontal target surface, the second view 7036' of the user interface is optionally rotated forward and backward around its bottom edge (e.g., bottom edge of the object 7034') in response to a third predefined rotational gesture (e.g., hand(s) pulling or pushing in the air in front of the user). For example, the user can adjust the viewing angle of the second view of the user interface slightly to make the top of the user interface tilt backward away from the user.

In some embodiments, when the second view 7036' of the user interface is placed in a plane perpendicular or substantially perpendicular to a horizontal or substantially horizontal target surface, the second view of the user interface is optionally rotated clockwise or counterclockwise around an axis that is perpendicular to the horizontal target surface and embedded in the plane of the second view of the user interface in response to a fourth predefined rotational gesture (e.g., a pivot gesture performed by a hand (e.g., movement of thumb and/or index finger defines a clockwise or counterclockwise rotation)). For example, the user can rotate the user interface to make the user interface easier to read to another user that is sharing the same three-dimensional environment and viewing the target surface from an opposite side across from the user 7002.

In some embodiments, when the second view of the user interface is placed in a plane perpendicular to a horizontal target surface, the second view of the user interface is optionally rotated clockwise or counterclockwise around an axis that is parallel to the horizontal target surface and passing through the plane of the second view of the user interface, in response to a sixth predefined rotational gesture (e.g., a rotation of the whole hand around an axis passing through the arm).

In some embodiments, the target surface is a vertical surface, and the second view of the user interface is placed parallel to the vertical target surface. In some embodiments, the second view of the user interface is optionally tilted forward toward the user or rotated around an axis that is perpendicular to the vertical target surface and passing through the center of the user interface in response to different predefined rotational gestures.

In some embodiments, the second view 7036' of the user interface of the first application corresponds to a semi-private display mode where the presence or content of the user interface of the application is partially visible to other users viewing the same three-dimensional environment from the same perspective or from a different perspective. In some embodiments, when the second view of the user interface is already displayed in the view of the three-dimensional environment provided via the display generation component used by the user who activated the first application, the semi-private display mode is activated when the user shares the three-dimensional environment with another user. In some embodiments, the semi-private display mode is activated for the second view of the user interface of the first application when preset criteria are met (e.g., the preset criteria includes a requirement that the user interface is not displayed at a position corresponding to the user's palm and a requirement that the user interface is displayed at a surface that is within a preset distance from the user (e.g., an arm's length), etc.). More details regarding the privacy modes of the user interface of the application are provided with respect to FIGS. 7B, and 7D-7G, and FIGS. 8-11, and accompanying descriptions.

In some embodiments, while the second view 7036' of the user interface of the first application is displayed at a target surface (e.g., the horizontal surface 7018 in FIG. 7C (B)) that is within a threshold distance of the user and/or that is horizontal surface, another gesture meeting a second set of predetermined mode switching criteria (e.g., criteria for displaying the user interface of the application at a different location, with a different size, with a different orientation or position lock, with a different interaction model, and/or with a different privacy setting, etc.) is detected. In response to the input that meets the second set of predetermined mode switching criteria, the computer system displays a third view of the user interface of the application at a position that corresponds to a different target surface (e.g., wall 7004, wall 7006, etc.) and with a different size, a different orientation or position lock, a different interaction model, and/or a different privacy setting, etc.

In some embodiments, the respective input that meets the predetermined second set of mode switching criteria is a toss or throw gesture by a hand (e.g., the hand 7020 or 7022) in the direction of the target surface (e.g., wall 7004 or wall 7006) for the third view of the user interface, while the first view 7036 of the user interface is displayed at a position corresponding to the user's palm or while the second view 7036' of the user interface is displayed at a position corresponding to a nearby and/or horizontal surface. In some embodiments, the respective input that meets the second set of mode switching criteria includes a gesture input (e.g., a toss/throw input by a hand (e.g., the hand 7020 or 7022), a predefined micro-gesture (e.g., a thumb flick) performed by a hand (e.g., the hand 7020 or 7022)) or a preset speech input (e.g., "Move."), while a gaze input is directed to a representation of a target surface (e.g., representation 7004' of wall 7004, representation 7006' of wall 7006, representation 7008' of floor 7008, etc.) in the view of the three-dimensional environment. In accordance with a determination that the gaze input is directed to a display position of a first target surface (e.g., front wall, TV screen, etc.), the computer system displays the third view of the user interface of the application at a display position corresponding to the location of the third target surface, and in accordance with a determination that the gaze input is directed to a display position of a fourth target surface (e.g., side wall, floor, etc.), the computer system displays the third view of the user interface of the application at a display position corresponding to the location of the fourth target surface. In some embodiments, the computer system displays visual feedback to indicate which target surface has been selected for the third view of the user interface. In some embodiments, the visual feedback includes a change in the visual appearance (e.g., glow, outline, dimming, etc.) of the representation of the selected target surface in the view of the three-dimensional environment. In some embodiments, the third view of the user interface of the application is displayed with a third size that is different from (e.g., larger or smaller) than the size of the second view 7036' of the user interface displayed at a position corresponding to a nearby surface to the user, and the size of the first view 7036 of the user interface displayed at a position corresponding to the user's palm. In some embodiments, the third view of the user interface is associated with a public mode, and is fully visible to all users that share the views of the three-dimensional environment using different display generation components of different computer systems.

In some embodiments, the computer system, in response to a respective input that meets preset recall gesture criteria that is detected while the second view of the user interface or the third view of the user interface is displayed at a display position corresponding to a target surface that is separate from the palm of the user's hand, moves the user interface back from the target surface (e.g., ceasing to display the second view of the user interface at the position corresponding to the horizontal surface 7018, ceasing to display the second or third view of the user interface at the position corresponding to the vertical surface 7012, or ceasing to display the third view of the user interface at the position corresponding to the wall 7004) to the user's palm (e.g., restoring the first view of the user interface at the position corresponding to the user's palm (e.g., the open palm of the hand 7020, or the open palm of the hand 7022)). In some embodiments, the preset recall gesture criteria include a requirement that is met when a gaze input directed to the currently displayed second or third view of the user interface of the application is detected (e.g., gaze is directed to the position corresponding to the target surface at which the user interface is currently displayed) in conjunction with (e.g., concurrently with, or immediately preceding or succeeding (e.g., within a preset time window of)) a preset gesture input (e.g., a wave of the hand or finger toward the user, an in air pinch gesture (e.g., three or more fingers of the same hand moving toward each other)) or voice command ("Return.").

In some embodiments, the second view (and optionally the first view) of the user interface of the first application presents content through a three-dimensional object (e.g., object 7034 or object 7034') that is subject to spatial manipulation in the three-dimensional environment (e.g., the three-dimensional object is a 3D or pseudo-3D model of a geographic location for a maps application that can be rotated and zoomed by the movement of the user's hands, an address book in the form of a physical book with pages that can be flipped through by the user, or a pop-up calendar that can be browsed by the user's hand, etc.), and the third view of the user interface of the first application presents content through a media-playback region defined by the target surface (e.g., the media-playback region is a virtual screen defined by the wall 7004, and user interface is displayed as a content consumption user interface, like a movie or TV program selection and playback user interface).

In some embodiments, the computer system selects different sizes for the user interface of the first application based on the characteristics of the target surface at which the user interface will be displayed. In some embodiments, the computer system selects a size of the second view of the user interface of the first application relative to the physical environment (e.g., the intrinsic size of the user interface relative to the size of the physical environment, as opposed to the displayed size which varies depending on the location of the viewpoint of the user) in accordance with a first set of characteristics of a first target surface (e.g., size, distance away from the user, etc. of the tabletop or surface 7018); and the computer system selects a size of the third view of the user interface of the first application relative to the physical environment (e.g., the intrinsic size of the user interface relative to the size of the physical environment, as opposed to the displayed size which varies depending on the location of the viewpoint of the user) in accordance with a second set of characteristics of a second target surface (e.g., size, distance away from the user, etc., of the wall or surface 7004).

In some embodiments, the different views of the user interface of the first application displayed at positions corresponding to different target surfaces correspond to different privacy modes. For example, the first view of the user interface displayed at a position corresponding to the location of the user's palm corresponds to a private mode, the second view of the user interface displayed at a position corresponding to the location of a nearby surface (e.g., a tabletop or surface 7018) corresponds to a semi-private mode, and the third view of the user interface displayed at a position corresponding to the location of a faraway surface (e.g., a wall or surface 7004) corresponds to a non-private mode or public mode. In some embodiments, the user interface of the application corresponding to different privacy modes have different content (e.g., content of two views of the same user interface are completely different, or partially different (e.g., including some common content and some distinct content; one including a subset of the content of the other; or including a superset of the content of the other)). In some embodiments, the content of the second view of the user interface includes redaction of at least some portions of the content of the first view of the user interface, and optionally includes summaries or reduced versions of some portions of the content of the first view of the user interface that have been redacted; or the content of the second view of the user interface includes augmentation of the content of the first view of the user interface or additional content. In some embodiments, the content of the third view of the user interface includes redaction of at least some portions of the content of the first view and/or the content of the second view, and optionally includes summaries or reduced versions of some portions of the content of the first view and/or the second view that have been redacted; or the content of the third view includes augmentation of the content of the first view and/or the second view or additional content beyond the content of the first view and/or second view.

In some embodiments, the user interface of the application have different forms and interaction models when displayed as different views of the user interface at positions corresponding to different target surfaces (e.g., the user's palm, a nearby tabletop or surface 7018, or a faraway wall 7004).

In some embodiments, the first view of the user interface of the first application (e.g., displayed at a position corresponding to the user's palm) is a 2D user interface displayed on a flat surface of a virtual object (e.g., a front surface of the object 7034), and the 2D user interface responds to gesture inputs that involves finger movement on or near the palm (e.g., a tap input includes touch-down of a finger of another hand on a portion of the palm optionally followed by lift-off of the finger from the portion of the palm within a threshold amount of time; a double tap input includes two consecutive tap inputs performed by the same finger on approximately the same portion of the palm with a duration between the two tap inputs being less than a threshold amount of time; a drag or swipe input includes touch-down of a finger (or two-fingers side-by-side) on a portion of the palm followed by movement of the finger(s) across a surface of the palm to another portion of the palm, optionally followed by lift-off of the finger(s) from the palm after the movement of the finger(s) across the palm; a pinch input includes movement of two fingers toward each other while the two fingers maintain contact with the palm; a depinch input includes movement of two fingers away from each other while the two fingers maintain contact with the palm; etc.)). In some embodiments, the location of the finger contact on the palm by another hand, the duration and timing of the finger contact and/or lift-off of the finger contact on the palm, the speed of movement of the finger(s) across the palm, the number of fingers making contact with the palm, etc. are characteristics of the input that are used to determine the function that is performed within the application according to the first user interaction model, and/or the manner the function is performed (e.g., timing, amount, speed, etc.).

In some embodiments, the second view of the user interface of the first application (e.g., displayed at a position corresponding to a tabletop) is a 3D user interface displayed upright on a surface substantially perpendicular to the horizontal tabletop, with user interface objects displayed at different depths from the user), and the 3D user interface responds to gaze input in conjunction with finger gesture inputs provided by a finger raised in the air or micro-gestures with one part of the hand (e.g., first finger) moving relative to another part (e.g., second finger or palm) of the same hand).

In some embodiments, the third view of the user interface of the first application (e.g., displayed on a wall or floating in empty space) is a media playback or media consumption user interface, and the media consumption user interface responds to in air gestures of the whole hand or micro-gestures, optionally in conjunction with gaze input. In some embodiments, in-air finger gestures include an air tap input (e.g., movement of the index finger from a raise position toward the palm side of the hand, without the finger touching the palm or other parts of the hand, or movement of the wrist that causes the hand to move from a raise posture to a lowered posture, while one or more fingers of the hand remain extended or raised during the movement of the wrist), a double air tap input (e.g., two consecutive air tap inputs that are separated by a duration that is less than a threshold amount of time), an air drag or swipe input (e.g., movement of the whole hand in the air with one or more fingers of the hand raised or extended out from the palm of the hand), etc.). In some embodiments, micro-gestures are gestures performed by a single hand (e.g., with one part of the hand moving or touching another part of the same hand, while the hand is optionally raised from the user's body)). In some embodiments, micro-gestures include a micro-tap input (e.g., the finger tip of a first finger of a hand moves towards and touches down on a portion of another finger of the same hand, or the palm of the same hand, optionally followed by lift-off of the finger tip from the touch-down location), a micro-double-tap input (e.g., two consecutive micro-tap inputs performed by the same first finger on the same portion of the same first hand, with the duration between the two micro-tap inputs less than a threshold amount of time), a micro-drag or micro-swipe input (e.g., movement of a first finger on the surface of a second finger of the same hand in a respective direction (e.g., along the side of the second finger, or across the second finger from the same of the palm toward the back of the hand)), a micro-flick input (e.g., movement of a first finger relative to a second finger of the same hand in a respective direction away from the second finger (e.g., a upward flick, a forward flick, an inward flick, etc.)). In some embodiments, the finger (e.g., thumb vs. index finger, etc.) that performs the micro-gesture, the duration and timing of the finger contact and/or lift-off of the finger contact on the same hand, the location of the finger contact on the same hand (e.g., position on the second finger of the same hand or position on the palm of the same hand), the speed of movement of the finger(s) across the other finger or palm of the same hand, etc. are characteristics of the input that are used to determine the function that is performed within the first application according to the third user interaction model, and/or the manner the function is performed (e.g., timing, amount, speed, etc.). In some embodiments, an in-air gesture performed by movement of the whole hand (e.g., wrist movement with and/or without arm movement) is used to perform operations within the third form of the first application in accordance with the third user interaction model. The in-air gesture of the whole hand includes an open hand wave input (e.g., whole hand moving upward, downward, toward the user, away from the user, sideways in front of the user, etc., with the palm open and fingers extended), a closed hand wave input (e.g., whole hand in a first moving upward, downward, away from the user, toward the user, or sideways in front of the user, etc.), a palm opening input (e.g., all fingers moving in union from a retracted state to an extended state), a palm closing input (e.g., all fingers moving in union from an extended state to a retracted state), a push input (e.g., with the palm open and moving away from the user), a pull input (e.g., with the palm open and moving toward the user), a point input (e.g., moving the whole hand toward a target direction with the index finger raised), etc. In some embodiments, a gaze input is used to select the target of the input, and the in-air hand gesture is used to select the operation that is performed with respect to the target in the third form of the first application. In some embodiments, characteristics such as the speed, duration, timing, direction, and amount of the movement of the hand are used to determine the characteristics (e.g., direction, amount, speed, etc.) of the manner by which the operation is performed.

Figure 7D:
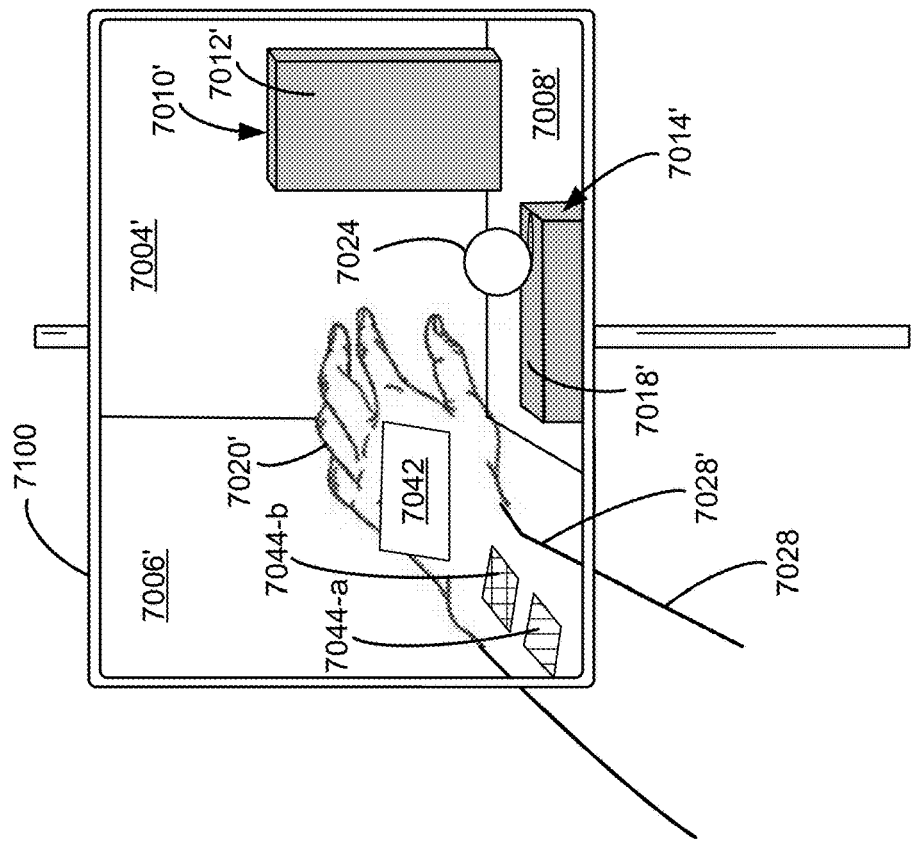
Figure 7D:
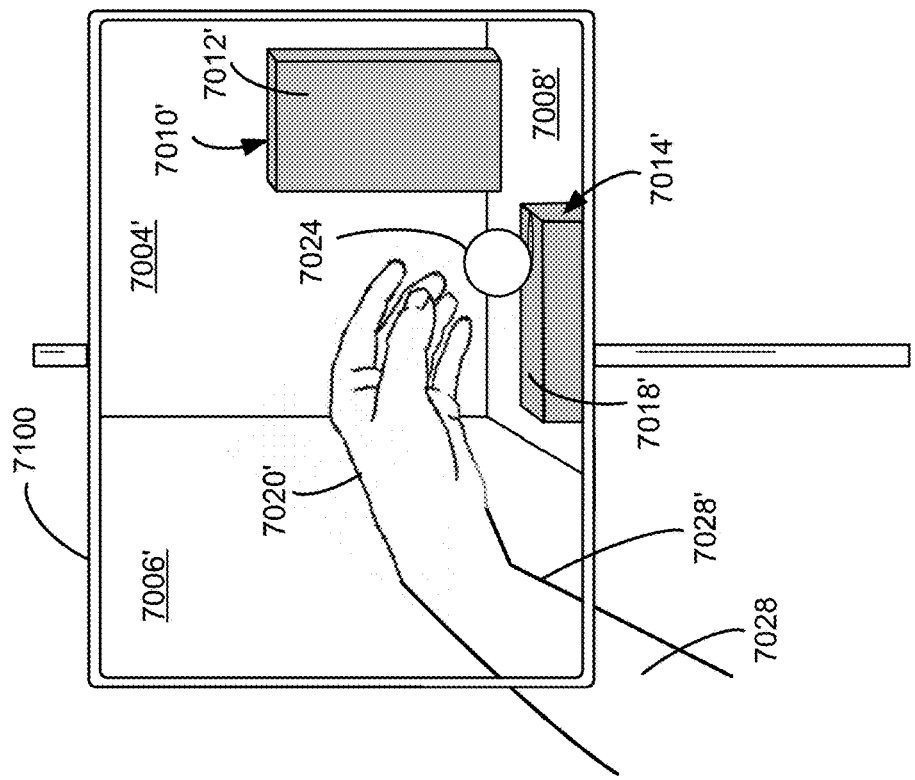
Figure 7E:
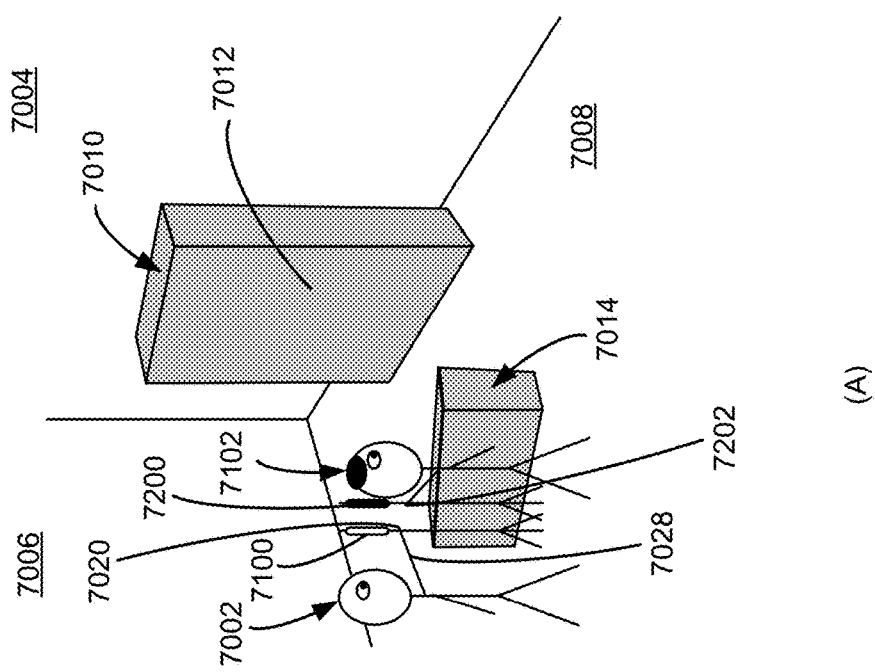
FIGS. 7E-7G are block diagrams illustrating privacy control in a shared computer-generated three-dimensional environment (e.g., including controlling privacy of an application in the shared computer-generated three-dimensional environment based on an owner's hand posture and/or display location of the application), in accordance with some embodiments.
Figure 7F:
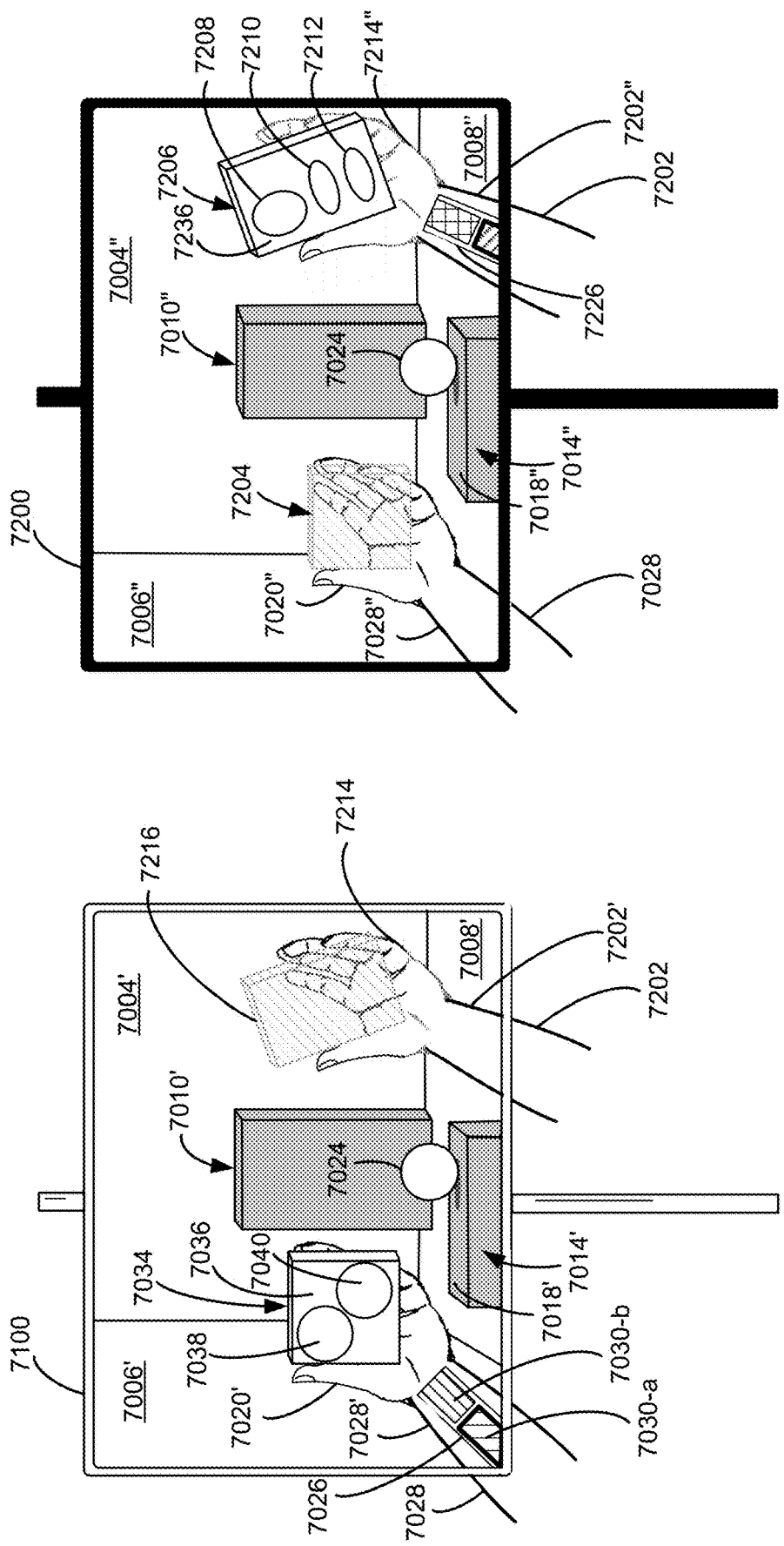
Figure 7G:
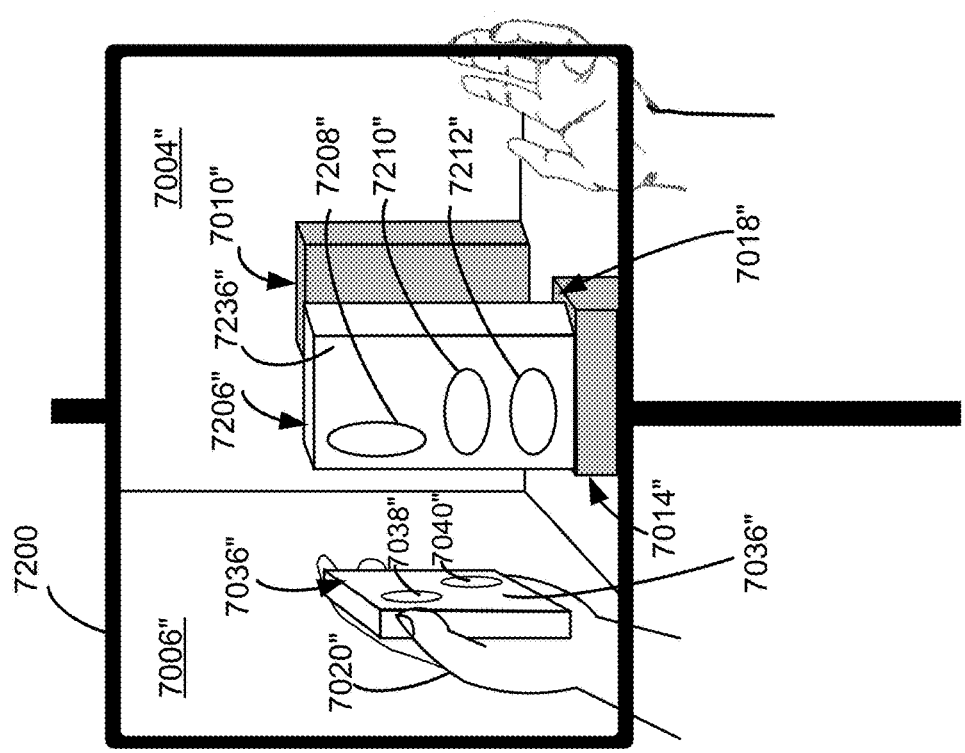
Figure 7G:
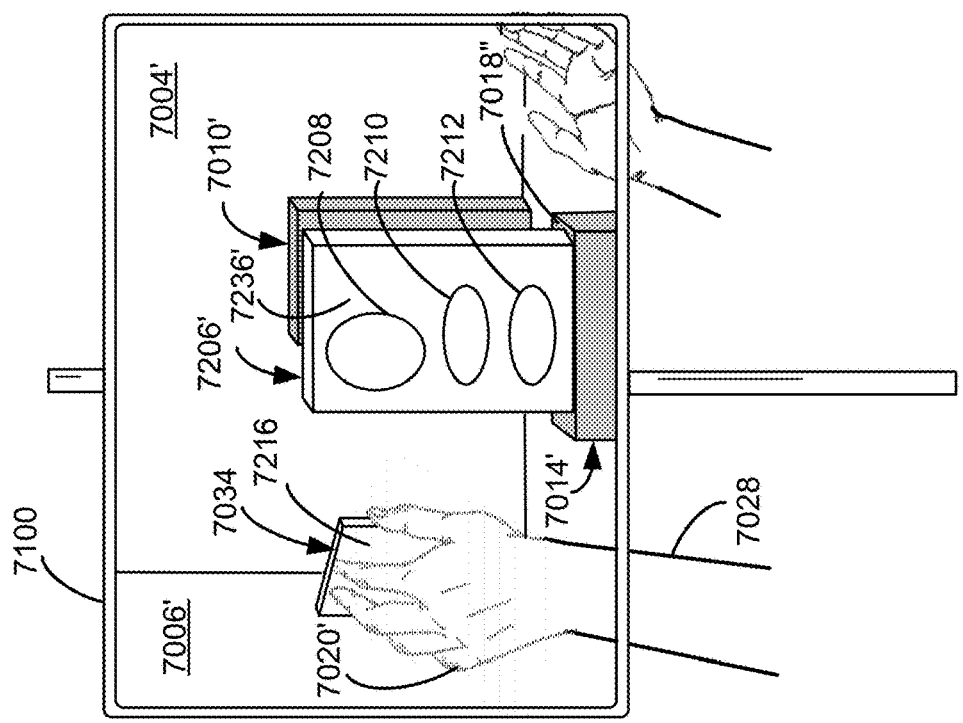

FIG. 7D(A) optionally follows FIG. 7A(B) or FIG. 8B(B). FIGS. 7A-7B illustrate that, while the inner side of the user's wrist (e.g., the wrist 7028) is facing toward the user (e.g., facing a viewpoint corresponding to the currently displayed view of the three-dimensional environment provided via the display generation component 7100) and thereby meeting first predefined criteria, the computer system displays, via the display generation component (e.g., display generation component 7100), a menu including selectable options corresponding to different applications (e.g., menu 7026 including selectable options 7030) at positions corresponding to the inner side of the user's wrist (e.g., wrist 7028), and/or displays a first view of the user interface of the application corresponding to an activated selectable option (e.g., selectable option 7030-*a*) at a position corresponding to the user's palm (e.g., the palm of the hand 7020) connected to the wrist (e.g., the wrist 7028). FIG. 7D(A) illustrates that, when the wrist 7028 is turned such that neither the inner side of the wrist 7028 nor the outer side of the wrist 7028 is facing toward the user 7002 (e.g., facing a viewpoint corresponding to the currently displayed view of the three-dimensional environment), the menu containing the plurality of selectable options corresponding to the different applications (e.g., the menu 7026 including the selectable options 7030) ceases to be displayed, and the view of the wrist 7028 is not blocked by the menu 7026 anymore. In addition, if the first view of a user interface of an application corresponding to an activated selectable option (e.g., selectable option 7030-*a*) was displayed at a position corresponding to the user's palm (e.g., the palm of the hand 7020) connected to the wrist (e.g., the wrist 7028), when the wrist is turned such that neither the inner side of the wrist nor the outer side of the wrist is facing toward the user (e.g., facing a viewpoint corresponding to the currently displayed view of the three-dimensional environment), the first view of the user interface of the application also ceases to be displayed. In some embodiments, the first view of the user interface of the application and the menu of selectable options only cease to be displayed when the inner side of the wrist and the palm are facing downward toward the floor (e.g., the user can turn the palm and inner side of the wrist toward another user to share the first view of the user interface with another user in the three-dimensional environment, as described with respect to FIG. 7G, for example).

As shown in FIG. 7D(B), when the wrist 7028 has turned further, the outer side of the user's wrist (e.g., the wrist 7028) is now facing toward the user 7002 (e.g., facing a viewpoint corresponding to the currently displayed view of the three-dimensional environment) and thereby meeting second predefined criteria, the computer system displays, via the display generation component (e.g., display generation component 7100), a user interface object 7042 that includes a plurality of controls for controlling functions (e.g., volume, ringer, network connectivity, battery, airplane mode, display brightness, and media playback controls (e.g., play, rewind, fast forward, pause, stop, etc.) etc.) for the computer system, at a position within the view of the three-dimensional environment that corresponds to a location on a back of the hand (e.g., the hand 7020) that is attached to the wrist (e.g., the wrist 7028). In some embodiments, the computer system also displays one or more user interface objects (e.g., controls, status indicators, or notifications 7044-*a*, 7044-*b*, as opposed to application icons) on the outer side of the user's wrist (e.g., the wrist 7028). In some embodiments, when controls are displayed at positions corresponding to the back side of the user's hand and wrist, application icons and application user interfaces are not concurrently displayed at positions in the three-dimensional environment that correspond to the locations of the user's hand and wrist. Similarly, when application icons and application user interfaces are displayed at positions corresponding to the inner side of the user's hand and wrist, controls, status indicators, and notifications are not concurrently displayed at positions in the three-dimensional environment that correspond to the locations of the user's hand and wrist. In some embodiments, when the user turns the wrist again such that the inner side of the wrist faces toward the user 7002 again, the previously displayed menu 7026 containing selectable options 7030 corresponding to different applications and/or the first view 7036 of a user interface of an application corresponding to a selected selectable option from the menu 7026 are restored to their original positions corresponding to the locations of the user's inner side of the wrist and the user's palm, respectively; and the controls 7044 and user interface object 7042 ceases to be displayed.

In some embodiments, when the outer side of the user's wrist (e.g., the wrist 7028) is facing toward the user (e.g., facing a viewpoint corresponding to the currently displayed view of the three-dimensional environment) and thereby meeting the second predefined criteria, the computer system displays, via the display generation component (e.g., display generation component 7100), one or more notifications corresponding to one or more applications at a position (e.g., distinct from the position for displaying the user interface object 7042 and the controls 7044) within the view of the three-dimensional environment that corresponds to a location on the back of the hand (e.g., the hand 7020) that is attached to the wrist (e.g., the wrist 7028) (e.g., the one or more notifications appear to overlay or replace display of a portion of the back of the hand 7020 (e.g., notifications replacing or blocking a portion of representation 7020'), while the plurality of controls appear to overlay or replace display of another portion of the back of the hand (e.g., controls replacing or blocking another portion of representation 7020')).

In some embodiments, while displaying the plurality of controls for controlling functions for the computer system at a position that corresponds to the location on the back of the hand (e.g., the hand 7020), the computer system displays one or more notifications corresponding to one or more applications at a position that corresponds to a location on a back side of the wrist, wherein the notifications are scrollable along the length of the arm or around the wrist.

In some embodiments, the positions and orientations of the controls and/or notifications are fixed relative to the position and orientation of the hand and wrist while the back of the wrist and hand is facing the user. Accordingly, when the user's rotates his/her hand or wrist (e.g., around the elbow or around the wrist joint) while keeping the back of the hand and wrist facing toward the user, the controls and/or notifications move on the display to maintain their fixed positions and orientations relative to the back of the user's hand and wrist.

In some embodiments, the positions of the controls and/or notifications are fixed relative to the back of the user's hand and wrist, but the orientations of the controls and/or notifications are fixed relative to the user's gaze. As a result, the controls and/or notifications move laterally in the view of the three-dimensional environment when the user's hand and wrist move laterally relative to the physical environment and the user's head, to maintain the fixed positions of the controls and/or notifications relative to representations of the user's hand and wrist in the view of the three-dimensional environment. In addition, the controls and/or notifications maintain their orientation relative to the user's gaze (e.g., the controls and/or notifications remain upright relative to the user's gaze, even though back of the user's hand and wrist has rotated clockwise or counterclockwise while facing the user).

In some embodiments, the computer system displays an affordance (e.g., a "+" button) at a position in the view of the three-dimensional environment corresponding to the back of the user's hand or the back of the user's wrist (e.g., wrist 7028), where the affordance, when activated (e.g., by a tap input directed to a portion of the wrist that corresponds to a position of the affordance in the view of the three-dimensional environment), causes display of a user interface for selecting at least one application (or a place, an experience, or a person) for which a representation is to be added to the user interface object (e.g., user interface object 7042) displayed at a position corresponding to the back of the user's hand or the back of the user's wrist.

In some embodiments, while displaying the menu 7026 of selectable options (e.g., menu 7026) at the position within the view of the three-dimensional environment that corresponds to the location on the inner side of the wrist 7028, the computer system detects a gesture on or proximate to the inner side of the wrist 7028 at a location that corresponds to the position of the menu 7026 in the view of the three-dimensional environment (e.g., the gesture is a flick gesture on the wrist 7028). In response to detecting the gesture on or proximate to the inner side of the wrist 7028 at the location that corresponds to the respective position of the menu 7026 in the view of the three-dimensional environment, the computer system displays the menu 7026 of selectable options (or a three-dimensional version of the menu) in the view of the three-dimensional environment at a position that is independent of the location of the wrist (e.g., displaying the plurality of selectable options in a dock in the space in the center of the field of view of the display generation component, and the user can interact with the representations in the dock by using air gestures, or using gaze in conjunction with micro-gestures, etc.). In some embodiments, a similar interaction is implemented for the controls and notifications displayed in the view of the three-dimensional environment at positions corresponding to the back of the user's hand and wrist when the back of the user's hand and wrist is facing toward the user. In response to a predefined gesture input on or proximate to the outer side of the wrist or hand at a location that corresponds to the position of the controls and/or notifications in the view of the three-dimensional environment (e.g., the gesture is a flick gesture on the back of the hand or wrist), the computer system displays the controls and/or notifications in the view of the three-dimensional environment (or a three-dimensional version of the controls and notifications) at a position that is independent of the location of the wrist (e.g., displaying the controls and/or notifications in the space in the center of the field of view of the display generation component, and the user can interact with the controls and/or notifications by using air gestures, or gaze in conjunction with micro-gestures).

In some embodiments, while displaying the menu 7026 of selectable options at a position corresponding to the inner side of the wrist 7028 and/or displaying the controls and/or notifications at positions corresponding to the outer side of the wrist 7028 and the back of hand 7020, the computer system, in accordance with a determination that a predetermined touch-sensitive device (e.g., a watch with a touch-sensitive faceplate) is present at the location on the wrist facing toward the user (e.g., the touch-sensitive display of a wrist watch is present on the inner side of the wrist or the outer side of the wrist), disables a touch-sensitive surface of the predetermined touch-sensitive device. In some embodiments, the computer system disables the touch-sensitive surface of the predetermined touch-sensitive device only when the position of the menu (or optionally, the controls, notifications, status indicators, etc.) (e.g., either on the back of the wrist or the inner side of the wrist) overlaps with the representation of the touch-sensitive surface of the touch-sensitive device in the view of the three-dimensional environment.

In some embodiments, controls are accompanied by status indicators showing system status information (e.g., current battery level, network connectivity status, cell signal strength, media playback status, etc.) when displayed at positions corresponding to the back of the user's hand when the back of the user's wrist and hand is facing toward the user.

FIGS. 7E-7G illustrate an example in which two users 7100 and 7102 are engaged in a shared computer-generated experience in which the two users 7002 and 7102 are viewing the same three-dimensional environment (e.g., an augmented reality environment or a virtual environment) using different display generation components 7100 and 7200, where each user is able to maintain control over the privacy of at least some content (e.g., content of user interfaces of applications) that he/she has activated in the three-dimensional environment and that he/she is viewing as part of the three-dimensional environment. When the controlling user (e.g., the user who has activated an application and caused the content to be displayed in the three-dimensional environment, and/or who has been given authority to control the privacy mode of the content (e.g., when the content is provided by a server of the three-dimensional environment to the controlling user)) keeps the content private (e.g., by providing the required input and/or maintaining the required conditions for maintaining or activating the private mode of the content), only the controlling user can see the content in the three-dimensional environment and others viewing the same three-dimensional environment using other display generation components will not be able to see the private content. When the controlling user changes the privacy mode of the content (e.g., by providing the required input such that preset mode switching criteria for changing the privacy mode of the content (e.g., from the private mode to the semi-public mode or to the public mode) are met), both the controlling user and other users viewing the same three-dimensional environment will see the content displayed in the three-dimensional environment (e.g., at the respective positions in the different views of the three-dimensional environment as provided by the different display generation components used by the different users). In some embodiments, the controlling user can also restore the privacy mode of content that has been made public or semi-public in the three-dimensional environment (e.g., by providing the required input such that different preset mode switching criteria for changing the privacy mode of the content (e.g., from the public or semi-public mode to the private mode) are met).

As shown in FIG. 7E, the user 7002 and the user 7102 are both present in a physical environment, e.g., scene 105. The user 7002 is operating a first computer system that has a first display generation component 7100, and the user 7102 is operating a second computer system that has a second display generation component 7200. In FIG. 7E, the user 7002 and the user 7102 are standing side by side in the same physical environment, and their viewing perspectives of the surrounding physical environment (e.g., directly and/or via their respective display generation components) are very similar. However, in various scenarios, the user 7002 and the user 7102 may have different locations in the physical environment and have views of the surrounding physical environment with very different viewing perspectives (e.g., directly and/or via their respective display generation components). Although the structures, functions, and/or components of the computer systems and associated display generation components used by the user 7002 and the user 7102 may be different or identical in various cases, the descriptions (e.g., descriptions regarding positions, locations, user interfaces, functions, input devices, structures, components, features, methods, advantages, etc.) made with respect to FIGS. 7A-7D and FIGS. 8-10 regarding the computer system and display generation component used by user 7100 apply to the computer systems and the display generation components thereof that are used by either or both of the user 7002 and the user 7102, in accordance with various embodiments, and are not repeated in the interest of brevity.

As shown in FIG. 7E, the physical environment (e.g., scene 105) surrounding the users 7002 and 7102 includes a plurality of physical surfaces (e.g., vertical surfaces such as the front wall 7004, the side wall 7006, and the front surface 7012 of the object 7010 (e.g., a shelf, a refrigerator, a door, etc.), horizontal surfaces such as the floor surface 7008 and the top surface 7018 of object 7014 (e.g., a desk or table)) at various locations. The user 7002 has a hand (e.g., left hand 7020) raised in front of the user 7002, and the user 7102 has a hand (e.g., left hand 7202) raised in front of the user 7102. The user 7002 is viewing a three-dimensional environment via the first display generation component 7100 and the user 7102 is viewing the same three-dimensional environment via the second display generation component 7200. However, there is no requirement that both users have the same hand/arm posture and/or are viewing the physical environment from the same perspective at the same time.

FIG. 7F illustrates the views of the three-dimensional environment provided via the first display generation component 7100 and the second display generation component 7200 at the same time (e.g., at the time as shown in FIG. 7E). As shown on the left side of FIG. 7F, in some embodiments, the view of the three-dimensional environment provided to the user 7002 via the first display generation component 7100 includes a view of at least a portion of the physical scene 105 (e.g., a view with a pass-through portion (e.g., a camera view or transparent portion of the display of the first display generation component 7200)). As shown in the right side of FIG. 7F, in some embodiments, the view of the three-dimensional environment provided to the user 7102 via the second display generation component 7200 includes a view of at least a portion of the physical scene 105 (e.g., a view with a pass-through portion (e.g., a camera view or transparent portion of the display of the second display generation component 7200)). The views of the three-dimensional environment provided via the first and second display generation components 7100 and 7200 include views of the same physical environment, and the difference in the representations of the physical environment in the views of the three-dimensional environment provided via the first and second display generation components 7100 and 7200 are due to the difference in the users' locations relative to the physical environment. In other words, the views shown via the first display generation component 7100 and the second display generation component 7200 corresponding to different viewpoints (e.g., corresponding to different viewing perspectives of the user 7002 and 7102 at different locations relative to the physical environment).

As shown in FIG. 7F, in addition to at least a portion of the physical environment, the three-dimensional environment also includes one or more virtual objects (e.g., the virtual ball 7024) that have locations in the three-dimensional environment corresponding to respective locations in the physical environment (e.g., virtual ball 7024 has a location in the three-dimensional environment that correspond to the location of the top surface of the object 7014). Therefore, the views of the three-dimensional environment show the virtual ball 7024 "resting on" (e.g., replacing or blocking at least a portion of) the top surface of the representation 7014' of the object 7014 displayed via the first display generation component 7100, and the top surface of the representation 7014" of the object 7014 displayed via the second generation component 7200. In some embodiments, the views of the three-dimensional environment also show virtual overlays (e.g., virtual scenery, or virtual decor) "adhering to" (e.g., replacing or blocking at least a portion of) the representations of surfaces (e.g., wall surfaces, shelf surfaces, etc.) of objects displayed via the first display generation component 7100 and the second generation component 7200.

The user 7002 and the user 7102 can collaborate or share experiences (e.g., discuss, interact with, and see changes resulted from each other's interactions with the three-dimensional environment, etc.) in the three-dimensional environment through the views of the three-dimensional environment provided via the different display generation components 7100 and 7200.

In some embodiments, the users are each able to view the physical environment directly (e.g., in the case that the display generation component(s) are computer monitor(s), display(s) of handheld device(s), or display(s) of tablet device(s), etc.), in addition to seeing respective portion(s) of the physical environment through the pass-through portion (s) of the display generation component(s). For example, as shown in FIG. 7F, the view of the physical environment shown on the first display generation component 7100 includes a pass-through view of the scene 105, including representation of the physical objects and surfaces in the scene 105 (e.g., representation 7004' of vertical front wall 7004, representation 7006' of the vertical side wall 7006, representation 7008' of the horizontal floor surface, representation 7010' of physical object 7010, representation 7014' of physical object 7014, representation 7012' of the vertical front surface 7012 of object 7010, and representation 7018' of the horizontal top surface 7018 of object 7014). The view of the physical environment shown on the second display generation component 7200 also includes a pass-through view of the scene 105, including representation of the physical objects and surfaces in the scene 105 (e.g., representation 7004" of vertical front wall 7004, representation 7006" of the vertical side wall 7006, representation 7008" of the horizontal floor surface, representation 7010" of physical object 7010, representation 7014" of physical object 7014, representation 7012" of the vertical front surface 7012 of object 7010, and representation 7018" of the horizontal top surface 7018 of object 7014). In some embodiments, the user(s) direct view(s) of the physical environment are completely blocked by the display generation component(s) and parts (e.g., casing, and other hardware parts) connecting thereto (e.g., in the case that the display generation component(s) are displays of HMD(s) worn by the user(s), or large heads-up display(s) of vehicle(s) or cubicle(s)) and the users' only view(s) of the physical environment is through the pass-through portion(s) provided via the display generation component(s).

In some embodiments, as shown in FIG. 7F, each user (e.g., the user 7002 or the user 7102) is optionally provided with a real-time view of his/her own arm(s), wrist(s), and/or hand(s) and a real-time view of the other user's arm(s), wrist(s), and/or hand(s) (e.g., as part of the views of the physical environment) when the arm(s), wrist(s), and/or hand(s) or portions thereof are moved into predefined regions in the physical environment (e.g., moved into the field of view of one or more cameras of the computer system(s)). For example, as shown in FIG. 7F, the view of the three-dimensional environment displayed via the first display generation component 7100 includes the representation 7020' of the user 7002's hand 7020, the representation 7028' of the user 7002's wrist 7028, the representation 7214' of the user 7102's hand 7214, and the representation 7202' of the user 7102's wrist 7202, provided that each of the hand 7020, wrist 7028, hand 7214, and wrist 7202 are respectively within the field of view of the cameras associated with the computer system controlling the first display generation component 7100. If any of the hand 7020, wrist 7028, hand 7214, or wrist 7202 moves out of the field of view of the cameras associated with the computer system controlling the first display generation component 7100, the representation thereof will cease to be displayed in the view of the three-dimensional environment provided via the first display generation component 7100. Similarly, the view of the three-dimensional environment displayed via the second display generation component 7200 includes the representation 7020" of the user 7002's hand 7020, the representation 7028" of the user 7002's wrist 7028, the representation 7214" of the user 7102's hand 7214, and the representation 7202" of the user 7102's wrist 7202, provided that each of the hand 7020, wrist 7028, hand 7214, and wrist 7202 are respectively within the field of view of the cameras associated with the computer system controlling the second display generation component 7200. If any of the hand 7020, wrist 7028, hand 7214, or wrist 7202 moves out of the field of view of the cameras associated with the computer system controlling the second display generation component 7200, the representation thereof will cease to be displayed in the view of the three-dimensional environment provided via the second display generation component 7200.

In some embodiments, the views of the physical environment provided via the display generation component(s) are not the physical environment surrounding one or both of the user(s), and the views of one or both of users' arms, wrists, and/or hands (e.g., as captured by one or more cameras of the computer system(s), or stylized versions of the arms, wrists and/or hands based on information captured by various sensors) are provided by the display generation component(s) to replace or block a portion of the view(s) of the physical environment. In some embodiments, the display generation components 7100 and 7200 do not provide a view of a physical environment, and provide a completely virtual environment (e.g., no camera view or transparent pass-through portion) and real-time visual representations (e.g., stylize representations or segmented camera images) of one or both arms, wrists, and/or hands of the users 7002 and 7102 as presently captured by one or more sensors (e.g., cameras, motion sensors, other posture sensors, etc.) are provided with the virtual environment (e.g., in the virtual three-dimensional environment).

In the example shown in FIG. 7F, the three-dimensional environment is shared between the user 7002 and the user 7102 in response to a request that is initiated from one of the users 7002 and 7102 using a computer system controlled by said one user, and accepted by another of the users 7002 and 7102 using a computer system controlled by said another user, in accordance with some embodiments. In some embodiments, both users have received and accepted the request to share the three-dimensional environment using their respective computer systems from the computer system used by a third user. In some embodiments, both users have sent requests to share the three-dimensional environment to a server using their respective computer systems, where their requests were accepted by the server. When sharing the computer-generated three-dimensional environment, the locations and orientations of the users and of their respective heads, eyes, hands, arms, and/or wrists are captured in real-time or periodically by sensors (e.g., cameras, motion sensors, etc.) and the location and orientation data is provided to one or both of the computer systems controlled by the users, and/or to a server that is in communication with the computer systems. The location data is used by the computer systems and/or server to determine the respective locations and orientations of the users and of their respective heads, eyes, hands, arms, and/or wrists in the computer-generated three-dimensional environment, and correspondingly, the respective positions of the representations of the users including their respective heads, arms, hands, and/or wrists in the views of the three-dimensional environment provided via the different display generation components associated with the users, as well as the viewing perspectives of the views of the three-dimensional environment provided via the different display generation components associated with the users.

In the example shown in FIG. 7F, a first menu of selectable options (e.g., the menu 7026) is displayed at a position corresponding to the location of the user 7002's wrist 7028 in the view of the three-dimensional environment provided via the first display generation component 7100, e.g., in accordance with a determination that certain preset criteria have been met (e.g., by the navigation state of the wrist, and optionally, by the presence of other conditions). In some embodiments, the first menu of selectable options include application icons. In some embodiments, the selectable options in the first menu optionally include respective representations (e.g., avatars) of users of remote devices that when activated, cause an operation to be performed with respect to the remote users (e.g., an operation to initiate communication with the respective users of the remote devices, or to start sharing the three-dimensional environment with the users of the remote devices, etc.). As shown in FIG. 7F, prior to the start of the sharing session or during the sharing session, a first input that meets predetermined selection criteria is detected at a location on the wrist 7028 of the first user 7002, and in response to the first input, a first view of a user interface 7036 of a first application corresponding to a selected option in the menu 7026 (e.g., the first view 7036 of the user interface of the application corresponding to selectable option 7030-*a*) is displayed at a position in the view of the three-dimensional environment provided via the first display generation component 7100 that corresponds to a location of the user 7002's palm of hand 7020. For example, the first view 7036 of the user interface of the first application is facing toward the user 7002's head or face (e.g., facing toward a viewpoint corresponding to the current view of the three-dimensional environment provided via the first display generation component 7100), and replacing or blocking at least a portion of the view of the user 7002's palm of hand 7020 (e.g., a view of the hand 7020 through a transparent display, a camera view of the hand 7070, or a stylized representation of the hand 7020). In some embodiments, the first view 7036 of the user interface of the first application displayed at a position corresponding to a location of the user 7002's hand includes user interface objects such as the user interface objects 7038 and 7040, and responds to the user 7002's inputs in accordance with a first interaction model (e.g., as described with respect to FIGS. 7A-7D and FIGS. 8-11). In some embodiments, the first view 7036 of the user interface of the first application is displayed on the three-dimensional object 7034 (e.g., on the front surface of the three-dimensional object 7034). As the hand 7020 and the wrist 7028 move together in the physical environment, the position of the representation 7020' of the hand 7020 moves in the view of the three-dimensional environment shown via the first display generation component 7100, and the display position of the first view 7036 of the user interface of the first application (and optionally, the display position of the object 7034) is updated to continue to correspond to the location of the palm of the hand 7020 (e.g., the first view 7036 of the user interface (and optionally, the object 7034) is locked to the position of the representation 7020' of the hand 7020). In some embodiments, the first view 7036 of the user interface of the first application (and optionally, the object 7034) is oriented in accordance with an orientation of the user 7002's hand 7020 facing the user 7002's head, such that changing the orientation and/or the facing direction of the user 7002's hand changes the orientation and facing direction of the first view 7036 of the user interface of the first application, and optionally changes the privacy mode of the first view 7036 of the user interface of the first application in the shared three-dimensional environment, in accordance with a determination of whether predetermined criteria are met by the change in the position and orientation of the user 7002's hand 7020. Other aspects of the display properties and interactions with the menu 7026 and the user interface of an application corresponding to a selected option from the menu 7026 (e.g., the first application corresponding to selectable option 7030-a in the menu 7026) are described with respect to FIGS. 7A-7D and FIGS. 8-11, and are not repeated herein in the interest of brevity.

Analogously and optionally, as shown in FIG. 7F, a second menu of selectable options (e.g., menu 7226) is displayed at a position corresponding to the location of the user 7102's wrist 7202 in the view of the three-dimensional environment provided via the second display generation component 7200, e.g., in accordance with a determination that certain preset criteria have been met (e.g., by the navigation state of the wrist, and optionally, by the presence of other conditions). In some embodiments, the menu 7226 of selectable options includes application icons. In some embodiments, the selectable options in the menu 7226 optionally include respective representations (e.g., avatars) of users of remote devices that when activated, causes an operation to be performed with respect to the remote users (e.g., an operation to initiate communication with the respective users of the remote devices, or start sharing the three-dimensional environment with the users of the remote devices, etc.). As shown in FIG. 7F, prior to the start of the sharing session or during the sharing session, a second input that meets predetermined selection criteria is detected at a location on the wrist 7202 of the user 7102, and in response to the second input, a first view 7236 of a user interface of a second application corresponding to a selected option in the menu 7226 is displayed at a position in the view of the three-dimensional environment provided via the second display generation component 7200 that corresponds to a location of the user 7102's palm of hand 7214. For example, the first view of the user interface 7236 of the second application is facing toward the user 7102's head or face (e.g., facing toward a viewpoint corresponding to the current view of the three-dimensional environment provided via the second display generation component 7200), and replacing or blocking at least a portion of the view of the user 7102's palm of hand 7214 (e.g., a view of the hand 7214 through a transparent display, a camera view of the hand 7214, or a stylized representation of the hand 7214). In some embodiments, the first view of the user interface 7236 of the second application displayed at a position corresponding to a location of the user 7102's hand includes user interface objects such as user interface objects 7208, 7210 and 7212, and responds to the user 7102's inputs in accordance with the first interaction model (e.g., the first interaction model used for the first views of the user interfaces of applications displayed at positions corresponding to the palm of a user's hand, as described with respect to FIGS. 7A-7D and FIGS. 8-11). In some embodiments, the first view 7236 of the user interface of the second application is displayed on a three-dimensional object 7206 (e.g., on a front surface of the three-dimensional object 7206). As the hand 7214 and the wrist 7202 move together in the physical environment, the position of the representation 7214" of the hand 7214 moves in the view of the three-dimensional environment shown via the second display generation component 7200, and the display position of the first view 7236 of the user interface 7236 of the second application (and optionally, the object 7206) is updated to continue to correspond to the location of the palm of hand 7214 (e.g., the first view 7236 of the user interface (and optionally, the object 7206) is locked to the position of the palm of the representation 7214" of the hand 7214). In some embodiments, the first view 7236 of the user interface 7236 of the second application (and/or optionally, the object 7206) is oriented in accordance with an orientation of the user 7102's hand 7214 facing the user 7102's head, such that changing the orientation and/or facing direction of the user 7102's hand changes the orientation and facing direction of the first view 7236 of the user interface of the second application, and optionally changes the privacy mode of the first view 7236 of the user interface of the second application in the shared three-dimensional environment, in accordance with a determination of whether predetermined criteria are met by the change in the position and orientation of the user 7102's hand 7214. Other aspects of the display properties and interactions with the menu 7226 and the user interface of an application corresponding to a selected option from the menu 7226 (e.g., the first view 7236 of the user interface of the second application) are described with respect to FIGS. 7A-7D and FIGS. 8-11 (e.g., as in regard to the first view 7036 of the user interface of the first application), and are not repeated herein in the interest of brevity.

In some embodiments, the first views 7036 and 7236 of the user interfaces of respective applications (e.g., the first application and the second application, respectively) activated by the user 7002 and 7102 correspond to a private mode of a plurality of privacy modes that can be associated with applications and its user interfaces in a shared three-dimensional environment. In some embodiments, when a respective application and/or a user interface thereof is associated with a private mode, the presence and/or content of the user interface of the respective application is only visible to its respective controlling user or owner (e.g., the user who activated the application), and is not visible to other users viewing the same three-dimensional environment (e.g., either from the same perspective or from a different perspective). In some embodiments, the private mode of a currently displayed user interface is activated when the controlling user of the displayed user interface starts to share the three-dimensional environment with another user. In some embodiments, the private mode is activated for the user interface of an application when preset criteria are met (e.g., the preset criteria includes a requirement that the user interface of the application is displayed at a position corresponding to a palm of a controlling user that activated the application and caused display of the user interface in the three-dimensional environment (e.g., on the user's own display generation component), and the controlling user's palm of the hand at which the user interface is displayed is facing toward the user's face (or, alternatively, a requirement that the controlling user's palm of the hand at which the user interface is displayed is not facing toward another user with whom the controlling user is sharing the three-dimensional environment, or a requirement that the controlling user's palm of the hand at which the user interface is displayed is not facing away from the controlling user, etc.)).

As shown in FIG. 7F, while the first display generation component 7100 displays a view of the three-dimensional environment that corresponds to a current viewpoint of the user 7002 (e.g., as defined by the location of the user 7002's head relative the physical environment 105), in addition to displaying the representation 7028' of the user 7002's wrist 7028, the representation 7020' of the user 7002's hand 7020, and the first view 7036 of the user interface of the first application selected from the menu 7026 by the user 7002, the first display generation component 7100 also displays a representation 7214' of the user 7102's hand 7214 and a representation 7202' of the user 7102's wrist 7202 (e.g., because the hand 7214 and wrist 7202 of the user 7102 are currently within the field of view of the one or more cameras of the computer system controlled by the user 7002 as part of the physical environment 105). However, in contrast to the view of the three-dimensional environment displayed via the second display generation component 7200 in FIG. 7F, in the view of the three-dimensional environment provided via the first display generation component 7100, the first view 7236 of the user interface of the second application that were activated by the user 7102 is not displayed. The first display generation component 7100 forgoes display of the first view 7236 of the user interface of the second application because the first view 7236 of the user interface of the second application activated by the user 7102 is currently associated with a private mode based on the spatial relationship between the hand 7214 of the user 7102 and the user 7102 (e.g., because the palm of the hand 7214 of the user 7102 is facing toward the face of the user 7102, and correspondingly, the first view 7236 of the user interface of the second application is facing toward the face of the user 7102 or toward the viewpoint corresponding to the current view of the three-dimensional environment as provided by the second display generation component 7200).

In some embodiments, in lieu for displaying the first view 7236 of the user interface of the second application in the view of the three-dimensional environment, the first display generation component 7100 optionally displays an indication 7216 of the user interface of the second application at a position in the view of the three-dimensional environment corresponding to the location of the user 7102's hand 7214. For example, the indication 7216 is displayed a position that replaces or blocks at least a portion of the representation 7214' of the user 7102's hand 7214 in the view of the three-dimensional environment provided via the first display generation component 7100. In some embodiments, the indication 7216 is a translucent object or visual effect and changes (e.g., blurs, dims, morphs, etc.) the representation 7214' of the user 7102's hand 7214 in the view of the three-dimensional environment provided via the first display generation component 7100. In some embodiments, the indication 7216 includes a summary of the user interface of the second application, e.g., by displaying an application icon corresponding to the second application but omitting at least some content of the first view 7236 of the user interface of the second application. In some embodiments, no indication of the user interface of the second application is displayed at the position in the view of the three-dimensional environment corresponding to the location of the user 7102's hand 7214, and the representation 7214' of the user 7102's hand is displayed as how it would appear from the viewing perspective of the user 7002 (e.g., the plain view of the hand 7214 as captured by the one or more cameras of the computer system used by the user 7002).

Analogously, as shown in FIG. 7F, while the second display generation component 7200 displays a view of the three-dimensional environment that corresponds to a current viewpoint of the user 7102 (e.g., as defined by the location of the user 7102's head relative the physical environment 105), in addition to displaying the representation 7202" of the user 7102's wrist 7202, the representation 7214" of the user 7102's hand 7214, and the first view 7236 of the user interface of the second application selected from the menu 7226 by the second user 7102, the second display generation component 7200 also displays a representation 7020" of the user 7002's hand 7020 and a representation 7028" of the user 7002's wrist 7028 (e.g., because the hand 7020 and wrist 7028 of the user 7002 are currently within the field of view of the one or more cameras of the computer system controlled by user 7102 as part of the physical scene 105). However, in contrast to the view of the three-dimensional environment displayed via the first display generation component 7100 in FIG. 7F, in the view of the three-dimensional environment provided via the second display generation component 7200, the first view 7036 of the user interface of the first application activated by the user 7002 is not displayed. The second display generation component 7200 forgoes display of the first view 7036 of the user interface of the first application because the first view 7036 of the user interface of the first application activated by the user 7002 is currently associated with the private mode based on the spatial relationship between the hand 7020 of the user 7002 and the user 7002 (e.g., the palm of the hand 7020 of the user 7002 is facing toward the face of the user 7002, and correspondingly, the first view 7036 of the user interface of the first application is facing toward the face of the user 7002 or toward the viewpoint corresponding to the current view of the three-dimensional environment as provided by the first display generation component 7100).

In some embodiments, in lieu for displaying the first view 7036 of the user interface of the first application in the view of the three-dimensional environment, the second display generation component 7200 optionally displays an indication 7204 of the first view 7036 of the user interface of the first application at a position in the view of the three-dimensional environment corresponding to the location of the user 7002's hand 7020. For example, the indication 7204 is displayed a position that replaces or blocks at least a portion of the representation 7020" of the user 7002's hand 7020 in the view of the three-dimensional environment provided via the second display generation component 7200. In some embodiments, the indication 7204 is a translucent object and/or visual effect that changes (e.g., blurs, dims, morphs, etc.) the representation 7020" of the user 7002's hand 7020 in the view of the three-dimensional environment provided via the second display generation component 7200. In some embodiments, the indication 7204 includes a summary of the first view 7036 of the user interface of the first application, e.g., by displaying an application icon corresponding to the first view 7036 of the user interface of the first application but omitting at least some content of the first view 7036 of the user interface of the first application. In some embodiments, no indication of the first view 7036 of the user interface of the first application is displayed at the position in the view of the three-dimensional environment corresponding to the location of the user 7002's hand 7020, and the representation 7020" of the user 7002's hand 7020 is displayed as how it would appear from the view perspective of the user 7102 (e.g., the plain view of the hand 7020 as captured by the one or more cameras of the computer system used by the user 7102).

FIG. 7G illustrates two example manners by which a user interface displayed in the private mode (e.g., the first view 7036 of the user interface of the first application displayed via the first display generation component 7100, and the first view 7236 of the user interface of the second application displayed via the second display generation component 7200) can be changed to being displayed in a semi-private mode or public mode with content of the user interface being shown in the views of the three-dimensional environment displayed via both the first display generation component 7100 and the second display generation component 7200 (e.g., the first view 7036 of the user interface of the first application (or a non-fully redacted version thereof) being also displayed via the second display generation component 7200, and the first view 7236 of the user interface of the second application (or a non-fully redacted version thereof) being also displayed via the first display generation component 7100).

For example, while the first display generation component 7100 displays the first view 7036 of the user interface of the first application (e.g., on a front surface of the object 7034) at a position in the view of the three-dimensional environment provided by the first display generation component 7100 that corresponds to a location of the user 7002's hand 7020 (e.g., the first view 7036 replacing or blocking at least a portion of the representation of the palm of the user's hand 7020), the computer system used by the user 7002 detects, through one or more cameras of the computer system, that the spatial relationship between the first view 7036 of the user interface of the first application and the user 7002 (or between the first view 7036 of the user interface of the first application and the viewpoint corresponding to the current view of the three-dimensional environment provided via the first display generation component 7100) has changed due to movement of the hand 7020 relative to the physical environment and the user 7002.

As shown in FIG. 7G, in response to the movement of the hand 7020 relative to the physical environment and the user 7002 and the resulting change in the spatial relationship between the first view 7036 of the user interface of the first application and the user 7002 (or the resulting change in the spatial relationship between the first view 7036 of the user interface of the first application and the viewpoint corresponding to the current view of the three-dimensional environment provided via the first display generation component 7100), the first display generation component 7100 displays the representation 7020' of the hand 7020 showing the back of the hand facing toward the user 7002 (or toward the viewpoint corresponding to the current view of the three-dimensional environment provided via the first display generation component 7100). In addition, the object 7034 is also turned around with its front surface facing away from the user 7002 (or from the viewpoint corresponding to the current view of the three-dimensional environment provided via the first display generation component 7100). In some embodiments, in accordance with a determination that the change in the spatial relationship between the first view 7036 of the user interface of the first application and the user 7002 (or the resulting change in the spatial relationship between the first view 7036 of the user interface of the first application and the viewpoint corresponding to the current view of the three-dimensional environment provided via the first display generation component 7100) meets preset criteria for changing the privacy mode associated with the first view 7036 of the user interface of the first application, the computer system used by the user 7002 changes the privacy mode of the first view 7036 of the user interface of the first application from the private mode to a semi-private mode or public mode (e.g., for the duration in which the preset criteria are met) and provides data regarding the content of the first view 7036 of the user interface of the first application to the computer system used by the user 7102, such that the content of the first view 7036 of the user interface of the first application is displayed in the view of the three-dimensional environment provided by the second display generation component 7200. For example, as shown in FIG. 7G, the second display generation component 7200 displays the view of the three-dimensional environment from the viewing perspective of the user 7102, and the view of the three-dimensional environment includes the representation 7020" of the user 7002's hand 7020, and the object 7034 (e.g., shown as object 7034") with its front surface (and with the first view 7036 of the user interface of the first application (e.g., shown as first view 7036" of the user interface of the first application)) facing toward the user 7102 (or toward the viewpoint corresponding to the current view of the three-dimensional environment provided via the second display generation component 7100). In other words, now the first view 7036 of the user interface of the first application and its content (or at least some portions thereof) that were previously not visible in the view of the three-dimensional environment provided by the second display generation component 7200 becomes visible to the user 7102 viewing the three-dimensional environment via the second display generation component 7200. In some embodiments, if the preset criteria for switching from the private mode (e.g., no content or limited content is visible) to the semi-public mode (e.g., more content is visible comped to the private mode) or public mode (e.g., all content is visible, or more content is visible compared to the private mode and the semi-private mode) is not met by the movement of the user 7002's hand 7020, the view of the three-dimensional environment provided by the second display generation component 7200 will only show the movement of the representation 7020" of the hand 7020, and optionally with the indication 7216 at a position corresponding to the location of the hand 7020, in accordance with the movement of the hand 7020.

In some embodiments, after displaying the object 7034 (e.g., shown as the object 7034") with its front surface (and with the first view 7036 of the user interface of the first application (shown as the first view 7036" of the user interface of the first application)) facing toward the user 7102 (or toward the viewpoint corresponding to the current view of the three-dimensional environment provided via the second display generation component 7100), if the computer system used by the user 7002 detects, through the one or more cameras of the computer system, that the spatial relationship between the first view 7036 of the user interface of the first application and the user 7002 (or between the first view 7036 of the user interface of the first application and the viewpoint corresponding to the current view of the three-dimensional environment provided via the first display generation component 7100) has changed again due to movement of the hand 7020 relative to the physical environment and the user 7002. If the resulting change in the spatial relationship between first view 7036 of the user interface of the first application and the user 7002 (or the resulting change in the spatial relationship between the first view 7036 of the user interface of the first application and the viewpoint corresponding to the current view of the three-dimensional environment provided via the first display generation component 7100) correspond to a determination that the preset criteria for displaying the user interface with the semi-private mode or the public mode are no longer met, the first display generation component 7100 continues to display representation 7020' of the hand 7020 with the changed posture and to display the object 7034 with its front surface facing toward the user 7002 (or the viewpoint corresponding to the current view of the three-dimensional environment provided via the first display generation component 7100) again. In some embodiments, in accordance with a determination that the change in the spatial relationship between the first view 7036 of the user interface of the first application and the user 7002 (or the resulting change in the spatial relationship between the first view 7036 of the user interface of the first application and the viewpoint corresponding to the current view of the three-dimensional environment provided via the first display generation component 7100) no longer meets the preset criteria for changing the privacy mode associated with the first view 7036 of the user interface from private mode to semi-public mode or public mode (or for maintaining the semi-private or public mode of the first view 7036 of the user interface of the first application), the computer system used by user 7002 restores the privacy mode of the user interface 7036 from the semi-private mode or the public mode back to the private mode and stops providing data regarding the content of the first view 7036 of the user interface of the first application to the computer system used by the user 7102, such that the content of the first view 7036 of the user interface of the first application (e.g., the user interface 7036" (e.g., including the user interface objects 7038" and 7040") and the object 7034") is no longer displayed in the view of the three-dimensional environment provided by the second display generation component 7200. For example, the view of the three-dimensional environment provided by the second display generation component 7200 will only show the movement of the representation 7020" of the hand 7020, and optionally with the indication 7204 at a position corresponding to the location of the hand 7020, in accordance with the movement of the hand 7020.

In some embodiments, analogous movement by the hand 7214 of the user 7102 relative to the physical environment and the user 7102 would cause similar switching of privacy mode for the first view 7236 of the user interface of the second application activated in the three-dimensional environment by the user 7102, and resulting in the first view 7236 of the user interface of the second application to be shown or hidden in the view of the three-dimensional environment displayed via the first display generation component 7100. All the features described above with respect to the behaviors of the computer systems, the first display generation component 7100 and the second display generation component 7200 in FIGS. 7F-7G are equally applicable to the scenarios where the spatial relationship between the first view 7236 of the user interface of the second application and the user 7102 changes in response to movement of the user's hand 7214 relative to the physical environment, resulting in changes in the privacy mode of the first view 7236 of the user interface of the second application and visibility of the second view 7236 of the user interface of the second application in the view of the three-dimensional environment provided via the first display generation component 7100. In essence, the roles of the first and second users 7002 and 7102 and the roles of the first and second display generation components and computer systems used by the first and second users may be reversed in a particular scenario, and the features described above are still valid, and therefore not repeated herein in the interest of brevity.

In some embodiments, while the second display generation component 7200 displays the first view 7236 of the user interface of the second application (e.g., on a front surface of the object 7206) at a position in the view of the three-dimensional environment provided by the second display generation component 7200 that corresponds to a location of the user 7102's hand 7214, the computer system used by the user 7102 detects, through one or more cameras of the computer system, an input that changes the spatial relationship between the user interface of the second application and the user 7102 (or between the user interface of the second application and the viewpoint corresponding to the current view of the three-dimensional environment provided via the second display generation component 7200). For example, the input includes a movement of the hand 7214 relative to the physical environment and the user 7002 (e.g., the movement is a pick-up and drop-off gesture, or toss/throw gesture, or release and tap gesture, or a throw gesture that is provided in conjunction with a gaze input selecting a new target surface, etc.) that sends the user interface of the second application from the position corresponding to the hand 7214 to a position corresponding to another surface in the physical environment (e.g., a nearby tabletop or a wall)). As shown in FIG. 7G, in response to the input that includes the movement of the hand 7214 relative to the physical environment and the user 7002, in accordance with a determination that the resulting change in the spatial relationship between the user interface of the second application and the user 7102 (or a determination that the resulting change in the spatial relationship between the user interface of the second application and the viewpoint corresponding to the current view of the three-dimensional environment provided via the second display generation component 7200) meets preset mode switching criteria (e.g., the preset mode switching criteria includes a requirement that the user interface of the second application is no longer facing toward the face of the user 7102, or a requirement that the user interface of the second application is facing away from the user 7102, or a requirement that the user interface of the second application is facing toward the user 7002, etc.), the second display generation component 7200 displays representation 7214" of the hand after releasing the user interface of the second application (and the object 7206). In addition, a second view 7236" of the user interface of the second application is displayed at a position in the view of the three-dimensional environment provided by the second display generation component 7200 that corresponds to the location of the top surface of the object 7214 in the physical environment. As shown in FIG. 7G, the second view 7236" of the user interface of the second application is shown on a front surface of the object 7206". The size of the second view 7236" of the user interface of the second application (and the object 7206") is larger than the size of the first view 7236 of the user interface of the second application (and the object 7206), in accordance with some embodiments. In some embodiments, in accordance with a determination that the change in the spatial relationship between the user interface of the second application (e.g., which has transformed from the second view 7236" to the first view 7236 of the user interface of the second application) and the user 7102 (or the resulting change in the spatial relationship between the user interface of the second application (e.g., which has transformed from the second view 7236" to the first view 7236 of the user interface of the second application) and the viewpoint corresponding to the current view of the three-dimensional environment provided via the second display generation component 7200) meets preset criteria for changing the privacy mode associated with the user interface of the second application, the computer system used by the user 7102 changes the privacy mode of the user interface of the second application from the private mode to a semi-private mode or public mode (e.g., for the duration in which the preset criteria are met) and provides data regarding the content of the user interface of the second application to the computer system used by the user 7002, such that the content of the user interface of the second application (e.g., now shown as the second view 7236" of the user interface of the second application in the view of the three-dimensional environment provided by the second display generation component 7200) is displayed in the view of the three-dimensional environment provided by the first display generation component 7100 as well. For example, as shown in FIG. 7G, the first display generation component 7100 displays the view of the three-dimensional environment from the viewing perspective of the user 7002, and the view of the three-dimensional environment includes the object 7206' (which corresponds to the object 7206" shown by the second display generation component 7200) and the second view 7236' of the user interface of the second application (which corresponds to the second view 7236" of the user interface of the second application shown by the second display generation component 7200) displayed at a position corresponding to the location of the top surface of object 7014. In other words, now the user interface of the second application (e.g., shown as the second view 7036') and its content that were previously not visible in the view of the three-dimensional environment provided by the first display generation component 7100 is visible to the user 7002 viewing the three-dimensional environment via the first display generation component 7100. In some embodiments, if the preset criteria for switching from the private mode to the semi-public mode or public mode are not met by the movement of the user 7102 's hand 7214, the view of the three-dimensional environment provided by the first display generation component 7100 will only show the movement of the representation 7214' of the hand 7214, and optionally with the indication 7216 at a position corresponding to the location of the hand 7214, in accordance with the movement of the hand 7214.

In some embodiments, analogous movement by the hand 7020 of the user 7002 relative to the physical environment and the user 7002 would cause similar switching of privacy mode for the user interface of the first application activated in the three-dimensional environment by the user 7002, and resulting in the user interface of the first application to be shown or hidden in the view of the three-dimensional environment displayed via the second display generation component 7200. All the features described above with respect to the behaviors of the computer systems, the first display generation component 7100 and the second display generation component 7200 in FIGS. 7F-7G are equally applicable to the scenarios where the spatial relationship between the user interface of the first application and the user 7002 changes in response to a request that moves the user interface of the application from a position corresponding to the location of the user 7002's hand 7020 to another position corresponding to the location of another surface in the physical environment (e.g., by a movement of the user 7002's hand 7020 relative to the physical environment), and resulting in changes in the privacy mode of the user interface of the first application and visibility of the user interface of the first application in the view of the three-dimensional environment provided via the second display generation component 7200. In essence, the roles of the first and second users 7002 and 7102 and the roles of the first and second display generation components and computer systems used by the first and second users may be reversed in a particular scenario, and the features described above are still valid, and therefore not repeated herein in the interest of brevity.

In some embodiments, while user interface of the second application (e.g., as second views 7236" and 7236', respectively) is displayed in the views of the three-dimensional environment at positions that correspond to the location of a nearby surface (e.g., the top surface of the object 7014), the computer system used by user 7102 detects, e.g., via one or more cameras of the computer system, another input provided by the user 7102 that meets preset criteria (e.g., criteria for detecting an in air toss/throw gesture by the hand 7214 of the user 7102) for transferring display of the user interface of the second application activated by the user 7102 from the position corresponding to the location of the nearby surface (e.g., the top surface of the object 7014) to another surface that is farther away from the user 7102 (e.g., surface of the wall 7004). In response to detecting the input, both the first display generation component 7100 and the second display generation component 7200 cease to display the user interface of the second application (or a semi-redacted version thereof) at the positions that correspond to the location of the nearby surface, and display a third view of the user interface of the second application at positions in the views of the three-dimensional environment that correspond to the location of the new target surface that is father away from the user 7102 (e.g., the surface of wall 7004). In some embodiments, the user interface of the second is displayed in the views of the three-dimensional environment provided by both display generation components because the user interface of the second application is now associated with a public mode when it is displayed at a position that corresponds to a surface that is farther than a threshold distance from the user 7102 that activated the second application. Features discussed in the descriptions of FIGS. 7B-7C with regard to how the user interface of the first application may be transferred from a position corresponding to a user's palm to a position corresponding to a nearby surface, and then to another surface that is farther away are applicable to the user interface of the second application described herein as well. Features discussed in the descriptions of FIG. 7D with regard to how application icons and the user interface of the first application, and controls and notifications may selectively displayed on the back of the controlling user's hand and wrist or the front of the controlling user's hand and wrist are applicable to application icons and the user interface of the second application, other controls and notifications described herein with respect to the user 7102 as well.

FIG. 7G illustrates two sets of example criteria for changing the privacy mode of a user interface of an application that is activated in a three-dimensional environment by a respective user and displayed in a view of the three-dimensional environment provided via a first display generation component associated with the respective user, such that the user interface of the application is also displayed in a view of the three-dimensional environment provided by another display generation component associated with another user. In some embodiments, the preset mode switching criteria include a criterion that is met when the user interface has a predetermined spatial relationship to the respective user that activated the application in the three-dimensional environment.

In some embodiments, the predetermined spatial relationship is that the user interface or the virtual object on which the user interface is displayed is not displayed at a position in the three-dimensional environment that corresponds to the controlling user's hand or palm (e.g., the user interface does not block or replace a portion of the representation of the controlling user's hand or palm in the view of the display generation component associated with the controlling user). For example, when the user interface of the application is displayed at a position that corresponds to the controlling user's palm in the view of the three-dimensional environment provided via the display generation component used by the controlling user, the user interface is associated with a private mode, and the user interface is not displayed in the view of the three-dimensional environment provided by a different display generation component used by a different user (e.g., a non-controlling user). When the user interface of the application is no longer displayed at the position that corresponds to the controlling user's palm in the view of the three-dimensional environment provided via the displayed generation component used by the controlling user (e.g., the controlling user has transferred the user interface to a position in the view of the three-dimensional environment that corresponds to the location of a nearby tabletop or a wall), the user interface of the application is no longer associated with the private mode, and is displayed in the views of the three-dimensional environment provided by the display generation components used by both the controlling user and at least one non-controlling user. In some embodiments, when the user interface is again displayed at the position that corresponds to the controlling user's palm in the view of the three-dimensional environment provided via the displayed generation component used by the controlling user (e.g., the controlling user has transferred the user interface back to a position in the view of the three-dimensional environment that corresponds to his/her palm using a predefined recall gesture), the user interface of the application is re-associated with the private mode, and ceases to be displayed in the view of the three-dimensional environment provided by the display generation component used by the non-controlling user.

In some embodiments, the predetermined spatial relationship is that the user interface or the content side of the virtual object on which the user interface is displayed is at a position in the three-dimensional environment that corresponds to the controlling user's hand or palm and a content side of the user interface or virtual object is facing away from the controlling user (or a viewpoint corresponding to the view of the three-dimensional environment displayed via the display generation component used by the controlling user). For example, when the user interface is displayed at a position that corresponds to the controlling user's palm in the view of the three-dimensional environment provided via the display generation component used by the controlling user and the palm of the controlling user or the user interface (or both) is facing toward the controlling user, the user interface is associated with a private mode, and the user interface is not displayed in the view of the three-dimensional environment provided by the display generation component used by a non-controlling user. When the user interface is still displayed at the position that corresponds to the controlling user's palm in the view of the three-dimensional environment provided via the displayed generation component used by the controlling user but is no longer facing toward the controlling user (e.g., the controlling user has turned his/her palm toward another direction away from his/her face), the user interface is no longer associated with the private mode, and is displayed in the view of the three-dimensional environment provided by the display generation component used by another user that is not the controlling user. In some embodiments, when the user interface is displayed at the position that corresponds to the controlling user's palm in the view of the three-dimensional environment provided via the displayed generation component used by the controlling user and the content side of the user interface is again facing toward the controlling user (e.g., the controlling user has turned his/her palm back toward his/her face), the user interface is re-associated with the private mode, and ceases to be displayed in the view of the three-dimensional environment provided by the display generation component used by the non-controlling user.

In some embodiments, the predetermined spatial relationship is that the user interface or the content side of the virtual object on which the user interface is displayed is at a position in the three-dimensional environment that corresponds to the controlling user's hand or palm and a content side of the user interface or virtual object is facing toward a viewpoint corresponding to a view of the three-dimensional environment displayed via a display generation component used by a non-controlling user (or the controlling user's palm is turned to face toward the face of the non-controlling user). For example, when the user interface is displayed at a position that corresponds to the controlling user's palm in the view of the three-dimensional environment provided via the display generation component used by the controlling user, and the palm of the controlling user or the user interface (or both) is facing toward the controlling user or another direction that is not toward the non-controlling user (or not toward the non-controlling user's viewpoint of the three-dimensional environment), the user interface is associated with a private mode, and the user interface is not displayed in the view of the three-dimensional environment provided by the display generation component used by the non-controlling user. When the user interface is still displayed at the position that corresponds to the controlling user's palm in the view of the three-dimensional environment provided via the displayed generation component used by the controlling user but is now facing toward the non-controlling user (e.g., the controlling user has turned his/her palm toward the face of the non-controlling user), the user interface is no longer associated with the private mode, and is displayed in the view of the three-dimensional environment provided by the display generation component used by the non-controlling user. In some embodiments, when the user interface is displayed at the position that corresponds to the controlling user's palm in the view of the three-dimensional environment provided via the displayed generation component used by the controlling user and the content side of the user interface is again away from the non-controlling user (e.g., the controlling user has turned his/her palm back toward his/her own face or away from the face of the non-controlling user), the user interface is re-associated with the private mode, and ceases to be displayed in the view of the three-dimensional environment provided by the display generation component used by the non-controlling user.

In some embodiments, when a user interface of an application is associated with a private mode, the user interface is completely hidden and there is no hint of the user interface provided in the view of the three-dimensional environment provided via the display generation component used by a non-controlling user (e.g., a user that did not activate the application in the three-dimensional environment). For example, in the view of the three-dimensional environment provided via the display generation component used by the non-controlling user, the hand/palm of the controlling user (e.g., the user that activated the application in the three-dimensional environment) is completely unobscured by any indication that the controlling user is viewing the user interface of the application at a position in the three-dimensional environment corresponding to the location of the controlling user's hand/palm. If the non-controlling user is standing next to the controlling user to be able to see the physical environment (e.g., including the controlling user's hand) from a perspective similar to the controlling user, the non-controlling user would only see the representation of the controlling user's palm in the three-dimensional environment provided by the display generation component used by the non-controlling user. It is also possible, that the non-controlling user would be seeing a representation of the back of the controlling user's hand in the three-dimensional environment if the non-controlling user is directly facing the controlling user's face.

In some embodiments, when a user interface of an application is associated with a private mode, the user interface is completely hidden in the view of the three-dimensional environment provided via the display generation component used by a non-controlling user. However, in the view of the three-dimensional environment provided via the display generation component used by the non-controlling user, the position corresponding to the hand/palm of the controlling user is optionally modified (e.g., blurred, dimmed, morphed, etc.) to indicate that the controlling user is viewing some unidentified content at a position in the three-dimensional environment corresponding to the location of the controlling user's hand/palm.

In some embodiments, while a user interface is displayed in a view of a three-dimensional environment, it has a spatial location in the three-dimensional environment relative to other virtual objects and physical objects represented in the three-dimensional environment. It is possible that in a respective view of the three-dimensional environment that a portion of the user interface is blocked or replaced by another virtual object or a representation of a physical object due to the viewing perspective associated with the view of the three-dimensional environment. For example, when the user interface is displayed on a front surface of a virtual object (e.g., virtual object 7206", 7206', 7206, 7034", 7034), and the virtual object is orientated relative to the viewpoint of a view of the three-dimensional environment such that the front surface of the virtual object is facing away from the viewpoint of the view of the three-dimensional environment, the view of the user interface would be blocked or replaced by the back side of the virtual object, no matter whether the view is provided by the display generation component used by the controlling user, or by the display generation component used by the non-controlling user. Similarly, when the user interface is displayed at a position that corresponds to a location behind a physical object (e.g., the back of the user's hand, or other physical objects in the scene) due to the spatial relationship between a viewer and the user interface in the three-dimensional environment provided by the display generation component used by the viewer (e.g., the viewer may be the controlling user, or the non-controlling user), the view of the user interface would be blocked or replaced by the representation of the physical object that is located between the viewer and the location that corresponds to the position of the user interface in the three-dimensional environment. As such, the privacy mode associated with a user interface or a view of a user interface only determines whether the user interface or the view of the user interface is displayed in a view of the three-dimensional environment when the position for displaying the user interface or the view of the user interface is not otherwise blocked or replaced by a virtual object or a representation of a physical object located between the viewer and the position in the three-dimensional environment, given the spatial configuration of the three-dimensional environment at the time.

In some embodiments, the second gesture by the second user includes turning a palm of the second user (e.g., the palm that is holding the user interface object in the view of the three-dimensional environment shown via the second display generation component) away from the first user (and/or turning the palm of the second user toward the face of the second user).

In some embodiments, the computer system used by a first user (e.g., a controlling user (e.g., the user 7002, or the user 7102)) displays, via a first display generation component (e.g., the display generation component used by the controlling user), a first view of a user interface of a first application at a first position within a first view of a three-dimensional environment (e.g., a virtual environment, a simulated reality environment, or an augmented reality environment) that corresponds to a location of at least a portion of a palm that is currently facing the viewpoint corresponding to the first view of the three-dimensional environment that is provided via the first display generation component (e.g., palm facing the user with fingers curled up or fully extended, and a surface of the user interface is displayed parallel to the surface of the user's palm) (e.g., a view of the three-dimensional environment is, for example, a portion of a virtual environment that is currently shown on the display, a portion of a physical environment that is visible through a pass-through portion of a transparent or semitransparent display, or a portion of a camera view of the physical environment shown on the display) (e.g., the viewpoint corresponding to the view of the three-dimensional environment that is provided via the display generation component refers to the user's eyes or the user's face, and the user's palm is facing the user, facing toward the one or more cameras on an HMD wore by the user, or facing the pass-through portion of the display generation component through which the user may view the real world), wherein the first view of the user interface of the first application includes first content (e.g., full details of the user interface is visible). The computer system (e.g., the computer system used by the controlling user) displays, via the first the display generation component (e.g., the display generation component used by the controlling user), a virtual object (e.g., a virtual object that is part of the three-dimensional environment and was not activated by the first user) at a second position within the first view of the three-dimensional environment that corresponds to a location that is beyond first proximity of the palm (e.g., the virtual object is more than an arm's length from a position corresponding to the user's face/eyes in the three-dimensional environment, or simply anywhere outside of the user's palm). While displaying, via the first display generation component, the first view of the user interface of the first application at the first position and the first view of the virtual object at the second position within the first view of the three-dimensional environment, the computer system receives, from a second computer system (e.g., the computer system used by the non-controlling user), a request to establish co-presence within the three-dimensional environment for the first and second computer systems (e.g., a request to allow the user of the first computer system and the user of the second computer system to have a shared experience within the three-dimensional environment via the first and second display generation components). In accordance with the request to establish co-presence within the three-dimensional environment, while displaying the first view of the user interface of the first application at the first position and the first view of the virtual object at the second position within the first view of the three-dimensional environment: in accordance with a determination that the first position corresponds to a location of at least a portion of the palm that is currently facing the viewpoint corresponding to the first view of the three-dimensional environment that is provided via the first display generation component, the computer system provides first display information corresponding the virtual object and second display information corresponding to the user interface of the first application to the second computer system, wherein: the first displaying information corresponding to the virtual object enables display of the virtual object by the second display generation component at a position in a second view of the three-dimensional environment displayed via the second display generation component that corresponds to the second position in the first view of the three-dimensional environment displayed via the first display generation component, and the second displaying information corresponding to the user interface of the first application enables display of an indication (e.g., indication 7216 or indication 7204) of the first application by the second display generation component at a position in the second view of the three-dimensional environment displayed via the second display generation component that corresponds to the location of at least the portion of the palm, without enabling display of the first content by the second display generation component.

In some embodiments, input gestures used in the various examples and embodiments described herein optionally include discrete, small motion gestures performed by movement of the user's finger(s) relative to other finger(s) or part(s) of the user's hand, optionally, without requiring major movement of the user's whole hand or arm away from their natural location(s) and posture(s)) to perform operations immediately prior to or during the gesture) for interacting with a virtual or mixed-reality environment, in accordance with some embodiments.

In some embodiments, the input gestures are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, depth cameras, etc.). For example, the one or more imaging sensors are components of or provide data to a computer system (e.g., computer system 101 in FIG. 1 (e.g., a portable electronic device 7100 or an HMD)) that includes a display generation component (e.g., display generation component 120 in FIGS. 1, 3, and 4 (e.g., a touch-screen display that serves as a display and a touch-sensitive surface, a stereoscopic display, a display with a pass-through portion, etc.). In some embodiments, the one or more imaging sensors include one or more rear-facing cameras on a side of a device opposite from a display of the device. In some embodiments, the input gestures are detected by a sensor system of a head mounted system (e.g., a VR headset that includes a stereoscopic display that provides a left image for the user's left eye and a right image for the user's right eye). For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads up device (such as a heads up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand (e.g., hand 7200), an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism or proximity-based mechanisms allow the user to freely choose whether to execute large motions or remaining relatively stationary when providing the input gestures with his/her hand, without experiencing constraints imposed by a specific input device or input region.

In some embodiments, a micro tap input is a tap input of a thumb over index finger (e.g., over a side of the index finger adjacent to the thumb) of a user's hand. In some embodiments, a tap input is detected without requiring lift-off of the thumb from the side of the index finger. In some embodiments, a tap input is detected in accordance with a determination that downward movement of the thumb are followed by upward movement of the thumb, with the thumb making contact with the side of the index finger for less than a threshold amount of time. In some embodiments, a tap-hold input is detected in accordance with a determination that the thumb moves from the raised position to the touch-down position and remains in the touch-down position for at least a first threshold amount of time (e.g., the tap time threshold or another time threshold that is longer than the tap time threshold). In some embodiments, the computer system requires that the hand as a whole remains substantially stationary in location for at least the first threshold amount of time in order to detect the tap-hold input by the thumb on the index finger. In some embodiments, the touch-hold input is detected without requiring that the hand as a whole is kept substantially stationary (e.g., the hand as a whole may move while the thumb rests on the side of the index finger). In some embodiments, a tap-hold-drag input is detected when the thumb touches down on the side of the index finger and the hand as a whole moves while the thumb rests on the side of the index finger.

In some embodiments, a micro flick gesture is a push or flick input by a movement of a thumb across index finger (e.g., from the palm side to the back side of the index finger). In some embodiments, the extension movement of the thumb is accompanied by upward movement away from the side of the index finger, e.g., as in an upward flick input by the thumb. In some embodiments, the index finger moves in the opposite direction from that of the thumb during the forward and upward movement of the thumb. In some embodiments, a reverse flick input is performed by the thumb moving from an extended position to a retracted position. In some embodiments, the index finger moves in the opposite direction from that of the thumb during the backward and downward movement of the thumb.

In some embodiments, a micro swipe gesture is a swipe input by a movement of a thumb along index finger (e.g., along a side of the index finger adjacent to the thumb or on the side of the palm). In some embodiments, the index finger is optionally in an extended state (e.g., substantially straight) or a curled up state. In some embodiments, the index finger moves between the extended state and the curled up state during the movement of the thumb in a swipe input gesture.

In some embodiments, different phalanges of various fingers correspond to different inputs. A micro tap input of thumb over various phalanges of various fingers (e.g., index finger, middle finger, ring finger, and, optionally, pinky finger) are optionally mapped to different operations. Similarly, in some embodiments, different push or click inputs can be performed by the thumb across different fingers and/or different parts of a finger to trigger different operations in a respective user interface context. Similarly, in some embodiments, different swipe inputs performed by the thumb along different fingers and/or in different directions (e.g., toward the distal or proximal end of a finger) trigger different operations in a respective user interface context.

In some embodiments, the computer system treats tap inputs, flick inputs, and swipe inputs are treated as different types of inputs based on movement types of the thumb. In some embodiments, the computer-system treats inputs having different finger locations that are tapped, touched, or swiped by the thumb as different sub-input-types (e.g., proximal, middle, distal subtypes, or index, middle, ring, or pinky subtypes) of a given input type (e.g., a tap input type, a flick input type, a swipe input type, etc.). In some embodiments, the amount of movement performed by the moving finger (e.g., thumb) and or other movement metrics associated with the movement of the finger (e.g., speed, initial speed, ending speed, duration, direction, movement pattern, etc.) is used to quantitatively affect the operation that is triggered by the finger input.

In some embodiments, the computer-system recognizes combination input types that combines a sequence of movements by the thumb, such as a tap-swipe input (e.g., touchdown of thumb on a finger followed by swiping along the side of the finger), a tap-flick input (e.g., touch-down of thumb over a finger followed by a flick across the finger from palm side to back side of the finger), a double tap input (e.g., two consecutive taps on the side of a finger at about the same location), etc.

In some embodiments, the gesture inputs are performed by an index finger instead of the thumb (e.g., index finger performs the tap or swipe on the thumb, or the thumb and the index finger move toward each other to perform a pinch gesture, etc.). In some embodiments, a wrist movement (e.g., a flick of the wrist in a horizontal direction, or a vertical direction) is performed immediately preceding, immediately succeeding (e.g., within a threshold amount of time) or contemporaneously with the finger movement inputs to trigger additional operations, different operations, or modified operations in the current user interface context, as compared to the finger movement inputs without the modifier input by the wrist movement. In some embodiments, the finger input gestures performed with the user's palm facing the user's face are treated as a different type of gestures from finger input gestures performed with the user's palm facing away from the user's face. For example, a tap gesture performed with the user's palm facing the user performs an operation with added (or reduced) privacy safeguard as compared to an operation (e.g., the same operation) performed in response to a tap gesture performed with the user's palm facing away from the user's face.

Although one type of finger input may be used to trigger a type of operation in the examples provided in this disclosure, other types of finger input are optionally used for trigger the same type of operation in other embodiments.

Additional descriptions regarding FIGS. 7A-7G are provided below in references to methods 8000, 9000, 10000, and 11000 described with respect to FIGS. 8-11 below.

FIG. 8 is a flowchart of a method 800 of interacting with a computer-generated three-dimensional environment (e.g., including displaying application icons at positions corresponding to a location of a user's wrist, and displaying an application at a position corresponding to a location of the user's palm in response to an input directed to the wrist), in accordance with some embodiments.

The method 800 relates to (1) displaying a menu of selectable options that corresponds to different applications at positions in a view of a three-dimensional environment (e.g., an augmented reality environment or a virtual reality environment) corresponding to locations along or around a user's wrist, and (2) displaying a user interface of an application corresponding to a selected option from the menu at a position in the view of the three-dimensional environment that corresponds to a location of the user's palm connected to the wrist. The inner side of the wrist and the palm of the same hand provide convenient and movable surfaces for receiving touch-inputs and gesture inputs by the other hand, and for displaying the selectable options for activating different applications and displaying the user interfaces for the activated application at the same time. The orientation and size of the user interface, and the viewing distance of the user interface are easily controlled by the movement of the user's hand(s) (e.g., through rotational and lateral movements of the hand, and gesture inputs). Using the inner side of the wrist for displaying selectable options for activating applications and receiving selection and/or activation inputs, and using the palm of the same hand for displaying a user interface of an activated application and receiving touch inputs and direct manipulative gestures are intuitive and efficient, reduce the number and extent of the inputs needed to perform operations, thereby providing a more efficient human-machine user interface.

In some embodiments, the method 8000 is performed at a computer system (e.g., computer system 101 in FIG. 1) including a display generation component (e.g., display generation component 120 in FIGS. 1, 3, and 4, and display generation component 7100, 7200 in FIGS. 7A-7G) (e.g., a heads-up display, a display, a touchscreen, a projector, etc.) and one or more input devices (e.g., one or more cameras (e.g., a camera (e.g., color sensors, infrared sensors, and other depth-sensing cameras) that points downward at a user's hand or a camera that points forward from the user's head), controllers, touch-sensitive surfaces, joysticks, buttons, etc.). In some embodiments, the computer system is an integrated device with one or more processors and memory enclosed in the same housing as the display generation component and at least some of the one or more input devices. In some embodiments, the computer system includes a computing component that includes one or more processors and memory that is separate from the display generation component and/or the one or more input devices.

In some embodiments, the display generation component and the one or more input devices are integrated and enclosed in the same housing. In some embodiments, the method 8000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 8000 are, optionally, combined and/or the order of some operations is, optionally, changed.

The computer system detects (8002) a wrist (e.g., a user's wrist 7028 in FIG. 7A) at a location (e.g., a physical location in the real world) that corresponds to a respective position within a view of a three-dimensional environment (e.g., a virtual environment, a simulated reality environment, an augmented reality environment, a mixed reality environment, or a pass-through view (via transparent or semi-transparent display) of a physical environment) that is provided via the display generation component (e.g., display generation component 7100) without displaying representations of applications at the respective position within the view of the respective three-dimensional environment that corresponds to the location of the wrist. In some embodiments, the respective position is a position within a portion of a virtual environment that is currently shown on the display. In some embodiments, the respective position is a position within a portion of a physical environment that is visible through a pass-through portion of a transparent or semitransparent display or a position within a portion of a camera view of the physical environment shown on the display. In some embodiments, the wrist or representation thereof that is visible (e.g., visible to the user on a display, via an HMD with a camera view of the real world, or through an HMD or heads-up display with a transparent portion) at the respective position within the current view of the three-dimensional environment is not overlaid with any application icons or respective controls for launching or activating applications in the three-dimensional environment). In some embodiments, the respective three-dimensional environment (e.g., a virtual or simulated reality environment) is purely virtual and includes computer-generated objects and space. In some embodiments, the respective three-dimensional environment includes a camera view of a physical environment surrounding the user or a camera view of a physical environment that is separate from the user. In some embodiments, the three-dimensional environment includes a pass-through view of a physical environment surrounding the user (e.g., as seen through a transparent display). In some embodiments, a virtual image of the user's hand and wrist is displayed in the three-dimensional environment (e.g., a virtual or simulated reality environment). In some embodiment, a camera image of the user's hand and wrist is displayed in the respective three-dimensional environment (e.g., as part of the camera view of the real world surrounding the user). In some embodiments, the locations of the user's hand and wrist in the real world are mapped to positions within the three-dimensional environment relative to the estimated locations of the user's eyes (assuming the user is using the computer system in a normally expected manner). In some embodiments, the computer system causes the display generation component to display a real-time image or graphical representation of the user's hand and wrist within the view of the three-dimensional environment when the user's hand and wrist enters a region of the real world that corresponds to the field of view of the three-dimensional environment provided by the display generation component. The displayed location of the user's hand and wrist within the view of the three-dimensional environment is determined based on the current location and posture of the user's hand and wrist in the real world. In some embodiments, the user's hand and wrist is part of the physical environment that is seen by the user through a transparent display. While (8004) detecting the wrist (e.g., the wrist 7028 in FIG. 7A) at the location (e.g., a physical location in the real world) that corresponds to the respective position within the view of the three-dimensional environment that is provided via the display generation component (e.g., in response to detecting a change in navigational state of the wrist (e.g., in response to detecting that the wrist turned causing the inner side of the wrist to face the user's eyes) while the wrist is at a location that corresponds to a position within the current view of the three-dimensional environment provided via the display generation component): in accordance with a determination that first criteria are met by a navigational state (e.g., position and/or orientation) of the wrist (e.g., the wrist 7028 in FIG. 7A) (e.g., a current location and posture of the user's hand and wrist (e.g., as detected by one or more cameras, motion sensors, gloves, acceleration sensors, etc.) relative to the user's eyes or the user's gaze direction (e.g., as determined in accordance with a normal usage of the computer system (e.g., the user wearing the HMD on his/her head or looking directly at a display in the usual manner)) meet predetermined criteria that indicate the user will likely be looking at his/her hand and wrist, and/or the inner side of the wrist is facing the user), the computer system displays (8006), via the display generation component, a plurality of representations corresponding to different applications (e.g., application icons 7030 corresponding to different applications in menu 7026 in FIG. 7A) in a first region within the view of the three-dimensional environment provided via the display generation component. Displaying the plurality of representations corresponding to the different applications include displaying a first representation corresponding to a first application (e.g., a first application icon 7030-*a*) at a first position within the view of the three-dimensional environment that corresponds to a first portion of the wrist (e.g., the wrist 7028) (e.g., with the effect that the first representation appears to overlay or replace display of the first portion of the wrist, or block the first portion of the wrist in a pass-through view), and a second representation corresponding to a second application (e.g., a second application icon 7030-*b*) at a second position within the view of the three-dimensional environment that corresponds to a second portion of the wrist (e.g., the wrist 7028) (e.g., with the effect that the second representation appears to overlay or replace display of the second portion of the wrist, or block the second portion of the wrist in a pass-through view). In some embodiments, the plurality of representations corresponding to the different applications are displayed in a carousel or wrist band fashion that is scrollable around the user's wrist or a representation of the wrist that is visible within the view of the three-dimensional environment as provided via the display generation component (e.g., the application icons are displayed overlaying an actual wrist seen through a pass-through portion of a heads-up display or HMD, overlaying a camera view of the actual wrist provided by a HMD, or a overlaying virtual representation of the actual wrist provided by an HMD). In some embodiments, the plurality of representations are scrolled (e.g., some representation moves off the region corresponding to the wrist and cease to be displayed, as other representations coming onto the region corresponding to the wrist and become visible) in response to a swipe input provided by a finger around the user's actual wrist in the real world (e.g., as detected by a camera pointing at the wrist or a touch-sensitive surface attached to the wrist). In some embodiments, the plurality of representations are scrollable along the longitudinal direction of the user's arm in response to swipe inputs (e.g., swipe by a finger of another hand toward or away from the hand that is connected to the wrist) hovering over or on the surface of the user's actual arm. While displaying the plurality of representations corresponding to different applications (e.g., the menu 7026 in FIG. 7A) in the first region within the view of the three-dimensional environment (e.g., the first region corresponds to the location of the user's wrist (e.g., the inner side of the wrist and forearm) facing toward the user's face in the physical environment) provided via the display generation component (e.g., display generation component 7100), the computer system detects (8008) a first input (e.g., a tap input by hand 7022 in FIG. 7B) at a first location on the wrist (e.g., the first input is detected on the wrist in the real world by one or more cameras pointing at the wrist and/or the user, or a touch-sensitive surface attached to the wrist, etc.) that meets predetermined selection criteria (e.g., the first input is a gaze input, a finger tap input, a finger press input, a finger drag input, etc. that meets first duration, intensity, and/or movement criteria, or a combination of two or more of the above with predefined relative timing requirements for the inputs). In response to detecting the first input at the first location on the wrist that meets the predetermined selection criteria (8010): in accordance with a determination that the first location corresponds to the first portion of the wrist (e.g., the gaze/tap/press/drag input is directed to a first application icon (e.g., an instant messaging application) displayed at the first position within the current view of the three-dimensional environment provided by the display generation component) and that at least a portion of a palm (e.g., palm of the hand 7020 in FIG. 7B) that is connected to the wrist (e.g., wrist 7028 in FIG. 7B) is facing toward a viewpoint corresponding to the view of the three-dimensional environment that is provided via the display generation component (e.g., the viewpoint corresponds to the user's eyes or the user's face, and the user's palm is facing the user, facing toward the one or more cameras on an HMD wore by the user, or facing the pass-through portion of the display generation component through which the user may view the real world) (e.g., the palm of the user's hand or a representation thereof is visible within the current view of the three-dimensional environment, concurrently with the user's wrist or representation thereof, and concurrently with the application icons overlaying/blocking/replacing the wrist or representation thereof) (e.g., the viewpoint corresponds to a region that anchors the view of the three-dimensional environment, but the viewpoint does not necessarily refer to any specific point in physical space. For example, when the user's head turns, the viewpoint corresponding to the view changes; but when the user moves his gaze in the view without turning his head, the viewpoint corresponding to the view does not change), the computer system causes (8012) the display generation component (e.g., display generation component 7100) to display a user interface of the first application (e.g., a first view 7036 of the user interface of the application corresponding to selectable option 7030-*a*) at a third position within the view of the three-dimensional environment that corresponds to at least the portion of the palm (e.g., the palm of the hand 7020 in FIG. 7B(B)) (e.g., the palm or a representation of the palm is facing the user with fingers curled up or fully extended, and the user interface of the first application is displayed at a location such that it is perceived by a user looking from the estimated origin of the current view of the three-dimensional environment as overlaying the palm). In response to detecting the first input at the first location on the wrist that meets the predetermined selection criteria (8010): in accordance with a determination that the first location corresponds to the second portion of the wrist (e.g., the gaze/tap/press/drag input is directed to a second application icon (e.g., a media player application) displayed at the second position within the current view of the three-dimensional environment provided via the display generation component) and that at least a portion of the palm that is connected to the wrist is facing toward the viewpoint corresponding to the view of the three-dimensional environment that is provided via the display generation component, the computer system causes (8014) the display generation component to display a user interface of the second application (e.g., a first view of a user interface of an application that corresponds to a different application icon 7030-*b*, or 7030-*c* in the menu 7026) at the third position within the view of the three-dimensional environment that corresponds to at least the portion of the palm (e.g., the palm of the hand 7020). This is illustrated in FIGS. 7A-7B, for example.

In some embodiments, while displaying the plurality of representations corresponding to different applications in the first region within the view of the three-dimensional environment provided via the display generation component, the computer system detects a second input (e.g., a swipe input provided by hand 7022 in FIG. 7A(B)), including detecting a movement on or in proximity to at least a portion of the wrist (e.g., the wrist 7028) (e.g., the second input is detected on or in proximity to at least a portion of the wrist (may extending to a portion of arm connected to the wrist) in the real world by one or more cameras pointing at the wrist and/or the user, or a touch-sensitive surface attached to the wrist, etc.) that faces toward the viewpoint corresponding to the view of the three-dimensional environment (e.g., the movement is along a transverse direction around the wrist or along a longitudinal direction along the inner side of the arm connected to the wrist). In some embodiments, the second input is a finger movement, such as a finger-scroll, or a finger-drag. In some embodiments, the second input is an eye gaze movement. In some embodiments, a distance/magnitude of the movement of the second input is greater than a predetermined threshold, and/or a speed of the movement of the second input satisfies predetermined criteria, e.g., within a predetermined speed range (not too slow or too fast) in order to trigger a response in the view of the three-dimensional environment. In response to detecting the second input (e.g., in accordance with a determination that the movement of the second input is on or in proximity to a portion of the wrist that corresponds to at least a portion of the first region within the view of the three-dimensional environment), the computer system displays, via the display generation component, scrolling of the plurality of representations of (e.g., representations corresponding to) different applications (e.g., scrolling the selectable options 7030 in the menu 7026 in FIG. 7A(B)) in the first region in accordance with the movement of the second input. In some embodiments, scrolling of the plurality of the representations of the different applications includes the one or more representations moving in the same direction as the finger movement (scroll or drag) or the eye gaze movement. In some embodiments, the magnitude (e.g., including speed and distance) of the movement of the representations of the applications corresponds to the magnitude of the finger movement or the eye gaze movement detected on the wrist. In some embodiments, at least a portion of a representation of one application that was previously displayed is no longer displayed, and at least a portion of a representation of another application that was not previously displayed become displayed, as a result of the second input. Displaying scrolling of the plurality of representation corresponding to different applications in the first region in accordance with the movement of the second input in response to detecting second input including movement on or in proximity to at least a portion of the wrist that faces toward the viewpoint, provides additional control options without cluttering the UI with additional displayed controls (e.g., additional displayed controls for scrolling or navigating through the plurality of representations of different applications in the first region). Providing additional control options without cluttering the UI with additional displayed controls enhances the operability of the device, which, additionally, reduces power usage and improves battery life of the device by enabling the user to use the device more quickly and efficiently.

In some embodiments, while displaying the user interface of a respective application of the first and second applications (e.g., the application displayed in response to the first input) at the third position within the view of the three-dimensional environment that corresponds to at least the portion of the palm (e.g., displaying the first view 7036 of a user interface of the application corresponding to selectable option 7030-a, as described in FIG. 7B(B) and FIG. 7F, or the first view 7236 of the user interface of another application in FIG. 7F), the computer system detects a third input that meets second criteria (e.g., the input described with respect to FIG. 7C(A)). In some embodiments, the third position is the position in the augmented reality view of the environment that corresponds to the location of the palm, and as the palm or the user's head moves in the physical environment, the third position on the display is updated to follow the movement of the palm on the display such that the user interface of the respective application appears to be fixed to the palm in the augmented reality view of the environment. In some embodiments, the third input is provided by the hand holding the user interface (e.g., moving the palm and releasing the user interface at a different location), or the third input is provided by a hand that is not connected to the palm (e.g., a drag and release input or a tap input on a side of the object presenting the user interface). In some embodiments, the second criteria include criteria corresponding to switching from private mode to semi-private mode for displaying applications, or switching from displaying in palm to displaying on tabletop. In some embodiments, the second criteria distinguish inputs for moving the user interface or application as a whole from inputs directed to the user interface to trigger an operation within the application).

In response to detecting the third input: the computer system ceases to display the user interface of the respective application at the third position within the view of the three-dimensional environment that corresponds to at least the portion of the palm (e.g., in the augmented reality view of the environment, the user interface of the respective application leaves the palm and is displayed at another location) (e.g., as shown in FIG. 7C(B), or FIG. 7G, where the first view 7036 of the user interface and the first view 7236 of the user interface are no longer displayed at positions corresponding to the controlling user's palm/hand); and the computer system displays the user interface of the respective application (e.g., the second view 7036' of the user interface of an application in FIG. 7C(B), the second view 7236" of the user interface of another application in FIG. 7G) at a fourth position within the view of the three-dimensional environment that is different from the third position. In some embodiments, the fourth position is the position in the augmented reality view of the environment that corresponds to a portion of the physical environment (e.g., a detected plane or surface for supporting the respective user interface in the AR environment (e.g., the top surface of the object 7014)), and as the user's head and the portion of the physical environment move relative to each other in the physical environment, the fourth position on the display is updated to follow the movement of the portion of the physical environment on the display such that the user interface of the respective application appears to be fixed to the portion of the physical environment in the augmented reality environment. In some embodiments, the fourth position corresponds to a predetermined plane in the three-dimensional environment (e.g., the fourth positions corresponds to a location of a tabletop or other predetermined vertical or horizontal physical surface in the physical environment, or a virtual plane (e.g., a virtual table top or virtual display screen in the augmented reality environment). In some embodiments, the fourth position is a position floating in unoccupied space in the three-dimensional environment.

In some embodiments, the portion of the three-dimensional environment that corresponds to the user's palm is protected and private and not shown to other users viewing the same three-dimensional environment in a shared experience, while the portion of the three-dimensional environment that corresponds to the predetermined plane is partially protected and may be partially visible (e.g., only certain types of content are visible, and not all content is visible) to other users viewing the same three-dimensional environment in the shared experience. In some embodiments, the user interface of the first application is displayed on a first facet of a three-dimensional object (e.g., a front or a top surface of the 3D object) at the third position that corresponds to at least the portion of the palm that is facing toward the viewpoint corresponding to the view of the three-dimensional environment. The computer system detects the third input (e.g., the third input is a finger tap input, a pinch and drag input, etc.) at a location (e.g., a physical location in the real world) corresponding to a second facet (e.g., a back or a side surface of the 3D object) or a corner of the three-dimensional object; and in response to detecting the third input, in accordance with a determination that the third input meets the predetermined second criteria (e.g., the third input is not directed to the first facet of the three-dimensional object (e.g., input directed to the first facet is provided to the application and triggers functions within the application), but to a corner or other facets of the three-dimensional object), the computer system moves the three-dimensional object from the third position to the predetermined plane with the first facet of the three-dimensional object facing toward the viewpoint corresponding to the view of the three-dimensional environment. In some embodiments, the second criteria include predetermined gesture criteria: e.g., the third input is a finger tap input (e.g., satisfying predetermined contact pressure criteria and/or predetermined contact time period criteria), a finger flick input, a finger swipe input, a pinch and drag input (e.g., satisfying predetermined distance, direction, and/or swiping speed) directed to the three-dimensional object. In some embodiments, the second criteria are different from the predetermined selection criteria, e.g., the second criteria require that the contact intensity is below a predefined intensity threshold whereas the selection criteria require a greater contact intensity above the predefined intensity threshold, and/or the second criteria require that the contact time is shorter than a predefined time threshold whereas the selection criteria requires a longer contact time period.

In some embodiments, the computer system automatically resizes the three-dimensional object (e.g., enlarges) in accordance with a size of the predetermined plane (e.g., size of the tabletop). In some embodiments, the computer system displays an animated transition showing the user interface of the respective application moves away from the third position (e.g., from the user's palm) and to the fourth position (e.g., onto the predetermined plane) in the view of the three-dimensional environment. In some embodiments, the destination position of the user interface of the respective application (e.g., the position in the view that corresponds to the location of the predetermined plane in the three-dimensional environment) is selected based on one or more properties of the user's input and one or more properties of the three-dimensional environment. In some embodiments, the destination position corresponds to a physical surface detected/identified by the cameras and/or other sensors (e.g., motion sensors), the physical surface satisfying predetermined criteria, e.g., within a predefined range, and including a substantially flat surface (e.g., vertical, horizontal, or tilted) that is larger than a predefined threshold (e.g., suitable for displaying and/or user interacting with a user interface of an app). In some embodiments, the destination position is a virtual object or a virtually augmented physical object (e.g., a virtual surface displayed on a camera view or a see-through view overlaying or replacing display of a physical object) displayed within the view of the three-dimensional environment). In some embodiments, the destination position is specified by a hand movement or gaze movement that follows or precedes the third input, e.g., the hand or gaze movement that points to a physical surface corresponding to the destination position within the view of the three-dimensional environment. In some embodiments, an affordance is displayed on the user interface of the first application that, when activated by an input, sends the user interface of the first application to a nearby surface. In some embodiments, the affordance is automatically shown whenever a surface suitable for displaying the user interface is detected in the three-dimensional environment.

Ceasing to display the user interface of the respective application at the third position and displaying the user interface of the respective application at a fourth position, in response to detecting the third input that meets second criteria, reduces the number of inputs needed to display the user interface of the respective application at the fourth position (e.g., without requiring additional inputs to select the respective application and/or cease to display the user interface of the respective application at the third position). Reducing the number of inputs needed to perform an operation enhances the operability of the device, which, additionally, reduces power usage and improves battery life of the device by enabling the user to use the device more quickly and efficiently.

In some embodiments, detecting the third input includes detecting a first portion of the third input (e.g., a two-finger pinch and drag gesture directed to the corner of the three-dimensional object with the user interface of the application on its first facet) and detecting a second portion of the third input (e.g., a tap input by a single finger directed to the second facet of the user interface object with the user interface of the application on its first facet) after the first portion of the third input (e.g., the first portion of the third input and the second portion of the input do not have to be a single continuous input or provided by the same fingers or hand; and the second portion of the third input optionally occurs sometime after the completion of the first portion of the third input (e.g., within a preset time window)). In some embodiments, in response to detecting the first portion of the third input (e.g., a pinch and drag input by another hand that includes a pinch gesture at the location of the palm followed by a drag gesture that puts the 3D object presenting the user interface of the application in the holding position away from the palm; or the palm turning away from the user and optionally placing the 3D object in the holding position), the computer system moves the user interface of the respective application from the third position within the view of the three-dimensional environment (e.g., from the user's palm) to a holding position within the view of the three-dimensional environment (e.g., suspended in space in the three-dimensional environment). In response to detecting the second portion of the third input (e.g., a tap or push (e.g., by the same hand or another hand) on the 3D object while the 3D object is in the holding position), the computer system moves the user interface of the respective application at the holding position (e.g., suspended in space in the three-dimensional environment) to the destination position (e.g., a plane detected in the three-dimensional environment) within the view of the three-dimensional environment. In some embodiments, when there are multiple suitable surfaces/planes (e.g., nearby tabletop, whiteboard, wall, etc.) for displaying the user interface of the application, the computer system selects the surface/plane based on one or more properties (e.g., speed, direction, duration, movement, distance, etc.) of the second portion of the third input. Moving the user interface of the respective application from the third position to a holding position in response to detecting the first portion of the third input that meets second criteria, and moving the user interface of the respective user interface of the respective application at the holding position to the destination position within the view of the three-dimensional environment in response to detecting the second part of the third input that meets second criteria, provides improved visual feedback to the user (e.g., regarding which respective application the user is interacting with and whether the computer system is detecting the first or second portion of the third input). Providing improved feedback enhances the operability of the device, which, additionally, reduces power usage and improves battery life of the device by enabling the user to use the device more quickly and efficiently.

In some embodiments, displaying the user interface of the respective application at the fourth position within the view of the three-dimensional environment includes: in accordance with a determination that the fourth position is a first plane (e.g., the first plane is the tabletop because the third input meets first plane selection criteria), displaying the user interface of the respective application at the fourth position within the view of the three-dimensional environment with a first size that is different from a size of the user interface of the respective application when displayed at the third position within the view (e.g., the user interface displayed on the first plane at a first destination position (e.g., a nearby tabletop) is larger than the user interface displayed on the use's palm, e.g., the size of the user interface is changed to be proportional to the size of the first plane). In some embodiments, the user interface of the respective application is oriented in accordance with the orientation of the first plane, e.g., the user interface lays flat or has a fixed angle (e.g., perpendicular, or at 120 degree angle) relative to the first plane. In some embodiments, other visual characteristics, e.g., the color, opacity, brightness, font size, line thickness, etc. of the user interface displayed on the first plane are also changed from those shown when the user interface was displayed on the user's palm).

In some embodiments, a version (e.g., a different version) of the user interface of the respective application is displayed on the first plane as compared to the version shown on the user's palm. For example, in some embodiments, the version of the user interface displayed on a nearby tabletop includes more content (e.g., more texts/images, more details) than the version of the user interface displayed on the palm, because more display area is available). In some embodiments, the version of the user interface displayed on the nearby tabletop includes less content or modified content as compared to the version of the user interface displayed on the palm, because private information is redacted or concealed. In some embodiments, the version of the user interface displayed at the fourth position has the same content as the version of the user interface displayed on the palm (e.g., the private content shown on the palm is made public to other users sharing the same three-dimensional environment when the user interface is placed at the fourth position).

In some embodiments, the fourth position on the display corresponds to empty space or a wall, and in accordance with a determination that the fourth position corresponds to empty space or a wall in the three-dimensional environment, the computer system displays the user interface of the respective application at the fourth position without redacting any content from the user interface of the respective application as compared to that previously shown at the palm. In some embodiments, placing the user interface in empty space or a wall corresponds to a request to allow other users sharing the three-dimensional environment to view the user interface without redaction; and placing the user interface on a nearby tabletop corresponds to a request to keep the user interface private or semi-private (e.g., with redaction of at least some content from the user interface of the respective application as compared to that previously shown at the palm). In some embodiments, the destination location of the user interface of the respective application (e.g., which surface or portion of empty space that the user interface will land) is selected by the computer system in accordance with magnitudes and timing of a set of predefined characteristics of the third input (e.g., speed, duration, distance, etc.) and/or direction (e.g., a location that is closer to the user is chosen for the user interface if the gesture is slower and/or shorter and a location that is further from the user is chosen for the user interface if the gesture is faster and/or longer).

Displaying the user interface of the respective application at the fourth position with a first size different from a size of the user interface when displayed at the third position, in accordance with a determination that the fourth position is a first plane, displays the user interface of the respective application at a different size when a set of conditions has been met without requiring further user input (e.g., further user input to specify the correct size for the user interface of the respective application). Performing an operation when a set of conditions has been met without requiring further user input enhances the operability of the device, which, additionally, reduces power usage and improves battery life of the device by enabling the user to use the device more quickly and efficiently.

In some embodiments, displaying the user interface of the respective application at the fourth position within the view of the three-dimensional environment includes: in accordance with a determination that the fourth position is a second plane distinct from the first plane (e.g., the second plane is the wall or whiteboard, or front face of the refrigerator, etc., because the third input meets second plane selection criteria that are different from the first plane selection criteria), displaying the user interface of the respective application at the fourth position within the view of the three-dimensional environment with a second size that is different from the first size and the size of the user interface of the respective application when displayed at the third position within the view (e.g., the user interface displayed on the second plane at a second destination position (e.g., wall, whiteboard, or front of a refrigerator, etc.) is larger than the user interface displayed on the use's palm or the tabletop. In some embodiments, the user interface of the respective application is oriented in accordance with the orientation of the second plane, e.g., the user interface lays flat or has a fixed angle (e.g., perpendicular, or at 120 degree angle) relative to the second plane. In some embodiments, other visual characteristics, e.g., the color, opacity, brightness, font size, line thickness, etc. of the user interface displayed on the second plane are also changed from those shown when the user interface was displayed on the user's palm or the first plane).

In some embodiments, a version (e.g., a different version) of the user interface of the respective application is displayed on the second plane as compared to the versions shown on the user's palm and the first plane. For example, in some embodiments, the version of the user interface displayed on the wall includes more content (e.g., more texts/images, more details) than the versions of the user interface displayed on the palm or the nearby tabletop, because more display area is available). In some embodiments, the version of the user interface displayed on the wall includes less content or modified content as compared to the versions of the user interface displayed on the palm and the first plane, because private information is redacted or concealed or because the application is operating in a different display mode such as a presentation mode in which detailed information is not displayed. In some embodiments, the first plane selection criteria and the second plane selection criteria have different requirement for the third input, e.g., based on gesture type (e.g., tap for displaying on first plane and throw or toss for displaying on the second plane; hand movement for displaying on first plane and arm movement for displaying on second plane, etc.) and/or movement characteristics (e.g., speed, location, distance, intensity, etc.).

Displaying the user interface of the respective application at the fourth position with a second size different from the first size and the size of the user interface of the respective application when displayed at the third position, in accordance with a determination that the fourth position is a second plane distinct from the first plane, displays the user interface of the respective application at the second size when a set of conditions has been met without requiring further user input (e.g., further user input to specify the second size, different from the first size, of the user interface of the respective application). Performing an operation when a set of conditions has been met without requiring further user input enhances the operability of the device, which, additionally, reduces power usage and improves battery life of the device by enabling the user to use the device more quickly and efficiently.

In some embodiments, while displaying the user interface of a respective application of the first and second applications, the computer system detects a first pinch-drag gesture (e.g., detecting the pinch-drag gesture includes detecting the thumb coming into contact with the index finger or any of the other fingers of the same hand, followed by movement of the hand while the finger pinch gesture is maintained by the hand) (e.g., the pinch-drag gesture is detected at a location of the physical environment that correspond to (e.g., at or within a threshold distance of) a corner of the user interface of the respective application in the three-dimensional environment). In response to detecting the first pinch-drag gesture: in accordance with a determination that the first pinch-drag gesture meets third criteria (e.g., resizing criteria), wherein the third criteria include a first criterion that requires the first pinch-drag gesture to start with a pinch gesture directed to a first boundary portion (e.g., a corner or edge) of the user interface of the respective application (e.g., displayed at the third position within the view of the three dimensional environment (e.g., the position that corresponds to at least the portion of the palm)), the computer system resizes the user interface of the respective application (e.g., displayed at the third position) in accordance with movement of the hand in the first pinch-drag gesture. In some embodiments, detecting the first pinch-drag gesture includes detecting a pinch gesture at a third location that is on the palm or inner side of the hand or near the boundary of the hand supporting the user interface of the respective application, and the third location corresponds to the position of a corner or edge (e.g., a resize handle) of the 3D object that presents the user interface. In some embodiments, the hand providing the pinch gesture moves in a direction across (e.g., as opposed to toward or away from) the palm or inner side of the hand supporting the user interface of the respective application while maintaining the pinch gesture (e.g., as opposed to ceasing contact between the thumb and the other finger of the same hand in a toss or throw-away gesture). Resizing the user interface of the respective application in accordance with the movement of the hand in the first pinch gesture that meets third criteria reduces the number of inputs needed to resize the user interface of the respective application (e.g., the user does not need to perform additional inputs to select an affordance to allow resizing of the user interface of the respective application). Reducing the number of inputs needed to perform an operation enhances the operability of the device, which, additionally, reduces power usage and improves battery life of the device by enabling the user to use the device more quickly and efficiently.

In some embodiments, while the user interface of the respective application is displayed at the third position within the view of the three-dimensional environment that corresponds to at least the portion of the palm (that is connected to the wrist), the third criteria further include a second criterion that requires the hand to move in a direction relative to the palm (e.g., parallel to the palm and/or away from a center of the palm in a an x, y or z direction relative to a plane of the palm) while the hand maintains the pinch gesture, in order for the third criteria to be met. Requiring that the hand move in a direction relative to the palm while the hand maintains the pinch gesture in order for the third criteria to be met reduces the number of inputs needed to resize the user interface of the respective application (e.g., the user does not need to perform additional inputs to select an affordance to allow resizing of the user interface of the respective application). Reducing the number of inputs needed to perform an operation enhances the operability of the device, which, additionally, reduces power usage and improves battery life of the device by enabling the user to use the device more quickly and efficiently.

In some embodiments, while the user interface of the respective application is displayed at a fourth position within the view of the three-dimensional environment that corresponds a portion of the physical environment other than at least the portion of the palm (e.g., while the user interface is displayed on a tabletop, floating in empty space, or on a wall), the third criteria further include a second criterion that require a second pinch-drag gesture directed to a second boundary portion opposing the first boundary portion (e.g., a corner or edge) of the user interface of the respective application is detected concurrently with the first pinch-drag gesture, in order for the third criteria to be met. For example, in some embodiments, the first pinch-drag gesture and the second pinch-drag gesture are provided by two separate hands of the user while the user interface of the respective application is displayed at a location away from the palm, and the two pinch-drag gesture drags two opposing edge or corners of the user interface away from each other to expand the user interface or toward each other to shrink the user interface in the three-dimensional environment. Further requiring that a second pinch-drag gesture directed to a second boundary portion opposing the first boundary portion of the user interface of the respective application be concurrently detected with the first pinch-drag gesture in order for third criteria to be met reduces the number of inputs needed to resize the user interface of the respective application (e.g., the user does not need to perform additional inputs to select an affordance to allow resizing of the user interface of the respective application). Reducing the number of inputs needed to perform an operation enhances the operability of the device, which, additionally, reduces power usage and improves battery life of the device by enabling the user to use the device more quickly and efficiently.

In some embodiments, the first boundary portion of the user interface of the respective application displayed at the third position within the view of the three dimensional environment (e.g., the position that corresponds to at least the portion of the palm) includes an identifier object corresponding to the respective application, and the identifier object corresponding to the respective application is displayed at a position in the view of the three-dimensional environment that is at least partially outside of the position in the view of the three-dimensional environment that corresponds to the palm (e.g., an application icon sticks out above the user interface of the respective application and the hand supporting the user interface of the respective application, such that the application icon can be grabbed by a pinch gesture that does not make contact with the hand supporting the user interface of the respective application). In some embodiments, the pinch and drag gesture directed to the identifier of the respective application does not resize the user interface of the respective application, but instead repositions the user interface (e.g., rotates or moves the user interface laterally) within the view of the three-dimensional environment. Including an identifier object that corresponds to the respective application in the first boundary portion of the user interface, displayed at a position that is at least partially outside of the position corresponding to the palm in the view of the three-dimensional environment reduces the number of inputs needed to resize the user interface of the respective application (e.g., the user does not need to perform additional inputs to select an affordance to allow resizing of the user interface of the respective application, and minimizes the number of accidental inputs or user inputs directed to the user interface that are not correctly detected by the computer system by displaying the identifier object at a position at least partially outside the position corresponding to the palm). Reducing the number of inputs needed to perform an operation enhances the operability of the device, which, additionally, reduces power usage and improves battery life of the device by enabling the user to use the device more quickly and efficiently.

In some embodiments, the user interface of the first application has a first size when displayed at the third position in the view of the three-dimensional environment and the user interface of the second application has a second size that is different from the first size when displayed at the third position in the view of the three-dimensional environment. For example, the first application is a maps application and the size of the user interface when the maps application is displayed on the user's palm is a first predetermined size set by the maps application; and the second application is an instant messaging application and the size of the user interface when the instant messaging application is displayed on the user's palm is a second predetermined size set by the instant messaging application. This is distinct from the case where user interfaces of different applications are displayed with the same size on a handheld device with a small, fixed screen size. This is also distinguishable from the case where application windows may have various sizes on a large fixed display size. In the case where the user interface of applications are displayed at a position on the display that corresponds to the location of the user's palm, the size of the user interface that can be set by an application is constrained by the size of the palm, but at the same time, is not completely without variation (e.g., a range of sizes are possible and may vary within a preset percentage of the size of the palm). In some embodiments, the same application optionally has a first size and a second size when displayed at the third position in the view of the three-dimensional environment that corresponds to the location of the palm, and the displayed size of the user interface of the application is selected based on the size of the hand, the particular user interface of the application that is displayed (e.g., different user interfaces in the same application may have different default sizes), and/or the posture of the hand (e.g., fingers extended or scrunched), etc. Displaying the first application at a first size at the third position, and the second application at a second size different from the first size at the third position, provides improved visual feedback to the user (e.g., regarding which location an application is displayed at). Providing improved feedback enhances the operability of the device, which, additionally, reduces power usage and improves battery life of the device by enabling the user to use the device more quickly and efficiently.

In some embodiments, in response to detecting the first input at the first location that meets the predetermined selection criteria: in accordance with a determination that the first location corresponds to the first portion of the wrist (and the first position within the view of the three-dimensional environment at which the first representation corresponding to the first application is displayed) (and optionally, that at least a portion of the palm that is connected to the wrist is facing toward the viewpoint corresponding to the view of the three-dimensional environment), the computer system changes a visual appearance of the first representation corresponding to the first application (e.g., the application icon of the first application is enlarged and moves toward the viewpoint corresponding to the view of the three-dimensional environment (e.g., toward the user's face) in response to the input), while the visual appearance of the second representation corresponding to the second application is maintained and unchanged); and in accordance with a determination that the first location corresponds to the second portion of the wrist (and the second position within the view of the three-dimensional environment at which the second representation corresponding to the second application is displayed) (and optionally, that at least a portion of the palm that is connected to the wrist is facing toward the viewpoint corresponding to the view of the three-dimensional environment), the computer system changes a visual appearance of the second representation corresponding to the second application (e.g., the application icon of the second application is enlarged and moves toward the viewpoint corresponding to the view of the three-dimensional environment (e.g., toward the user's face) in response to the input, while the visual appearance of the first representation corresponding to the first application is maintained and unchanged). Changing a visual appearance of the first representation corresponding to the first application in accordance with a determination that the first location corresponds to the first portion of the wrist, and changing a visual appearance of the second representation corresponding to the second application in accordance with a determination that the first location corresponds to the second portion of the wrist, provides improved visual feedback to the user (e.g. visual feedback regarding which location the computer system has detected the first input at, and which representation the user is interacting with). Providing improved feedback enhances the operability of the device, which, additionally, reduces power usage and improves battery life of the device by enabling the user to use the device more quickly and efficiently.

In some embodiments, while displaying the user interface of a respective application of the first and second applications at a respective position within the view of the three-dimensional environment that corresponds to at least the portion of the palm (e.g., after the user interface is displayed in response to detecting the input at the first location that corresponds to the first portion of the wrist), the computer system detects a movement of the palm relative to the viewpoint corresponding to the view of the three-dimensional environment (e.g., the user moves or shakes the hand/arm/wrist relative to her head, or moves her head wearing the HMD relative to her palm, or moves the palm relative to the cameras and/or motion sensors of the computer system, etc.). In response to detecting the movement of the palm relative to the viewpoint corresponding to the view of the three-dimensional environment: in accordance with a determination that the movement of the palm includes a rotation (e.g., a change in orientation (e.g., rotate around an axis that points toward the viewpoint corresponding to the three-dimensional environment, or rotate toward or away from the viewpoint corresponding to the three-dimensional environment)) of the palm relative to the viewpoint corresponding to the view of the three-dimensional environment, the computer system maintains an orientation of the user interface of the respective application relative to the viewpoint corresponding to the view of the three-dimensional environment, irrespective of the rotation of the palm relative to the viewpoint corresponding to the view of the three-dimensional environment (e.g., the orientation of the respective user interface on the palm is locked to the orientation of the user's head or gaze, and changes relative to the orientation of the palm when the palm rotates relative to the user's head or gaze). In some embodiments, the user interface has a upright portrait orientation relative to the user's head/gaze while the user is standing upright with his/her palm held in a first orientation relative to the user's head/gaze; and the computer system maintains that upright portrait orientation of the user interface relative to the user's head/gaze when the user lies down on his/her side, irrespective of the palm's orientation relative to the user's head/gaze.

In some embodiments, the user interface has a upright portrait orientation relative to the user's head/gaze while the user is standing upright with his/her palm held in a first orientation relative to the user's head/gaze; and the computer system maintains that upright portrait orientation of the user interface relative to the user's head/gaze when the user rotates his/her palm away or toward the user's head/face. In some embodiments, in response to detecting the movement of the palm relative to the viewpoint corresponding to the view of the three-dimensional environment: in accordance with a determination that the movement of the palm includes a lateral movement of the palm relative to the viewpoint corresponding to the view of the three-dimensional environment, the computer system moves the user interface of the respective application laterally within the view of the three-dimensional environment in accordance with the lateral movement of the palm relative to the viewpoint corresponding to the view of the three-dimensional environment. For example, when the user's palm moves laterally relative to the user's head, the user interface appears to remain on the user's palm when the representation of the user's palm moves in the view of the three-dimensional environment.

Maintaining an orientation of the user interface of the respective application relative to the viewpoint corresponding to the view of the three-dimensional environment irrespective of the rotation of the user's palm relative to the viewpoint and in accordance with a determination that the movement of the user's palm includes a rotation of the palm relative to the viewpoint reduces the number of inputs needed to display the user interface of the respective application at the desired location and with the desired orientation (e.g., the user does not need to adjust the orientation of the user interface of the respective application if the user rotates their palm relative to the viewpoint). Reducing the number of inputs needed to perform an operation enhances the operability of the device, which, additionally, reduces power usage and improves battery life of the device by enabling the user to use the device more quickly and efficiently.

In some embodiments, while displaying the user interface of a respective application of the first and second applications at a respective position within the view of the three-dimensional environment that corresponds to at least the portion of the palm (e.g., after the user interface is displayed in response to detecting the input at the first location that corresponds to the first portion of the wrist), the computer system detects a movement of the palm relative to a respective viewpoint corresponding to the view of the three-dimensional environment (e.g., the user moves or shakes the hand/arm/wrist relative to her head, or moves her head wearing the HMD relative to her palm, or moves the palm detected by the cameras and/or motion sensors of the computer system, etc.). In response to detecting the movement of the palm relative to the respective viewpoint, the computer system updates a position or orientation (e.g., or both) of the user interface of the respective application in the view of the three-dimensional environment in accordance with the movement of the palm (e.g., rotation and/or lateral movement of the palm relative to the physical environment and/or relative to the user's head/face) (e.g., such that the user interface of the respective application has a fixed position and/or orientation relative to the palm within the view of the three-dimensional environment). In some embodiments, when the user's palm does not move relative to the physical environment and the user's head or gaze moves relative to the user's palm and the physical environment (e.g., the palm moves relative to the viewpoint of the three-dimensional environment), the position and orientation of the user interface is updated in the view of the three-dimensional environment such that the position and orientation of the user interface appears to be fixed relative to the representation of the palm in the view of the three-dimensional environment (while the view of the three-dimensional environment is updated in accordance with the movement of the user's head or gaze moves relative to the physical environment). Updating a position or orientation of the user interface of the respective application in accordance with movement of the user's palm relative to the respective viewpoint reduces the number of inputs needed to display the user interface of the respective application at the desired location with the desired orientation (e.g., the user does not need to perform additional inputs to allow the orientation of the user interface of the respective application to be updated). Reducing the number of inputs needed to perform an operation enhances the operability of the device, which, additionally, reduces power usage and improves battery life of the device by enabling the user to use the device more quickly and efficiently.

In some embodiments, displaying the user interface of a respective application of the first and second applications that is displayed at the third position within the view of the three dimensional environment corresponding to at least the portion of the palm (e.g., in response to the first input at the first location on the wrist that meets the predetermined selection criteria) includes selecting a size of the user interface of the respective application of the first and second applications to be displayed at the third position within the view of the three dimensional environment corresponding to at least the portion of the user's palm in accordance with a dimension of the palm as visually represented in the view of the three-dimensional environment (e.g., the physical dimension of the palm is determined by processing image data obtained by the cameras or other type of sensor data; e.g., the user interface is displayed to be larger (e.g., with a bigger zoom level or font size) on a bigger palm, and/or on a palm that appears bigger in the view of the three-dimensional environment (e.g., the palm is closer to the user's face or the one or more cameras of the computer system). Selecting a size of the user interface of the respective application of the first and second applications to be displayed in accordance with a dimension of the user's palm as visually represented in the view of the three-dimensional environment reduces the number of inputs needed to display the user interface of the respective application of the first and second applications at an appropriate size (e.g., the user does not need to perform additional inputs to resize the user interface of the respective application of the first and second applications for comfortable viewing). Reducing the number of inputs needed to perform an operation enhances the operability of the device, which, additionally, reduces power usage and improves battery life of the device by enabling the user to use the device more quickly and efficiently.

In some embodiments, the computer system changes a size of the user interface of the first application that is displayed at the third position within the view of the three dimensional environment corresponding to at least the portion of the palm (e.g., in response to the first input at the first location on the wrist that meets the predetermined selection criteria) in accordance with movement of one or more fingers connected to the palm (e.g., movement of the one or more fingers relative to the palm such as scrunching or stretching out of the fingers connected to the palm changes the size of the user interface displayed over the palm). In some embodiments, when the fingers scrunch, the user interface of the first application shrinks; and when the fingers straighten, the user interface returns to its original size. Changing a size of the user interface of the first application in accordance with movement of one or more fingers connected to the user's palm reduces the number of inputs to change the size of the user interface of the first application (e.g., the user does not need to select an affordance to change the size of the user interface of the first application). Reducing the number of inputs needed to perform an operation enhances the operability of the device, which, additionally, reduces power usage and improves battery life of the device by enabling the user to use the device more quickly and efficiently.

In some embodiments, while displaying the user interface of the first application at the third position within the view of the three dimensional environment that corresponds to at least the portion of the palm, the computer system detects a fourth input by a finger that is not connected with the palm (e.g., the palm and the finger are parts of two different hands) on a portion of the palm that corresponds to the third position within the view of the three dimensional environment (e.g., a finger tap/pinch/press/on the portion of the palm corresponding to the user interface at the third position in the view). In response to detecting the fourth input by the finger that is not connected to the palm: in accordance with a determination that the fourth input by the finger that is not connected to the palm meets predetermined fourth criteria (e.g., the fourth criteria are associated with a predetermined gesture type, e.g., a finger tap/pinch/drag, contact pressure, time period, and/or moving distance, etc.), the computer system performs a first operation in the user interface of the first application. For example, the first operation includes selection/activation of an affordance displayed on the user interface. In some embodiments, the first operation includes moving an object displayed on the user interface or a position of the display of the user interface in accordance with a pinch and dragging gesture detected on the palm, where the direction, speed, and/or magnitude of the movement is in accordance with the direction, speed, and/or magnitude of the gesture movement. In some embodiments, the first operation includes rotating a visual representation of the user interface in accordance with the pinch and rotate gesture. In some embodiments, the first operation includes zooming in/out the visual representation of the user interface in response to pinching and dragging gesture detected on a portion of the palm corresponding to a corner of the user interface, where the speed, direction and/or magnitude of the zoom-in/zoom-out process is proportional to the corresponding parameters of the dragging gesture and the pinched corner may show a visual effect (e.g., glow, folded, enlarged corner, etc.)). In some embodiments, the first operation is performed when the finger of the second hand makes contact with the palm. In some embodiments, the first operation is performed when the finger of the second hand ceases contact with (e.g., lifts off) the palm. Performing a first operation in the user interface of the first application in accordance with a determination that the fourth input by the finger that is not connected with the palm, is on a portion of the user's palm, and meets fourth criteria, provides additional control options without cluttering the UI with additional displayed controls (e.g., additional displayed controls for performing the first operation in the user interface of the first application). Providing additional control options without cluttering the UI with additional displayed controls enhances the operability of the device, which, additionally, reduces power usage and improves battery life of the device by enabling the user to use the device more quickly and efficiently.

It should be understood that the particular order in which the operations in FIG. 8 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 10000, and 11000) are also applicable in an analogous manner to method 8000 described above with respect to FIG. 8. For example, the gestures, gaze inputs, physical objects, user interface objects, and/or animations described above with reference to method 8000 optionally have one or more of the characteristics of the gestures, gaze inputs, physical objects, user interface objects, and/or animations described herein with reference to other methods described herein (e.g., methods 9000, 10000, and 11000). For brevity, these details are not repeated here.

FIG. 9 is a flowchart of a method 9000 of interacting with a computer-generated three-dimensional environment (e.g., including moving an application user interface from a first display position corresponding to a location of the user's palm to a second display position corresponding to another surface in the physical environment, and resizing the application user interface relative to the three-dimensional environment in conjunction with the movement to the second display position), in accordance with some embodiments.

The method 9000 disclosed herein relates to transferring display of a user interface of an application from a position in the view of a three-dimensional environment that corresponds to a location of a user's palm to another position that corresponds to a location of a surface other than the palm in a physical environment. The size and optionally the orientation, position and/or orientation lock, privacy mode, content, and/or interaction model, etc. associated with the user interface is automatically adjusted when the position of the user interface is changed from the position corresponding to the palm to the position corresponding to the surface other than the palm. Automatically adjusting a size, and optionally the orientation, position and/or orientation lock, privacy mode, content, and/or interaction model associated with the user interface reduces the number and extent of the inputs required to perform an operation and/or achieve a desired outcome in the three-dimensional environment, and thereby providing a more efficient human machine interface.

In some embodiments, the method 9000 is performed at a computer system (e.g., computer system 101 in FIG. 1) including a display generation component (e.g., display generation component 120 in FIGS. 1, 3, and 4, and display generation component 7100, 7200 in FIGS. 7A-7G) (e.g., a heads-up display, a display, a touchscreen, a projector, etc.) and one or more input devices (e.g., one or more cameras (e.g., a camera (e.g., color sensors, infrared sensors, and other depth-sensing cameras) that points downward at a user's hand or a camera that points forward from the user's head), controllers, touch-sensitive surfaces, joysticks, buttons, etc.). In some embodiments, the computer system is an integrated device with one or more processors and memory enclosed in the same housing as the display generation component and at least some of the one or more input devices. In some embodiments, the computer system includes a computing component that includes one or more processors and memory that is separate from the display generation component and/or the one or more input devices. In some embodiments, the display generation component and the one or more input devices are integrated and enclosed in the same housing. In some embodiments, the method 9000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 9000 are, optionally, combined and/or the order of some operations is, optionally, changed.

In method 9000, the computer system displays (9002), via the display generation component (e.g., display generation component 7100 in FIG. 7B(B), or display generation component 7200 in FIG. 7F), a first view of a user interface of a first application (e.g., the first view 7036 of the user interface of the first application in FIG. 7B(B), or the first view 7236 of the user interface of the second application in FIG. 7F) (e.g., a 2D user interface or a 3D object) at a first position within a view of a three-dimensional environment that corresponds to a location of at least a portion of a palm (e.g., palm of the hand 7020 in FIG. 7B(B), or palm of the hand 7214 in FIG. 7F) (e.g., the first view of the user interface appears overlaid on or replacing the at least a portion of the palm in the view of the three-dimensional environment) that is currently facing a viewpoint corresponding to the view of a three-dimensional environment (e.g., a virtual environment, a simulated reality environment, an augmented reality environment, a pass-through view of a physical environment, etc.) that is provided via the display generation component (e.g., palm facing the user with fingers curled up or fully extended, and a surface of the user interface is displayed parallel to the surface of the user's palm). In some embodiments, the view of the three-dimensional environment is, for example, a portion of a virtual environment that is currently shown on the display, a portion of a physical environment that is visible through a pass-through portion of a transparent or semitransparent display, or a portion of a camera view of the physical environment shown on the display. In some embodiments, the viewpoint corresponding to the view of the three-dimensional environment that is provided via the display generation component refers to the user's eyes or the user's face, and the user's palm is facing the user, facing toward the one or more cameras on an HMD wore by the user, or facing the pass-through portion of the display generation component through which the user may view the real world. The first view of the user interface of the first application is displayed with a first size (e.g., a size that is comparable to the size of the user's hand/palm) (e.g., the first size is an intrinsic size of the first view of the user interface and serves as the basis for determining its perceived size based on a distance between the first view of the user interface (e.g., the first position) and estimated locations of the eyes of the user viewing the three-dimensional environment). While displaying the first view of the user interface of the first application at the first position within the view of the three-dimensional environment that corresponds to the location of at least the portion of the palm that is currently facing the viewpoint corresponding to the view of the three-dimensional environment (e.g., a virtual environment, a simulated reality environment, an augmented reality environment, or a pass-through view of a physical environment) that is provided via the display generation component, the computer system detects (9004) a first input (e.g., a pinch and drag input by the user's fingers of the other hand on the user interface shown over the palm of the user, a throw or toss gesture by the same hand of the palm, etc.) that corresponds to a request to transfer display of the first application from the palm to a first surface (e.g., a physical surface such as a surface of a table or a desktop display in the physical environment) that is within a first proximity of the viewpoint corresponding to the view of the three-dimensional environment (e.g., a virtual environment, a simulated reality environment, or an augmented reality environment) that is provided via the display generation component (e.g., within arm's length of the user) (e.g., the viewpoint refers to the user's eyes or the user's face, and first proximity is a first predefined distance from the user's face or eyes, or from the one or more cameras on an HMD wore by the user, or from the pass-through portion of the display generation component through which the user may view the real world). In response to detecting the first input, the computer system displays (9006) a second view of the user interface of the first application (e.g., the second view 7036' of the user interface of the first application in FIG. 7C(B), or the first view 7236" of the user interface of the second application in FIG. 7G) (e.g., an expanded 2D user interface or enhanced 3D object) with an orientation that corresponds to the first surface (e.g., the top surface 7018 of the object 7014 in FIGS. 7C and 7G) (e.g., a surface of the user interface is displayed parallel to the surface of the table top or desktop display, or perpendicular to the surface of the table top, or at an angle relative to the table top (e.g., perpendicular to the user's gaze)) at a second position (in the view of the three-dimensional environment) defined by the first surface (e.g., an edge or surface of the user interface of the first application appears to rest against the first surface), wherein the second view of the user interface of the first application is displayed with a second size that is distinct from (e.g., greater than) the first size. The second size, similar to the first size, is an intrinsic size of the second view of the user interface and serves as the basis for determining its perceived size based on a distance between the second view of the user interface (e.g., the second position) and estimated locations of the eyes of the user viewing the three-dimensional environment. In some embodiments, even though the second position is farther away from the viewpoint corresponding to the current view of the three-dimensional environment that the first position, the perceived size of the second view is still larger than the perceived size of the first view. In some embodiments, the second view of the user interface of the first application is displayed floating in the three-dimensional environment (e.g., with an orientation that corresponds to the orientation of the user's head or face) without being attached to any surface or objects within the view of the three-dimensional environment. In some embodiments, the computer system displays an animated sequence showing the first view of the user interface moving from the palm to the location of the first surface and transforming into the second view of the user interface. In some embodiments, the first view ceases to be displayed in the view of the three-dimensional environment at the location corresponding to the palm in response to first input.

In some embodiments, while displaying the second view of the user interface of the first application at the second position defined by the first surface (e.g., an edge or surface of the user interface of the first application appears to rest against the first surface) with the second size (e.g., a size larger than the first size) within the view of the three-dimensional environment, the computer system detects a second input (e.g., a gaze and throw/toss input (e.g., gaze input selecting the destination surface (e.g., a wall) followed by a grab and throw/toss gesture by a hand)) that corresponds to a request to transfer display of the first application from the first surface (e.g., the top surface 7018 of the object 7014) (e.g., a physical surface such as a surface of a table or a desktop display in the physical environment) to a second surface (e.g., the front surface of the object 7010 or the wall 7004) that is within a second proximity of the viewpoint corresponding to the view of a three-dimensional environment (e.g., beyond an arm's length of the user). In response to detecting the second input, the computer system displays a third view of the user interface of the first application with an orientation that corresponds to the second surface (e.g., a surface of the user interface is displayed parallel to the surface of the table top or desktop display, or perpendicular to the surface of the table top, or at an angle relative to the table top (e.g., perpendicular to the user's gaze)) at a third position defined by the second surface (e.g., an edge or surface of the user interface of the first application appears to rest against the second surface).

In some embodiments, the third view of the user interface of the first application is displayed with a third size (e.g., intrinsic size) that is distinct from (e.g., greater than) the first size and the second size. In some embodiments, the third view of the user interface of the first application is displayed as an immersive experience surrounding the user without being attached to any surface or objects within the view of the three-dimensional environment. In some embodiments, the computer system displays an animated sequence showing the second view of the user interface moving from the location of the first surface to the location of the second surface and transforming into the third view of the user interface. In some embodiments, the second view ceases to be displayed in the view of the three-dimensional environment at the location corresponding to the first surface in response to second input.

In some embodiments, while displaying the second view of the user interface of the first application at the second position defined by the first surface (e.g., an edge or surface of the user interface of the first application appears to rest against the first surface) with the second size (e.g., a size larger than the first size) within the view of the three-dimensional environment, the computer system detects a third input (e.g., a gaze and throw/toss input (e.g., gaze input selecting the destination surface (e.g., a wall) followed by a grab and throw/toss gesture by a hand that includes movement of one or more fingers of the hand closer to each other while they are at a location near at least a portion of the user interface followed by movement of the hand away from a body of the user accompanied by moving of the fingers away from each other)) that corresponds to a request to transfer display of the first application from the first surface (e.g., a physical surface such as a surface of a table or a desktop display in the physical environment) to a third surface that is within the second proximity of the viewpoint corresponding to the view of a three-dimensional environment (e.g., beyond an arm's length of the user); and in response to detecting the third input, the computer system displays the third view of the user interface of the first application with an orientation that corresponds to the third surface (e.g., a surface of the user interface is displayed parallel to the surface of the table top or desktop display, or perpendicular to the surface of the table top, or at an angle relative to the table top (e.g., perpendicular to the user's gaze)) at a fourth position defined by the third surface (e.g., an edge or surface of the user interface of the first application appears to rest against the second surface).

Displaying a third view of the user interface of the first application with an orientation that corresponds to the second surface at a third position defined by the second surface in response to detecting the second input corresponding to a request to transfer display of the first application from the first surface to the second surface reduces the number of inputs needed to display the user interface with the desired orientation (e.g., the user does not need to perform additional inputs to adjust the orientation of the user interface of the first application at the third position defined by the second surface). Reducing the number of inputs needed to perform an operation enhances the operability of the device, which, additionally, reduces power usage and improves battery life of the device by enabling the user to use the device more quickly and efficiently.

In some embodiments, the palm is part of a first hand (e.g., hand 7020, or hand 7214), and wherein the second input includes a first gaze input directed to the second surface in conjunction with (e.g., at the same time of, or followed by) a first movement of the first hand (e.g., a toss or throw gesture) that corresponds to a movement toward the second surface in the view of the three-dimensional environment (e.g., with the first gaze input selecting the target surface for the third view of the user interface, the first movement of the first hand does not need to precisely point toward the second surface in the real world, and just need to be a general throw or toss forward gesture). In some embodiments, the third input includes a second gaze input directed to the third surface in conjunction with (e.g., at the same time of, or followed by) a second movement of the first hand that corresponds to a movement toward the third surface in the view of the three-dimensional environment (e.g., a grab and throw or toss gesture by a hand that includes movement of one or more fingers of the hand closer to each other while they are at a location near at least a portion of the user interface followed by movement of the hand away from a body of the user accompanied by moving of the fingers away from each other). For example, the destination surface of the user interface is selected by the location of the gaze input, and the same movement of the first hand causes the user interface to be moved to the surface selected by the location of the gaze input. In some embodiments, after the user interface is moved from the hand to one surface, the user interface is optionally moved to another surface using the gaze input selecting the new surface in conjunction with the movement of the first hand or a different hand (e.g., a throw, toss or wave gesture) that meets predefined gesture criteria. In some embodiments, following the movement of the user interface to the second surface, if the computer system detects that the user's gaze moves from the second surface to a different surface within a threshold amount of time and meeting preset stability and duration criteria, the computer system optionally moves the user interface to the different surface without requiring additional movement of the hand. Detecting the second input that includes a first gaze input directed to the second surface in conjunction with first movement of the first hand toward the second surface reduces the number of input needed to display the user interface with the desired orientation (e.g., the user does not need to perform additional inputs to adjust the orientation of the user interface of the first application at the third position defined by the second surface). Reducing the number of inputs needed to perform an operation enhances the operability of the device, which, additionally, reduces power usage and improves battery life of the device by enabling the user to use the device more quickly and efficiently.

In some embodiments, while displaying the third view of the user interface of the first application at the third position defined by the second surface, the computer system detects a third input that includes a second gaze input directed to the second surface in conjunction with (e.g., at the same time of, or followed by) a second movement of the first hand (e.g., a pinch gesture) that meets preset criteria (e.g., criteria for detecting a pinch gesture (e.g., movement of the thumb and index finger toward each other), optionally without requiring the first hand to be raise or present in the view of the three-dimensional environment (e.g., a micro-gesture by the first hand outside of the user's view of the three-dimensional environment would suffice)). In response to detecting the third input, the computer system redisplays the first view of the user interface of the first application at the first position within the view of the three-dimensional environment that corresponds to a location of at least a portion of the palm (e.g., in response to the pinch gesture and the gaze input directed to the third view of the user interface displayed at the location of the nearby wall, the user interface returns to the user's palm). In some embodiments, in response to the pinch gesture, the third view of the user interface of the first application ceases to be displayed at the third position defined by the third surface. Redisplaying the first view of the user interface of the first application at the first position in response to detecting the third input that includes a second gaze input directed to the second surface in conjunction with second movement of the first hand that meets preset criteria reduces the number of inputs needed to redisplay the first view of the user interface of the first application (e.g., the user does not need to first select or remove the user interface of the first application from the second surface). Reducing the number of inputs needed to perform an operation enhances the operability of the device, which, additionally, reduces power usage and improves battery life of the device by enabling the user to use the device more quickly and efficiently.

In some embodiments, the second view (and optionally the first view) of the user interface of the first application presents content through a three-dimensional object that is subject to spatial manipulation in the three-dimensional environment (e.g., the three-dimensional object is a 3D or pseudo-3D model of a geographic location for a maps application that can be rotated and zoomed by user's hands, an address book in the form of a physical book with pages that can be flipped through by the user, or a pop-up calendar that can be browsed by the user's hand, etc.), and the third view of the user interface of the first application presents content through a media-playback region defined by the second surface (e.g., the media-playback region is a virtual screen defined by the wall, and user interface is displayed as a content consumption user interface, like a movie or TV program selection and playback user interface). Displaying a second view of the user interface wherein the first application presents content through a three-dimensional object that is subject to spatial manipulation and displaying a third view of the user interface wherein the first application presents content through a media-playback region defined by the second surface reduces the number of inputs needed to display content in the desired manner (e.g., the user does not need to perform additional inputs to change from displaying content through a three-dimensional object to displaying content through a media-playback region). Reducing the number of inputs needed to perform an operation enhances the operability of the device, which, additionally, reduces power usage and improves battery life of the device by enabling the user to use the device more quickly and efficiently.

In some embodiments, displaying the second view of the user interface of the first application with an orientation that corresponds to the first surface at the second position defined by the first surface includes selecting a first size of the second view of the user interface of the first application relative to the physical environment (e.g., the intrinsic size of the user interface relative to the size of the physical environment, as opposed to the displayed size which varies depending on the location of the viewpoint of the user) in accordance with a first set of characteristics of the first surface (e.g., size, distance away from the user, etc. of the tabletop). Displaying the third view of the user interface of the first application with an orientation that corresponds to the second surface at the third position defined by the second surface includes selecting a second size of the third view of the user interface of the first application relative to the physical environment (e.g., the intrinsic size of the user interface relative to the size of the physical environment, as opposed to the displayed size which varies depending on the location of the viewpoint of the user) in accordance with a second set of characteristics of the second surface (e.g., size, distance away from the user, etc., of the wall), wherein the second size is different from (e.g., larger or smaller than) the first size.

In some embodiments, the computer system selects a respective size (e.g., the first size, the second size, or the third size) for the user interface of the first application for displaying at a position defined by a respective surface (e.g., surface of the palm, the first surface, or the second surface) in accordance with a preset set of characteristics (e.g., size, distance from the user, orientation, surface type, etc.) of the respective surface (e.g., surface of the palm, the first surface, or the second surface). In some embodiments, in accordance with a determination that the respective surface is within a threshold distance from the user, a smaller size is selected for the user interface of the first application; and in accordance with a determination that the respective surface is beyond the threshold distance from the user, a larger size is selected for the user interface of the first application. In some embodiments, in accordance with a determination that the respective surface is a tabletop, a smaller size is selected for the user interface of the first application; and in accordance with a determination that the respective surface is a wall, a larger size is selected for the user interface of the first application. In some embodiments, in accordance with a determination that the respective surface is a horizontal surface, a smaller size is selected for the user interface of the first application; and in accordance with a determination that the respective surface is a vertical surface, a larger size is selected for the user interface of the application. In some embodiments, other criteria are used to determine the respective size of the user interface of the first application. In some embodiments, the respective size of the user interface of the first application is determined in accordance with the size of the respective surface.

Displaying the second view of the user interface of the first application at a first size relative to the physical environment in accordance with a first set of characteristics of the first surface, and displaying the third view of the user interface application at a second size, different from the first size, in accordance with a second set of characteristics of the second surface reduces the number of inputs needed to display the second or third view of the user interface of the first application at a desired size (e.g., the user does not need to perform additional inputs to adjust the size of the second or third view of the user interface of the first application based on the first or second surface). Reducing the number of inputs needed to perform an operation enhances the operability of the device, which, additionally, reduces power usage and improves battery life of the device by enabling the user to use the device more quickly and efficiently.

In some embodiments, the first view of the user interface of the first application that is displayed at the first position (e.g., the position that corresponds to the location of at least the portion of the palm) includes first content. The second view of the user interface of the first application that is displayed at the second position defined by the first surface (e.g., the position that corresponds to the location of a tabletop) includes second content that is different (e.g., completely different, or partially different (e.g., including some common content and some distinct content; including a subset of the content of; or including a superset of the content of)) from the first content. In some embodiments, the second content includes redaction of at least some portions of the first content, and optionally includes summaries or reduced versions of some portions of the first content that have been redacted; or the second content includes augmentation of the first content or additional content.

In some embodiments, the third view of the user interface of the first application that is displayed at the third position defined by the second surface (e.g., the position that corresponds to the location of a wall) includes third content that is different from the first content and/or the second content (e.g., the third content includes redaction of at least some portions of the first content and/or second content, and optionally includes summaries or reduced versions of some portions of the first content and/or second content that have been redacted; or the third content includes augmentation of the first content and/or second content or additional content beyond the first content and/or second content). In some embodiments, different views (e.g., the first view, the second view, and/or the third view) of the user interface of the first application include different content that are selected based on the corresponding privacy modes of the difference positions (e.g., the first view includes more content than the second view, or the first view includes private content that is not included in the second view and public content that is included in both the first view and the second view, or the second view includes summaries of some of the private content included in the first view). In some embodiments, the third view of the user interface of the first application include different content from those of the first view and the second view of the user interface of the first application (e.g., the third view includes less content than the first view and the second view, or the third view includes summaries of some of the private content included in the first view and semi-private content included in the second view).

Including first content in the first view of the first user interface of the first application displayed at the first position, and including second content, different from the first, in the second view of the user interface of the first application displayed at the second position, reduces the number of inputs needed to display the desired content (e.g., the user does not need to perform additional inputs to display the second content different from the first content, at the second position). Reducing the number of inputs needed to perform an operation enhances the operability of the device, which, additionally, reduces power usage and improves battery life of the device by enabling the user to use the device more quickly and efficiently.

In some embodiments, the first view of the user interface of the first application (e.g., displayed at a position corresponding to the palm) includes a first form of the first application with a first user interaction model. In some embodiments, the first form of the first application with a first user interaction model is a 2D user interface displayed on a flat surface of an object, and the 2D user interface responds to gesture inputs that involves finger movement on or near the user's palm (e.g., a tap input includes touch-down of a finger on a portion of the palm optionally followed by lift-off of the finger from the portion of the palm within a threshold amount of time; a double tap input includes two consecutive tap inputs performed by the same finger on approximately the same portion of the palm with a duration between the two tap inputs being less than a threshold amount of time; a drag or swipe input includes touch-down of a finger (or two-fingers side-by-side) on a portion of the palm followed by movement of the finger(s) across a surface of the palm to another portion of the palm, optionally followed by lift-off of the finger(s) from the palm after the movement of the finger(s) across the palm; a pinch input includes movement of two fingers toward each other while the two fingers maintain contact with the palm; a depinch input includes movement of two fingers away from each other while the two fingers maintain contact with the palm; etc.).

In some embodiments, the location of the finger contact on the palm, the duration and timing of the finger contact and/or lift-off of the finger contact on the palm, the speed of movement of the finger(s) across the palm, the number of fingers making contact with the palm, etc. are characteristics of the input that are used to determine the function that is performed within the first application according to the first user interaction model, and/or the manner the function is performed (e.g., timing, amount, speed, etc.). In some embodiments, the second view of the user interface of the first application (e.g., displayed at a position corresponding to a tabletop) includes a second form of the first application with a second user interaction model that is different from the first user interaction model. In some embodiments, the second form of the first application is a 3D user interface displayed upright relative to the horizontal tabletop, with user interface objects displayed at different depths from the user), and the 3D user interface responds to gaze input in conjunction with finger gesture inputs provided by a finger raised in the air or micro-gestures with one part of the hand (e.g., first finger) moving relative to another part (e.g., second finger or palm) of the same hand.

In some embodiments, the third view of the user interface of the first application (e.g., displayed on a wall or floating in empty space) includes a third form of the first application that is different from the first form of the first application and/or the second form of the first application (e.g., the third form of the first application is a media playback or media consumption user interface, and the media consumption user interface responds to in air gestures of the whole hand or micro-gestures, optionally in conjunction with gaze input. In some embodiments, in-air finger gestures include an air tap input (e.g., movement of the index finger from a raise position toward the palm side of the hand, without the finger touching the palm or other parts of the hand, or movement of the wrist that causes the hand to move from a raise posture to a lowered posture, while one or more fingers of the hand remain extended or raised during the movement of the wrist), a double air tap input (e.g., two consecutive air tap inputs that are separated by a duration that is less than a threshold amount of time), an air drag or swipe input (e.g., movement of the whole hand in the air with one or more fingers of the hand raised or extended out from the palm of the hand), etc.). In some embodiments, micro-gestures are gestures performed by a single hand (e.g., with one part of the hand moving or touching another part of the same hand, while the hand is optionally raised from the user's body)).

In some embodiments, micro-gestures include a micro-tap input (e.g., the finger tip of a first finger of a hand moves towards and touches down on a portion of another finger of the same hand, or the palm of the same hand, optionally followed by lift-off of the finger tip from the touch-down location), a micro-double-tap input (e.g., two consecutive micro-tap inputs performed by the same first finger on the same portion of the same first hand, with the duration between the two micro-tap inputs less than a threshold amount of time), a micro-drag or micro-swipe input (e.g., movement of a first finger on the surface of a second finger of the same hand in a respective direction (e.g., along the side of the second finger, or across the second finger from the same of the palm toward the back of the hand)), a micro-flick input (e.g., movement of a first finger relative to a second finger of the same hand in a respective direction away from the second finger (e.g., a upward flick, a forward flick, an inward flick, etc.)). In some embodiments, the finger (e.g., thumb vs. index finger, etc.) that performs the micro-gesture, the duration and timing of the finger contact and/or lift-off of the finger contact on the same hand, the location of the finger contact on the same hand (e.g., position on the second finger of the same hand or position on the palm of the same hand), the speed of movement of the finger(s) across the other finger or palm of the same hand, etc. are characteristics of the input that are used to determine the function that is performed within the first application according to the third user interaction model, and/or the manner the function is performed (e.g., timing, amount, speed, etc.).

In some embodiments, an in-air gesture performed by movement of the whole hand (e.g., wrist movement with and/or without arm movement) is used to perform operations within the third form of the first application in accordance with the third user interaction model. The in-air gesture of the whole hand includes an open hand wave input (e.g., whole hand moving upward, downward, toward the user, away from the user, sideways in front of the user, etc., with the palm open and fingers extended), a closed hand wave input (e.g., whole hand in a first moving upward, downward, away from the user, toward the user, or sideways in front of the user, etc.), a palm opening input (e.g., all fingers moving in union from a retracted state to an extended state), a palm closing input (e.g., all fingers moving in union from an extended state to a retracted state), a push input (e.g., with the palm open and moving away from the user), a pull input (e.g., with the palm open and moving toward the user), a point input (e.g., moving the whole hand toward a target direction with the index finger raised), etc.

In some embodiments, a gaze input is used to select the target of the input, and the in-air hand gesture is used to select the operation that is performed with respect to the target in the third form of the first application. In some embodiments, characteristics such as the speed, duration, timing, direction, and amount of the movement of the hand are used to determine the characteristics (e.g., direction, amount, speed, etc.) of the manner by which the operation is performed. In some embodiments, different views (e.g., the first view, the second view, and/or the third view) of the user interface of the first application include different forms of content corresponding to different form factors of devices (e.g., handheld device, desktop device, and large screen TV, etc.). In some embodiments, the different forms of content shown on the different views include different visual representations of the same object or information (e.g., the first view is a two-dimensional view of an object or content, and the second view is a three-dimensional view or pseudo-three-dimensional view of the object or content (e.g., 2D view with depth information). In some embodiments, the third view of the user interface of the first application include different forms of content from those of the first view and the second view of the user interface of the first application (e.g., the first view is a two-dimensional view of an object or content, the second view is a three-dimensional view or pseudo-three-dimensional view of the object or content (e.g., 2D view with depth information), and the third view is a movie type consumption user interface or an immersive experience). In some embodiments, the different forms of content respond to different types of manipulations and/or respond differently to a given type of manipulation or input.

Displaying a first form of the first application with a first user interaction model in the first view of the user interface of the first application and displaying a second form of the first application with a second user interaction model that is different from the first user interface model in the second view of the user interface of the first application provides improved visual feedback to the user (e.g., visual feedback regarding whether the user interface of the first application is being displayed in the first or second view). Providing improved feedback enhances the operability of the device, which, additionally, reduces power usage and improves battery life of the device by enabling the user to use the device more quickly and efficiently.

In some embodiments, a respective input (e.g., the first input or the second input) that corresponds to a request to transfer display of the first application from a position corresponding to a first location in the three-dimensional environment to a position corresponding to a second location in the three-dimensional environment (e.g., from the palm to the first surface, from the palm to the second surface, from the first surface to the second surface, etc.) includes a pinch and drag gesture directed toward (e.g., based on a position of the gesture or a direction of gaze of a user of the device) the first location (e.g., to pick up and move the representation of the user interface) followed by a depinch gesture directed toward (e.g., based on a position of the gesture or a direction of gaze of a user of the device) the second location (e.g., a termination of the pinch gesture to drop off the representation of the user interface). In some embodiments, the pinch and drag gesture that corresponds to the request to transfer display of the first application from the palm to the first surface or the second surface includes a pinch gesture performed by a hand that is not connected to the palm, where the pinch gesture is detected at the location of the palm. In some embodiments, the pinch and drag gesture that corresponds to the request to transfer display of the first application from the first surface to the second surface or vice versa includes a pinch gesture performed by a single hand at a location that corresponds to a boundary portion of the user interface (e.g., corner or grab handle) in the three-dimensional environment, followed by movement of the hand while the pinch gesture is maintained by the hand.

In some embodiments, the pinch and drag gesture that corresponds to the request to transfer display of the first application from the first surface to the second surface or vice versa includes two pinch gestures performed by a two separate hands at locations that correspond to a boundary portion of the user interface (e.g., two opposing corners or edges) in the three-dimensional environment, followed by synchronous movements of the two hands while the pinch gestures are maintained by the two hands. In some embodiments, the pinch gesture is detected at the first location before the movement portion of the pinch and drag gesture is detected, and the depinch gesture is detected at the second location after the movement portion of the pinch and drag gesture is detected. In some embodiments, the palm is part of a first hand, the first input is a pinch and drag gesture provided by a second hand that is distinct from the first hand, and the pinch and drag gesture starts at a respective location on or proximate to the palm and ends at a respective location away from the palm (e.g., the respective location away from the palm is optionally different from the location of the first surface (e.g., the user only needs to use a small drag distance to cause the user interface to be placed at the location of the first surface, and does not need to drag the user interface all the way to the location of the first surface)).

In some embodiments, the first input includes a first portion that is a pinch gesture (e.g., thumb and index finger coming into contact with each other) directed to a location on or proximate to the palm that corresponds to the a boundary portion (e.g., a corner or edge) of the user interface or to an application icon that sticks out from the user interface of the application within the view of the three-dimensional environment. In some embodiments, the first input includes a second portion that is a drag gesture (e.g., movement of the second hand) combined with the pinch gesture (e.g., thumb and index finger remains in contact) followed by a release gesture (e.g., termination of the contact between the thumb and index finger of the second hand). In some embodiments, the computer system selects the final position of the second view of the user interface in the view of the three-dimensional environment based on the characteristics of the second portion of the first input (e.g., the speed, distance, duration, direction, termination location, etc. of the drag and release gestures) and/or the locations of available surfaces or space in the three-dimensional environment.

Detecting the request to transfer display of the first application from the position corresponding to the first location to the position corresponding to the second location that includes a pinch and drag gesture directed toward the first location followed by a depinch gesture directed toward the second location reduces the number of inputs needed to transfer display of the first application from a position corresponding to the first location to the position corresponding to the second location (e.g., the user does not need to perform separate inputs to select the first application, move the first application, and confirm the new position of the first application). Reducing the number of inputs needed to perform an operation enhances the operability of the device, which, additionally, reduces power usage and improves battery life of the device by enabling the user to use the device more quickly and efficiently.

In some embodiments, the palm is part of a first hand, the first input is a tap gesture (e.g., an air tap input by the index finger) provided by a second hand that is distinct from the first hand, and the tap gesture is detected at a location that corresponds to a predetermined portion (e.g., the back or side of the user interface object that does not display interactive content of the first application) of a three-dimensional user interface object that corresponds to the first view of the user interface of the first application. This is illustrated in FIG. 7C, for example. In some embodiments, the first view of the user interface of the first application is displayed on a three-dimensional object and parts of the object do not include interactive content of the first application (e.g., inputs directed to these parts of the object are not provided to and consumed by the first application); and an air tap gesture directed to these parts causes the three-dimensional object to be sent away from the user's palm and onto a nearby surface (e.g., a nearby tabletop) and to transform into the second view of the user interface of the first application (e.g., to be enlarged to the second size). In some embodiments, the computer system selects the final position of the second view of the user interface in the view of the three-dimensional environment based on the characteristics of the air tap gesture (e.g., the speed, duration, direction, etc. of the air tap gesture) and/or the locations of available surfaces or space in the three-dimensional environment. Detecting the first input is a tap gesture provided by a second hand, distinct from the first hand, at a location corresponding to a predetermined portion of the three-dimensional user interface object corresponding to the first view of the user interface of the first application provides additional control options without cluttering the UI with additional displayed controls (e.g., additional displayed controls for initiating transfer of the display of the first application from a first position to a second position). Providing additional control options without cluttering the UI with additional displayed controls enhances the operability of the device, which, additionally, reduces power usage and improves battery life of the device by enabling the user to use the device more quickly and efficiently.

In some embodiments, while displaying a respective view of the user interface of the first application (e.g., the first view (e.g., shown at the location of the palm) or the second view (e.g., shown at the location of the first surface (e.g., a nearby tabletop))), the computer system detects a pinch gesture directed to the respective view of the user interface of the first application (e.g., the pinch gesture includes movement of the thumb and one or more other fingers of a hand toward one another, the respective view of the user interface of the first application is selected as the target of the pinch gesture in accordance with a determination that a gaze input is detected on the respective view of the user interface of the first application). In response to detecting the pinch gesture directed to the respective view of the user interface of the first application, the computer system resizes the respective view of the user interface of the first application in accordance with the pinch gesture (e.g., shrinking the size of the respective view of the user interface of the first application without moving the respective view of the user interface away from its current location). Resizing the respective view of the user interface of the first application in accordance with the pinch gesture directed to the respective view of the user interface of the first application provides additional control options without cluttering the UI with additional displayed controls (e.g., additional displayed controls for increasing or decreasing the size of the respective view of the user interface of the first application). Providing additional control options without cluttering the UI with additional displayed controls enhances the operability of the device, which, additionally, reduces power usage and improves battery life of the device by enabling the user to use the device more quickly and efficiently.

In some embodiments, while displaying a respective view of the user interface of the first application at a respective position defined by a respective surface (e.g., the second view shown at the location of the first surface (e.g., a nearby tabletop) or the third view shown at the location of the second surface (e.g., the wall)), the computer system detects a pinch gesture directed to the respective view of the user interface of the first application (e.g., the pinch gesture includes movement of the thumb and one or more other fingers of a hand toward one another, the respective view of the user interface of the first application is selected as the target of the pinch gesture in accordance with a determination that a gaze input is detected on the respective view of the user interface of the first application). In response to detecting the pinch gesture directed to the respective view of the user interface of the first application, the computer system redisplays the first view of the user interface of the first application at the first position within the view of the three-dimensional environment that corresponds to a location of at least a portion of the palm (e.g., in response to the pinch gesture directed to the respective view of the user interface displayed at the location of the nearby tabletop or on the wall, the user interface returns to the user's palm). In some embodiments, in response to the pinch gesture, the respective view of the user interface of the first application (e.g., the second view or the third view) ceases to be displayed at the position defined by the respective surface (e.g., the position defined by the second surface or the position defined by the third surface). Redisplaying the first view of the user interface of the first application at the first position within the view of the three-dimensional environment that corresponds to a location of at least a portion of the palm in response to detecting the pinch gesture directed to the respective view of the user interface of the first application reduces the number of inputs needed to redisplay the first view of the user interface of the first application at the first position (e.g., the user does not need to perform additional inputs to select and move the first view of the user interface of the first application from the second or third position to the first position within the view of the three-dimensional environment that corresponds to a location of at least a portion of the palm). Reducing the number of inputs needed to perform an operation enhances the operability of the device, which, additionally, reduces power usage and improves battery life of the device by enabling the user to use the device more quickly and efficiently.

In some embodiments, different views of the user interface of the first application correspond to different interaction models. In some embodiments, the first view corresponds to a direct manipulation interaction model, the second view corresponds to an air gesture interaction model, and the third view corresponds to gaze plus touch gesture or micro-gesture interaction model. In some embodiments, the same operation (e.g., scrubbing through a listing of content items, opening a preview of a media item, or starting a communication session with a respective user corresponding to a respective contact name shown on the user interface) is performed with a first sequence of inputs (e.g., a swipe input on the palm by a finger of another hand; a tap input on the palm by a finger of another hand, etc.) in a first interaction model (e.g., corresponding to the first view of the user interface on the palm) and is performed with a second sequence of inputs (e.g., a micro-swipe by a finger on the side of another finger of the same hand; a gaze input in conjunction with a micro-tap or in-air tap by a finger, etc.) in a second interaction model (e.g., corresponding to the second view of the user interface on a tabletop or wall), wherein the first sequence of inputs are different from the second sequence of inputs. Displaying a respective view of the user interface of the first application, wherein different views of the user interface of the first application correspond to different interaction models provides improved visual feedback to the user (e.g., visual feedback regarding the current interaction model). Providing improved feedback enhances the operability of the device, which, additionally, reduces power usage and improves battery life of the device by enabling the user to use the device more quickly and efficiently.

In some embodiments, the first view of the user interface (e.g., the view of the user interface displayed at the location of the palm in the view of the three-dimensional environment) includes a first portion of the user interface corresponding to a first function of the first application (e.g., the first portion displays a first user interface object such as a first media item or first contact name) and a second portion of the user interface corresponding to a second function of the first application (e.g., the second portion displays a second user interface object such as a second media item or second contact name). A first touch input (e.g., a double tap input, a touch-hold input, a swipe input) detected at a location on or proximate to the palm that corresponds to the first portion of the user interface in the view of the three-dimensional environment causes performance of the first function of the first application (e.g., starting a preview of the first media item or starting a communication session with a first user corresponding to the first contact name). A second touch input (e.g., a double tap input, a touch-hold input, a swipe input) detected at a location on or proximate to the palm that corresponds to the second portion of the user interface in the view of the three-dimensional environment causes performance of the second function of the first application (e.g., starting a preview of the second media item or starting a communication session with a second user corresponding to the second contact name). In some embodiments, when the user interface of the first application is displayed at the first position within the view of the three-dimensional environment that corresponds to the location of the palm, the user interface responds to user input based on a direct manipulation interaction model in which the precise location of the user input, as well as spatial and timing characteristics of the user inputs, such as starting location, ending location, speed of movement, distance of movement, direction of movement, intensity of contact, timing of the input or portions of the input, etc., that are detected on or proximate to the palm are mapped to the locations on the first view of the user interface and used to determine the function that is triggered and the quantitative attributes (e.g., amount and timing) of the function that is performed. For example, a counter-clock swipe on the surface of the palm causes counter-clock rotation of a user interface object in the user interface of the first application, where the user interface object is selected based on the starting location of the swipe input, and the amount and speed of rotation of the user interface object corresponds the distance and speed of the swipe on the palm. Performing the first function of the first application in response to detecting a first touch input detected at a location on or proximate to the palm that corresponds to the first portion of the user interface and performing the second function of the first application in response to detecting a second touch input at a location on or proximate to the palm that corresponds to the second portion of the user interface provides additional control options without cluttering the UI with additional displayed controls (e.g., additional displayed controls for performing the first or second function of the first application). Providing additional control options without cluttering the UI with additional displayed controls enhances the operability of the device, which, additionally, reduces power usage and improves battery life of the device by enabling the user to use the device more quickly and efficiently.

In some embodiments, the second view of the user interface (e.g., the view of the user interface displayed at the position defined by the first surface in the view of the three-dimensional environment) includes a third portion of the user interface corresponding to the first function of the first application (e.g., the third portion displays the first user interface object such as the first media item or first contact name) and a fourth portion of the user interface corresponding to the second function of the first application (e.g., the fourth portion displays the second user interface object such as the second media item or second contact name). A first gesture input (e.g., a single air tap, a double air tap, a point and flick input, an air swipe input) detected at a location in space that corresponds to the third portion of the user interface in the view of the three-dimensional environment causes performance of the first function of the first application (e.g., starting the preview of the first media item or starting the communication session with a first user corresponding to the first contact name). A second gesture input (e.g., a single air tap, a double air tap, a point and flick input, an air swipe input) detected at a location in space that corresponds to the fourth portion of the user interface in the view of the three-dimensional environment causes performance of the second function of the first application (e.g., starting the preview of the second media item or starting the communication session with the second user corresponding to the second contact name).

In some embodiments, when the user interface of the first application is displayed at the location within the view of the three-dimensional environment that is defined by the first surface (e.g., a tabletop), the user interface responds to user input based on an air gesture interaction model in which contact with a physical surface is not required, and the precise location and spatial characteristics of a contact are no longer required or determinant of the function and quantitative characteristics of the function performed. For example, a counter-clock air swipe by a finger causes counter-clock rotation of a user interface object in the user interface of the first application, where the user interface object is selected based on the current context in the user interface (e.g., which object is currently selected and/or rotatable), and the amount and speed of rotation of the user interface object are optionally based on a default value and do not necessarily correspond to the distance and speed of the air swipe. Performing the first function of the application in response to detecting a first gesture input detected at a location in space that corresponds to the third portion of the user interface and performing the second function of the first application in response to detecting a second gesture input detected at a location in space that corresponds to the fourth portion of the user interface provides additional control options without cluttering the UI with additional displayed controls (e.g., additional displayed controls for performing the first or second function of the first application). Providing additional control options without cluttering the UI with additional displayed controls enhances the operability of the device, which, additionally, reduces power usage and improves battery life of the device by enabling the user to use the device more quickly and efficiently.

In some embodiments, the third view of the user interface (e.g., the view of the user interface displayed at the position defined by the second surface in the view of the three-dimensional environment) includes a sixth portion of the user interface corresponding to the first function of the first application (e.g., the sixth portion displays the first user interface object such as the first media item or first contact name) and a seventh portion of the user interface corresponding to the second function of the first application (e.g., the seventh portion displays the second user interface object such as the second media item or second contact name). A gesture input (e.g., a single air tap, a double air tap, a point and flick input, an air swipe input, or micro-gestures (e.g., tap, swipe, double tap, etc.) performed by one or more fingers of a hand relative to other portions (e.g., other fingers, flanges, palm, etc.) of the same hand) performed in conjunction with a first gaze input directed to the sixth portion of the user interface causes performance of the first function of the first application (e.g., starting the preview of the first media item or starting the communication session with a first user corresponding to the first contact name).

The gesture input (e.g., a single air tap, a double air tap, a point and flick input, an air swipe input, or micro-gestures (e.g., tap, swipe, double tap, etc.) performed by one or more fingers of a hand relative to other portions (e.g., other fingers, flanges, palm, etc.) of the same hand) performed in conjunction with a second gaze input directed to the seventh portion of the user interface causes performance of the second function of the first application (e.g., starting the preview of the second media item or starting the communication session with the second user corresponding to the second contact name). In some embodiments, when the user interface of the first application is displayed at the location within the view of the three-dimensional environment that is defined by the second surface (e.g., a wall), the user interface responds to user input based on a gaze plus gesture interaction model in which the gaze input is used to select the target of the interaction and the gesture provided in air or on other parts of the same hand is used to determine the function that is performed with respect to the target. For example, the user's gaze input directed to a user interface object selects the user interface object as a target of the gesture input provided by the user's hand. While the gaze input is directed to the user interface object, a counter-clock air swipe by a finger or a micro-swipe by one finger on the side of another finger causes counter-clock rotation of the user interface object in the user interface of the first application. In some embodiments, the amount and speed of rotation of the user interface object are optionally based on a default value and do not necessarily correspond to the distance and speed of the air swipe or swipe on the side of the other finger. Performing the first function of the application in response to detecting a gesture input performed in conjunction with a first gaze input directed to the sixth portion of the user interface and performing the second function of the first application in response to detecting the gesture input detected in conjunction with a second gaze input directed to the seventh portion of the user interface provides additional control options without cluttering the UI with additional displayed controls (e.g., additional displayed controls for performing the first or second function of the first application). Providing additional control options without cluttering the UI with additional displayed controls enhances the operability of the device, which, additionally, reduces power usage and improves battery life of the device by enabling the user to use the device more quickly and efficiently.

In some embodiments, while displaying (e.g., in response to the first input or the second input) a respective view of the user interface of the first application (e.g., the second view or the third view of the user interface of the first application) at a respective position defined by a respective surface (e.g., the second position defined by the first surface (e.g., a tabletop) or the third position defined by the second surface (e.g., a wall)), the computer system displays a user interface object that corresponds to one or more functions of the user interface of the first application at the first position within the view of the three-dimensional environment that corresponds to the location of at least the portion of the palm (e.g., displaying a reduced user interface or dock at the location of the palm). While displaying the user interface object that corresponds to the one or more functions of the user interface of the first application at the first position within the view of the three-dimensional environment that corresponds to the location of at least the portion of the palm, the computer system detects an input on or proximate to the palm (e.g., a tap input, a swipe input, a double tap input, a touch-hold input, etc.) at a location that corresponds to the user interface object in the view of the three-dimensional environment. In response to detecting the input on or proximate to the palm at the location that corresponds to the user interface object (e.g., in response to the tap input, the swipe input, the double tap input, the touch-hold input, etc.), the computer system performs an operation (e.g., starting playback of a media item, navigate to another user interface, starting a communication session, etc.) that causes a change in the respective view of the user interface of the first application (e.g., the second view or the third view of the user interface of the first application) at the respective position defined by the respective surface (e.g., the second position defined by the first surface (e.g., a tabletop) or the third position defined by the second surface (e.g., a wall)). Performing an operation that causes a change in the respective view of the user interface of the first application at the respective position defined by the respective surface in response to detecting the input on or proximate to the palm at the location that corresponds to the user interface object provides improved visual feedback to the user (e.g., that the computer system has detected the input on or proximate to the palm at the location that corresponds to the user interface object). Providing improved feedback enhances the operability of the device, which, additionally, reduces power usage and improves battery life of the device by enabling the user to use the device more quickly and efficiently.

It should be understood that the particular order in which the operations in FIG. 9 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 10000, and, 11000) are also applicable in an analogous manner to method 9000 described above with respect to FIG. 9. For example, the gestures, gaze inputs, physical objects, user interface objects, and/or animations described above with reference to method 9000 optionally have one or more of the characteristics of the gestures, gaze inputs, physical objects, user interface objects, and/or animations described herein with reference to other methods described herein (e.g., methods 8000, 10000, and 11000). For brevity, these details are not repeated here.

FIG. 10 is a flowchart of a method 10000 of interacting with a computer-generated three-dimensional environment (e.g., including displaying controls at display positions corresponding to the back of a user's hand and displaying application icons at display positions corresponding to the inner side of the user's wrist (and, optionally, displaying application user interfaces at a display position corresponding to the user's palm)), in accordance with some embodiments.

The method 10000 relates to displaying controls and notifications at positions corresponding to the back side of the hand and wrist when the back side of the hand and wrist is facing toward the user, while displaying applications and application icons on the palm and the inner side of the wrist when the palm and inner side of the wrist are facing toward the user. The switching between (1) displaying controls and notifications and (2) displaying application icons and application user interfaces is automatically performed when the user turns his/her wrist and hand back and forth toward and away from his/her face. Arranging (1) notifications and controls and (2) application icons and application user interfaces respectively on (a) the back side of the wrist and hand and (b) the front side of the wrist and hand provides efficient divisions of the user interface elements based on their interaction characteristics (e.g., it is easier to turn the palm and inner side of the wrist toward the user's face for more complex content to be viewed and more complex interactions to be had on the palm and the inner side of the wrist, as compared to notifications and controls with which the viewing and interactions are easy and more brief and more easily done on the back of the hand and wrist). Automatically switching between (1) displaying controls and notifications and (2) displaying application icons and application user interfaces when the user turns his/her wrist and hand back and forth allows more user interface elements to be provided without cluttering the view of the three-dimensional environment, and provide easier access to these user interface elements by the user.

In some embodiments, the method 10000 is performed at a computer system (e.g., computer system 101 in FIG. 1) including a display generation component (e.g., display generation component 120 in FIGS. 1, 3, and 4, and display generation component 7100, 7200 in FIGS. 7A-7G) (e.g., a heads-up display, a display, a touchscreen, a projector, etc.) and one or more input devices (e.g., one or more cameras (e.g., a camera (e.g., color sensors, infrared sensors, and other depth-sensing cameras) that points downward at a user's hand or a camera that points forward from the user's head), controllers, touch-sensitive surfaces, joysticks, buttons, etc.). In some embodiments, the computer system is an integrated device with one or more processors and memory enclosed in the same housing as the display generation component and at least some of the one or more input devices. In some embodiments, the computer system includes a computing component that includes one or more processors and memory that is separate from the display generation component and/or the one or more input devices. In some embodiments, the display generation component and the one or more input devices are integrated and enclosed in the same housing. In some embodiments, the method 10000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 10000 are, optionally, combined and/or the order of some operations is, optionally, changed.

In the method 10000, the computer system detects (10002) (e.g., using one or more cameras) presence of a wrist (e.g., wrist 7028) (e.g., the wrist of the user who is wearing the HMD) at a location (e.g., a location in the physical environment) that corresponds to a position within a view of a three-dimensional environment that is provided via the display generation component (e.g., the respective three-dimensional environment is a virtual environment or an augmented reality environment that is currently displayed by the display generation component). In some embodiments, the respective three-dimensional environment is purely virtual and includes computer-generated objects and space. In some embodiments, the view of the three-dimensional environment includes a camera view of a physical environment surrounding the user or a camera view of a physical environment that is separate from the user. In some embodiments, the view of the three-dimensional environment includes a pass-through view of a physical environment surrounding the user (e.g., as seen through a transparent display). In some embodiments, a virtual image of the user's hand and wrist is displayed in the view of the three-dimensional environment. In some embodiment, a camera image of the user's hand and wrist is displayed in the view of the three-dimensional environment. In some embodiments, the computer system causes the display generation component to display a real-time image or graphical representation of the user's hand and wrist within the view of the three-dimensional environment when the user's hand and wrist enters the user's field of view of the three-dimensional environment based on the current location and posture of the user's hand and wrist. In some embodiments, the user's hand and wrist is part of the physical environment that is seen by the user through a transparent display.

In response to detecting the presence of the wrist (e.g., wrist 7028) at the location that corresponds to the position within the view of the three-dimensional environment that is provided via the display generation component (10004): in accordance with a determination that first criteria (e.g., icon-display criteria) are met by the presence of the wrist at the location that corresponds to the position in the view of the the three-dimensional environment that is provided via the display generation component, wherein the first criteria require that an inner side of the wrist (and optionally require that at least a portion of a palm attached to the wrist) is facing toward a viewpoint corresponding to the view of a three-dimensional environment (e.g., a virtual environment, a simulated reality environment, or an augmented reality environment) that is provided via the display generation component (e.g., inner side of the wrist facing the user) (e.g., the viewpoint corresponding to the view of the three-dimensional environment that is provided via the display generation component refers to the user's eyes or the user's face, and the inner side of the wrist is facing the user, facing toward the one or more cameras on an HMD wore by the user, or facing the pass-through portion of the display generation component through which the user may view the real world), the computer system displays (10006), via the display generation component, a first user interface object (e.g., menu 7026 in FIGS. 7A and 7B), including a plurality of representations corresponding to different applications (e.g., selectable options 7030), at a first position within the view of the three-dimensional environment that corresponds to a first location on the wrist (and optionally concurrently displaying a view of a user interface of a first application at a position within the view of the three-dimensional environment that corresponds to at least a portion of a palm connected to the wrist (e.g., the palm is facing the viewpoint corresponding to the view of the three-dimensional environment as well) (e.g., the plurality of representations corresponding to the different applications appear to overlay or replace display of the inner side of the wrist, while, optionally, the user interface of the first application appears to overlay or replace display of at least the portion of the palm that is attached to the wrist). While displaying the first user interface object at the first position within the view of the three-dimensional environment that corresponds to the first location on the wrist, the computer system detects (10008) that the wrist has changed from satisfying the first criteria to satisfying second criteria, wherein the second criteria require that an outer side of the wrist (e.g., the wrist 7028 as shown in FIG. 7D(B)) (and optionally also require that at least a portion of a back of a hand connected to the wrist) is facing toward the viewpoint corresponding to the view of a three-dimensional environment that is provided via the display generation component (e.g., outer side of the wrist, and optionally back of the hand connected to the wrist, is facing the user) (e.g., the viewpoint corresponding to the view of the three-dimensional environment that is provided via the display generation component refers to the user's eyes or the user's face, and the outer side of the wrist is facing the user, facing toward the one or more cameras on an HMD wore by the user, or facing the pass-through portion of the display generation component through which the user may view the real world). In response to detecting that the wrist has changed from satisfying the first criteria to satisfying the second criteria, the computer system switches (10010) from displaying the first user interface object at the first position within the view of the three-dimensional environment that corresponds to the first location on the wrist to displaying, via the display generation component, a second user interface object (e.g., user interface object 7042 in FIG. 7D(B)), including a plurality of controls for controlling functions for the computer system, at a second position within the view of the three-dimensional environment that corresponds to a location on a back of a hand (e.g., the hand 7020) that is attached to the wrist (e.g., the wrist 7028).

In some embodiments, in response to detecting that the wrist has changed from satisfying the first criteria to satisfying the second criteria, the computer system displays one or more notifications corresponding to one or more applications at a third position (e.g., distinct from the second position) within the view of the three-dimensional environment that corresponds to a location on the back of the hand (e.g., hand 7020 in FIG. 7D(B)) that is attached to the wrist (e.g., the wrist 7028) (e.g., the one or more notifications appear to overlay or replace display of a portion of the back of the hand, while the plurality of controls appear to overlay or replace display of another portion of the back of the hand). Displaying one or more notifications corresponding to one or more applications at a third position within the view of the three-dimensional environment that corresponds to a location on the back of the hand that is attached to the wrist, in response to detecting that the wrist has changed from satisfying the first criteria to satisfying the second criteria, displays the one or more notifications at the third position when a set of conditions has been met without requiring further user input (e.g., further user input to display the one or more notifications at a location on the back of the hand). Performing an operation when a set of conditions has been met without requiring further user input enhances the operability of the device, which, additionally, reduces power usage and improves battery life of the device by enabling the user to use the device more quickly and efficiently.

In some embodiments, while displaying the plurality of controls for controlling functions for the computer system at the second position within the view of the three-dimensional environment that corresponds to the location on the back of the hand that is attached to the wrist (e.g., the back of the hand 7020 in FIG. 7D(B)), the computer system displays one or more notifications corresponding to one or more applications at a fourth position (e.g., distinct from the second position) within the view of the three-dimensional environment that corresponds to a location on a back side of the wrist (e.g., the back of the wrist that is attached to the back of the hand) (e.g., the one or more notifications appear to overlay or replace display of a portion of the back of the wrist next to the back of the hand, while the plurality of controls appear to overlay or replace display of another portion of the back of the hand). In some embodiments, while displaying the one or more notifications at the fourth position that corresponds to the location of the wrist, the computer system detects a swipe input on the wrist at a location corresponding to the fourth position in the view of the three-dimensional environment; and in response to the swipe input, the computer system displays scrolling of the one or more notifications (e.g., notifications appear to move around the wrist) in a direction in the view of the three-dimensional environment in accordance with the swipe input (e.g., at least part of a first notification of the one or more notifications ceases to be displayed and at least part of a second notification that was not previously displayed is displayed as a result of the scrolling). Displaying one or more notifications corresponding to one or more applications at a fourth position within the three-dimensional environment that corresponds to a location on a back side of the wrist while displaying the plurality of controls for controlling functions for the computer system at the second position within the three-dimensional environment that corresponds to the location on the back of the hand that is attached to the wrist and in response to detecting that the wrist has changed from satisfying the first criteria to satisfying the second criteria, displays the one or more notifications at the fourth position when a set of conditions has been met without requiring further user input (e.g., further user input to display the one or more notifications at a location on the back of the hand). Performing an operation when a set of conditions has been met without requiring further user input enhances the operability of the device, which, additionally, reduces power usage and improves battery life of the device by enabling the user to use the device more quickly and efficiently.

In some embodiments, while displaying the plurality of representations corresponding to different applications at the first position within the view of the three-dimensional environment that corresponds to the first location on the wrist and while the inner side of the wrist is facing toward the viewpoint corresponding to the view of a three-dimensional environment, the computer system detects a swipe gesture on or proximate to the inner side of the wrist (e.g., in a direction around the wrist, or in a direction along the wrist). In response to detecting the swipe gesture on or proximate to the inner side of the wrist, the computer system scrolls the plurality of representations corresponding to different applications in a direction that corresponds to a direction of the swipe gesture on or proximate to the inner side of the wrist (e.g., in a direction around the wrist, or in a direction along the wrist). In some embodiments, the representations of the different applications are arranged around the wrist, and in response to a swipe input in a direction around the wrist, the computer system displays scrolling of the one or more representations of applications (e.g., representations appear to move around the wrist) in a direction in the view of the three-dimensional environment in accordance with the swipe input (e.g., at least part of a first representation for a first application ceases to be displayed and at least part of a second representation for a second application that was not previously displayed is displayed as a result of the scrolling). In some embodiments, even though some representations of the applications appear to have moved to a location behind the wrist in the view of the three-dimensional environment, when the wrist is turned and the back of the wrist is facing toward the user, the representations that were scrolled off the inner side of the wrist are not displayed on the back of the wrist. In some embodiments, the representations of the different applications are arranged along the inner side of the arm, and in response to a swipe input in a direction along the inner side of the arm connected to the wrist, the computer system displays scrolling of the one or more representations of applications (e.g., representations appear to move along the arm) in a direction in the view of the three-dimensional environment in accordance with the swipe input (e.g., at least part of a first representation for a first application ceases to be displayed and at least part of a second representation for a second application that was not previously displayed is displayed as a result of the scrolling). Scrolling the plurality of representations corresponding to different applications in a direction that corresponds to a direction of the swipe gesture on or proximate to the inner side of the wrist in response to detecting the swipe gesture on or proximate to the inner side of the wrist provides additional control options without cluttering the UI with additional displayed controls (e.g., additional displayed controls for scrolling or navigating through the plurality of representations corresponding to different applications). Providing additional control options without cluttering the UI with additional displayed controls enhances the operability of the device, which, additionally, reduces power usage and improves battery life of the device by enabling the user to use the device more quickly and efficiently.

In some embodiments, in response to detecting the presence of the wrist at the location that corresponds to the position within the view of the three-dimensional environment that is provided via the display generation component: in accordance with a determination that second criteria (e.g., application-display criteria) are met when the presence of a palm that is connected to the inner side of the wrist is detected at a location that corresponds to a position within the view of the three-dimensional environment, the computer system displays a view of a user interface of a first application (e.g., the first view 7036 of the user interface of the first application in FIG. 7B(B)) at a fifth position within the view of the three-dimensional environment that corresponds to at least a portion of the palm connected to the inner side of the wrist (e.g., the palm is facing the viewpoint corresponding to the view of the three-dimensional environment as well) (e.g., the plurality of representations corresponding to the different applications appear to overlay or replace display of the inner side of the wrist, while, optionally, the user interface of the first application appears to overlay or replace display of at least the portion of the palm that is attached to the wrist). Displaying a view of a user interface of a first application at a fifth position within the view of the three-dimensional environment that corresponds to at least a portion of the palm connected to the inner side of the wrist, in accordance with a determination that second criteria are met when the presence of a palm that is connected to the inner side of the wrist is detected at a location that corresponds to a position within the view of the three-dimensional environment, reduces the number of inputs needed to display the view of the user interface of the first application at the fifth position (e.g., the user does not need to perform additional inputs to display the view of the user interface of the first application). Reducing the number of inputs needed to perform an operation enhances the operability of the device, which, additionally, reduces power usage and improves battery life of the device by enabling the user to use the device more quickly and efficiently.

In some embodiments, the second criteria require that the palm is facing toward the viewpoint corresponding to the view of the three-dimensional environment in order for the second criteria to be met. In some embodiments, the computer system, while displaying the user interface of the first application at a position in the view that corresponds to the location of the palm, detects that palm ceases to be facing toward the viewpoint corresponding to the view of the three-dimensional environment (e.g., the palm is closed or turned away from the face of the user). In response to detecting that the palm ceases to be facing toward the viewpoint corresponding to the view of the three-dimensional environment, the computer system ceases to display the user interface of the first application at a position within the view that correspond to the location of the palm. Requiring that the palm is facing toward the viewpoint corresponding to the view of the three-dimensional environment in order for the second criteria to be met provides additional control options without cluttering the UI with additional displayed controls (e.g., additional displayed controls for displaying the view of the user interface of the first application). Providing additional control options without cluttering the UI with additional displayed controls enhances the operability of the device, which, additionally, reduces power usage and improves battery life of the device by enabling the user to use the device more quickly and efficiently.

In some embodiments, the second criteria require that a gaze input is directed to the palm that is connected to the inner side of the wrist in order for the second criteria to be met. In some embodiments, the computer system, while displaying the user interface of the first application at a position in the view that corresponds to the location of the palm, detects that the gaze input ceases to be directed toward the palm. In response to detecting that the gaze input ceases to be directed toward the palm, the computer system ceases to display the first user interface object, including a plurality of representations corresponding to different applications, at the first position within the view of the three-dimensional environment that corresponds to the first location on the wrist. Requiring that a gaze input is directed to the palm that is connected to the inner side of the wrist in order for the second criteria to be met provides additional control options without cluttering the UI with additional displayed controls (e.g., additional displayed controls for displaying the view of the user interface of the first application). Providing additional control options without cluttering the UI with additional displayed controls enhances the operability of the device, which, additionally, reduces power usage and improves battery life of the device by enabling the user to use the device more quickly and efficiently.

In some embodiments, the first user interface object includes an affordance that, when activated (e.g., by a tap input directed to a portion of the wrist that corresponds to a position of the affordance in the view of the three-dimensional environment), causes display of a user interface for selecting at least one application (or a place, an experience, or a person) for which a representation is to be added to the first user interface object. Including an affordance that, when activated, causes display of a user interface for selecting at least one application for which a representation is to be added to the first user interface object reduces the number of inputs needed to display the user interface for selecting the at least one application for which a representation is to be added to the first user interface object (e.g., the user does not need to perform additional inputs to navigate through a menu to cause display of the user interface for selecting the at least one application for which a representation is to be added to the first user interface object). Reducing the number of inputs needed to perform an operation enhances the operability of the device, which, additionally, reduces power usage and improves battery life of the device by enabling the user to use the device more quickly and efficiently.

In some embodiments, while displaying the first user interface object at the first position within the view of the three-dimensional environment that corresponds to the first location on the wrist, the computer system detects movement of the wrist (e.g., movement in the physical environment, while the wrist remains facing the user). In response to detecting the movement of the wrist: in accordance with a determination that the first criteria (e.g., icon-display criteria) continues to be met by the presence of the wrist at a location that corresponds to a position in the view of the three-dimensional environment that is provided via the display generation component, the computer system moves the first user interface object, including a plurality of representations corresponding to different applications, within the view of the three-dimensional environment such that the first user interface object continues to be displayed at a position that corresponds to the first location on the wrist (e.g., the first user interface object appears to be stuck to the wrist and move with the inner side of the wrist in the view of the three-dimensional environment). Moving the first user interface object, including a plurality of representations corresponding to different applications, within the view of the three-dimensional environment such that the first user interface object continues to be displayed at a position that corresponds to the first location on the wrist, in accordance with a determination that the first criteria continues to be met by the presence of the wrist at a location that corresponds to a position in the view of the three-dimensional environment that is provided via the display generation component, reduces the number of inputs needed to display the first user interface object and the plurality of representations corresponding to different applications at the desired locations (e.g., the user does not need to perform additional inputs to move the first user interface object or the plurality of representations corresponding to different applications when the user's wrist moves). Reducing the number of inputs needed to perform an operation enhances the operability of the device, which, additionally, reduces power usage and improves battery life of the device by enabling the user to use the device more quickly and efficiently.

In some embodiments, while displaying the first user interface object at the first position within the view of the three-dimensional environment that corresponds to the first location on the wrist, the computer system detects a gesture on or proximate to the wrist at a location that corresponds to a respective position of the first user interface object in the view of the three-dimensional environment (e.g., the gesture is a flick gesture on the wrist). In response to detecting the gesture on or proximate to the wrist at the location that corresponds to the respective position of the first user interface object in the view of the three-dimensional environment: in accordance with a determination that the gesture meets third criteria (e.g., flick-gesture criteria), the computer system displays the plurality of representations corresponding to different applications at a sixth position in the view of the three-dimensional environment that is independent of the location of the wrist (e.g., displaying the plurality of representations in a dock in the space in the center of the field of view of the display generation component, and the user can interact with the representations in the dock by using air gestures, or gaze in conjunction with micro-gestures). Displaying the plurality of representations corresponding to different applications at a sixth position independent of the location of the wrist in accordance with a determination that the gesture on or proximate to the wrist meets third criteria provides additional control options without cluttering the UI with additional displayed controls (e.g., additional displayed controls for displaying the plurality of representations corresponding to different applications at the sixth position independent of the location of the wrist). Providing additional control options without cluttering the UI with additional displayed controls enhances the operability of the device, which, additionally, reduces power usage and improves battery life of the device by enabling the user to use the device more quickly and efficiently.

In some embodiments, while displaying the first user interface object at the first position within the view of the three-dimensional environment the corresponds to the first location on the wrist, and in accordance with a determination that a predetermined touch-sensitive device (e.g., a watch with a touch-sensitive faceplate) is present at the first location on the wrist (e.g., the touch-sensitive display of a wrist watch is present on the inner side of the wrist), the computer system disables a touch-sensitive surface of the predetermined touch-sensitive device. In some embodiments, the computer system disables the touch-sensitive surface of the predetermined touch-sensitive device only when the position of the first user interface object (or optionally, the controls, notifications, status indicators, etc.) (e.g., either on the back of the wrist or the inner side of the wrist) overlaps with the image of the touch-sensitive surface of the touch-sensitive device in the view of the three-dimensional environment. It should be understood that the particular order in which the operations in FIG. 10 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, and 11000) are also applicable in an analogous manner to method 10000 described above with respect to FIG. 10. For example, the gestures, gaze inputs, physical objects, user interface objects, and/or animations described above with reference to method 10000 optionally have one or more of the characteristics of the gestures, gaze inputs, physical objects, user interface objects, and/or animations described herein with reference to other methods described herein (e.g., methods 8000, 9000, and 11000). For brevity, these details are not repeated here. Disabling a touch-sensitive surface of the predetermined touch-sensitive device in accordance with a determination that the predetermined touch-sensitive device is present at the first location on the wrist reduces the number of inputs needed to disable the touch-sensitive surface of the predetermined touch-sensitive device (e.g., the user does not need to perform additional inputs to disable the touch-sensitive surface of a watch, to prevent accidental input, if the user is wearing the watch on the user's wrist). Reducing the number of inputs needed to perform an operation enhances the operability of the device, which, additionally, reduces power usage and improves battery life of the device by enabling the user to use the device more quickly and efficiently.

FIG. 11 is a flowchart of a method of facilitating user interaction with a computer-generated environment that is shared between multiple users (e.g., including displaying or hiding (or forgoing display of) a user interface object associated with another user based on whether the spatial relationship between the user interface object and its associated user meets preset criteria), in accordance with some embodiments.

The method 11000 relates to changing whether to share a user interface of an application activated by one user (e.g., a controlling user who had activated the application in the three-dimensional environment) in a three-dimensional environment with another user that also have a view of the three-dimensional environment using a different display generation component from that used by the first user. In the present method, the decision of whether to display the content of the user interface of the application in the view of the three-dimension environment displayed via a display generation component of the user that had not activated the application (e.g., the non-controlling user) is based on whether a spatial relationship between the user interface of the application and the controlling user (e.g., a spatial relationship between the user interface and a viewpoint of the currently displayed view of the three-dimensional environment provided via the display generation component of the controlling user). For example, when the user interface of the application is displayed at a position in the view of the three-dimensional environment provided by a first display generation component used by the controlling user, where the position corresponds to the controlling user's palm (and optionally, the palm is facing toward the controlling user, or away from the non-controlling user, etc.), then, the user interface of the application is kept private to the controlling user and is not displayed in the view of the three-dimensional environment provided by a second display generation component used by the non-controlling user. Using the spatial relationship between the user interface of an application and its controlling user to determine whether to share the user interface in a shared three-dimensional environment allows the users to collaborate and share an experience without unnecessarily compromising certain private content displayed in the three-dimensional environment, and also makes the control and release of the private content easy and intuitive for the controlling user, without the requirement of using a configuration user interface for adjusting the privacy setting of each user interface that is displayed in the three-dimensional environment.

In some embodiments, the method 11000 is performed at a computer system (e.g., computer system 101 in FIG. 1) including a display generation component (e.g., display generation component 120 in FIGS. 1, 3, and 4, and display generation component 7100, 7200 in FIGS. 7A-7G) (e.g., a heads-up display, a display, a touchscreen, a projector, etc.) and one or more input devices (e.g., one or more cameras (e.g., a camera (e.g., color sensors, infrared sensors, and other depth-sensing cameras) that points downward at a user's hand or a camera that points forward from the user's head), controllers, touch-sensitive surfaces, joysticks, buttons, etc.). In some embodiments, the computer system is an integrated device with one or more processors and memory enclosed in the same housing as the display generation component and at least some of the one or more input devices. In some embodiments, the computer system includes a computing component that includes one or more processors and memory that is separate from the display generation component and/or the one or more input devices. In some embodiments, the display generation component and the one or more input devices are integrated and enclosed in the same housing. In some embodiments, the method 11000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 11000 are, optionally, combined and/or the order of some operations is, optionally, changed.

In the method 11000, while displaying one or more user interface objects (e.g., representations of applications, user interfaces, virtual objects, controls, information items, media items, etc.) in a first view of a three-dimensional environment to a first user (e.g., a non-controlling user with respect to a user interface object) (e.g., the user of the first computer system) that includes a representation of a second user (e.g., a controlling user with respect to the user interface object) (e.g., a view of the second user through a transparent display of the first display generation component or a camera view of the environment surrounding the first user and the second user, a virtual representation of the second user with a spatial position within the first view of the three-dimensional environment that corresponds to the real spatial location of the second user in the physical environment, etc.), the computer system receives (11002) a request to display a second view of the three-dimensional environment (e.g., receiving the request to display the second view of the three-dimensional environment includes detecting a relative movement of the second user or part of the second user between the second user and a viewpoint corresponding to the view of the three-dimensional environment displayed via the first display generation component (e.g., the viewpoint corresponds to a location of the first user's head or eyes) (e.g., the relative movement is a result of the movement by the first user or the movement of the second user in the physical environment)).

For example, as illustrated in FIG. 7F, the "first user" as used herein refers to the user 7002 if the "second user" as used herein refers to the user 7102; and the "first user" as used herein refers to the user 7102 if the "second user" as used herein refers to the user 7002. In response to receiving the request to display the second view of the three-dimensional environment (11004), in accordance with a determination that the second view of the three-dimensional environment includes a location corresponding to a first portion (e.g., a content-presenting side (e.g., a front side or user-facing side) of a user interface object (e.g., an object that presents a user interface of an application, a media item, or other virtual content) associated with the second user (e.g., an object that is displayed in response to user input by the second user by a second computing system controlled by the second user) (e.g., the user interface object includes a user interface of an application (e.g., first view 7036 of the user interface of an application, first view 7236 of the user interface of an application, second view 7236" of the user interface of an application, first view 7034" of a user interface of an application, etc.) or a virtual object on which the user interface of the application is displayed (e.g., one of the objects 7034, 7034", 7206 or 7206")) where the location is not obscured by other objects or other portions of the user interface object in the three-dimensional environment (e.g., the first portion of the user interface object, if displayed, would be directly facing the first user, and/or not blocked by other objects or the back or side portions of the user interface object) and the user interface object associated with the second user meets respective criteria (e.g., the respective criteria correspond to a content privacy policy of under what spatial conditions, the private content shown to the second user via the user interface object would be made visible to the first user in a shared experience (e.g., shared experience in the three-dimensional environment)), the computer system displays (11006) the user interface object that is associated with second user (e.g., the controlling user of the user interface object), including the first portion of the user interface object, at the location (e.g., the user interface object, including the first portion of the user interface object is made visible to the first user via the first display generation component in the second view of the three-dimensional environment), wherein the respective criteria include a criterion that is met when the user interface object that is associated with the second user has a predetermined spatial relationship to the second user (e.g., the controlling user of the user interface object) (e.g., the criteria require that the user interface object is displayed at a location that is near the second user or on a wall in the physical environment, rather than in the second user's hand, or that the user interface object is facing away from the second user, rather than toward the second user, in order for the criterion to be met).

For example, as illustrated in FIG. 7G, the first view 7036 of the user interface of an application controlled by the user 7002 is displayed (e.g., as first view 7036") in the view of the three-dimensional environment provided via the display generation component 7200 used by the non-controlling user 7102 (e.g., non-controlling with respect to the first view 7036 of the user interface of the application). Similarly, the second view 7236" of the user interface of an application controlled by the user 7102 is displayed (e.g., as second view 7236' of the user interface) in the view of the three-dimensional environment provided via the display generation component 7100 used by the non-controlling user 7002 (e.g., non-controlling with respect to the second view 7236" of the user interface of the application). In response to receiving the request to display the second view of the three-dimensional environment (11004), in accordance with a determination that the second view of the three-dimensional environment includes the location corresponding to the first portion of the user interface object associated with the second user where the location is not obscured by other objects or other portions of the user interface object in the three-dimensional environment (e.g., the first portion of the user interface object, if displayed, would be directly facing the first user, and/or not blocked by other objects or the back or side portions of the user interface object) and the user interface object associated with the second user does not meet the respective criteria (e.g., the respective criteria correspond to the content privacy policy of under what spatial conditions, the private content shown to the second user via the user interface object would be made visible to the first user in the shared experience (e.g., shared experience in the three-dimensional environment)), the computer system forgoes (10008) displaying at least a portion of the user interface object that is associated with the second user (e.g., the controlling user of the user interface object), including forgoing displaying the first portion of the user interface object (e.g., the first portion of the user interface object is hidden or obscured (e.g., by a visual effect) in the second view of the three-dimensional environment as a result of the respective criteria not being met, even though no other objects or other portions of the user interface object is displayed at the location to block the view of the first portion of the user interface object).

For example, as illustrated in FIG. 7F, the first view 7036 of the user interface of an application controlled by the user 7002 is not displayed in the view of the three-dimensional environment provided via the display generation component 7200 used by the non-controlling user 7102 (e.g., non-controlling with respect to the first view 7036 of the user interface of the application). Similarly, the first view 7236 of the user interface of an application controlled by the user 7102 is not displayed in the view of the three-dimensional environment provided via the display generation component 7100 used by the non-controlling user 7002 (e.g., non-controlling with respect to the first view 7236 of the user interface of the application).

In some embodiments, the criterion is (or the respective criteria are) met in accordance with a determination that the user interface object is displayed within a respective view of the three-dimensional environment that is displayed via a second display generation component (e.g., the display generation component of the second computer system that is used by the second user and sharing the views of the three-dimensional environment with the first computer system used by the first user) and that a respective position of the user interface object in the respective view of the three-dimensional environment does not correspond to a location of a hand (e.g., a location of the palm of the hand) of the second user (e.g., the user interface object is not displayed at a position in the respective view of the three-dimensional environment as overlaying or replacing the view of the second user's hand) (e.g., the user interface object is displayed as overlaying or replacing the view of a tabletop near the second user or overlaying or replacing the view of a wall that is in front of the second user in the respective view of the three-dimensional environment displayed via the second display generation component). This is illustrated using the example in which the first view 7236 of the user interface of an application controlled by the user 7102 is transformed into the second view 7236" of the user interface of the application in the view of the three-dimensional environment provided via the display generation component 7200, and moved from a position corresponding to the user 7102's palm to a position corresponding to the top surface of the object 7014, as shown in FIG. 7G, causing the second view of the user interface to be displayed (e.g., as second view 7236' of the user interface) in the view of the three-dimensional environment provided via the display generation component used by the user 7002. Displaying the user interface object that is associated with the second user at a location that is not obscured by other objects or other portions of the user interface object, in accordance with a determination that the user interface object is displayed within a respective view and that a respective position of the user interface object in the respective view does not correspond to a location of a hand of the second user provides additional control options without cluttering the UI with additional displayed controls (e.g., additional displayed controls for whether to display or forgo display of the at least the portion of the user interface object associated with the second user). Providing additional control options without cluttering the UI with additional displayed controls enhances the operability of the device, which, additionally, reduces power usage and improves battery life of the device by enabling the user to use the device more quickly and efficiently.

In some embodiments, the criterion is (or the respective criteria are) met in accordance with a determination that the user interface object is displayed within the respective view of the three-dimensional environment that is displayed via the second display generation component, that the respective position of the user interface object in the respective view of the three-dimensional environment corresponds to the location of the hand (e.g., a location of the palm of the hand) of the second user, and that a content side of the user interface object (e.g., the first portion of the user interface object) is facing toward a viewpoint corresponding to the respective view of the three-dimensional environment (e.g., the head or face of the first user) in the respective view of the three-dimensional environment (e.g., the user interface object is displayed at a position in the respective view of the three-dimensional environment via the second display generation component as overlaying or replacing the view of the second user's hand, but the front-side of the user interface object is facing toward the location of the first user in the three-dimensional environment). Displaying the user interface object that is associated with the second user at a location that is not obscured by other objects or other portions of the user interface object, in accordance with a determination that the user interface object is displayed within a respective view, corresponds to the location of the hand of the second user, and that a content side of the user interface object is facing toward a viewpoint corresponding to the respective view of the three-dimensional environment, provides additional control options without cluttering the UI with additional displayed controls (e.g., additional displayed controls for whether to display or forgo display of the at least the portion of the user interface object associated with the second user). Providing additional control options without cluttering the UI with additional displayed controls enhances the operability of the device, which, additionally, reduces power usage and improves battery life of the device by enabling the user to use the device more quickly and efficiently.

In some embodiments, the criterion is (or the respective criteria are) met in accordance with a determination that the user interface object is displayed within the respective view of the three-dimensional environment that is displayed via the second display generation component, that the respective position of the user interface object in the respective view of the three-dimensional environment corresponds to the location of the hand (e.g., a location of the palm of the hand) of the second user, and that a content side of the user interface object (e.g., the first portion of the user interface object) is not facing toward a viewpoint corresponding to the respective view of the three-dimensional environment (e.g., head or face of the second user) in the respective view of the three-dimensional environment (e.g., the user interface object is displayed at a position in the respective view of the three-dimensional environment as overlaying or replacing the view of the second user's hand, but the front-side of the user interface object is not facing toward the second user in the three-dimensional environment). This is illustrated using the example in which the first view 7036 of the user interface of an application controlled by the user 7002 is turned from facing toward the user 7002 to facing away from the user 7002 in the view of the three-dimensional environment provided via the display generation component 7100, as shown in FIG. 7G, causing the first view 7036 of the user interface to be displayed (e.g., as the first view 7036" of the user interface) in the view of the three-dimensional environment provided via the display generation component 7200 used by the non-controlling user 7102. Displaying the user interface object that is associated with the second user at a location that is not obscured by other objects or other portions of the user interface object, in accordance with a determination that the user interface object is displayed within a respective view, corresponds to the location of the hand of the second user, and that a content side of the user interface object is not facing toward a viewpoint corresponding to the respective view of the three-dimensional environment, provides additional control options without cluttering the UI with additional displayed controls (e.g., additional displayed controls for whether to display or forgo display of the at least the portion of the user interface object associated with the second user). Providing additional control options without cluttering the UI with additional displayed controls enhances the operability of the device, which, additionally, reduces power usage and improves battery life of the device by enabling the user to use the device more quickly and efficiently.

In some embodiments, forgoing displaying at least a portion of the user interface object that is associated with the second user includes displaying the second view of the three-dimensional environment without displaying the user interface object in the second view of the three-dimensional environment (e.g., the second view of the three-dimensional environment as displayed via the first display generation component does not show the user interface object at all, even though the location that corresponds to the position of the user interface object in the respective view of the three-dimensional environment displayed via the second display generation component is also included in the second view shown via the first display generation component). Displaying the second view of the three-dimensional environment without displaying the user interface object in the second view of the three-dimensional environment reduces the number of inputs to forgo displaying the user interface object (e.g., the user does not need to perform additional inputs to forgo display of individual portions of the user interface object). Reducing the number of inputs needed to perform an operation enhances the operability of the device, which, additionally, reduces power usage and improves battery life of the device by enabling the user to use the device more quickly and efficiently.

In some embodiments, forgoing displaying at least a portion of the user interface object that is associated with the second user includes displaying the second view of the three-dimensional environment with an indication of the user interface object (e.g., a shape or outline of the user interface object) (e.g., indication 7216 for the first view 7236, or indication 7204 for the first view 7036 in FIG. 7F) in the second view of the three-dimensional environment, where at least a portion of content in the user interface object (e.g., first portion of the user interface object) is obscured (e.g., dimmed or blurred by a visual effect) in the indication of the user interface object (e.g., the second view of the three-dimensional environment as displayed via the first display generation component shows an outline or a translucent image of the user interface object at the position of the user interface object in the respective view of the three-dimensional environment displayed via the second display generation component, but the outline or translucent image of the user interface object displayed via the first display generation component does not include the private content that is shown on the user interface object in the respective view of the three-dimensional environment displayed via the second display generation component).

Displaying the second view of the three-dimensional environment with an indication of the user interface object in the second view of the three-dimensional environment, where at least a portion of content in the user interface object is obscured in the indication of the user interface object provides improved visual feedback to the user (e.g., improved visual feedback that the location corresponding to the first portion of the user interface object associated with the second user is obscured by other objects or other portions of the user interface object in the three-dimensional environment, or that the user interface object associated with the second user does not meet the respective criteria). Providing improved feedback enhances the operability of the device, which, additionally, reduces power usage and improves battery life of the device by enabling the user to use the device more quickly and efficiently.

In some embodiments, while displaying, via the first display generation component, a respective view of the three-dimensional environment (e.g., the second view of the three-dimensional environment), wherein the display of at least a portion of the user interface object (e.g., the display of the first portion of the user interface object) is forgone (e.g., not displayed at all or only displayed as an outline or translucent version thereof) in accordance with a determination that the user interface object does not meet the respective criteria (e.g., the user interface object does not have the predetermined spatial relationship to the second user in the respective view of the three-dimensional environment displayed via the second display generation component), the computer system detects a first change in the spatial relationship between the user interface object and the second user (e.g., the first change is due to movement of the second user, rather than the movement of the first user). In response to detecting the first change in the spatial relationship between the user interface object and the second user: in accordance with a determination that the respective view of the three-dimensional environment displayed via the first display generation component includes a first location corresponding to the first portion of the user interface object (e.g., the front side or the content side of the user interface object), that the first location is not obscured by other objects or other portions of the user interface object (e.g., other physical or virtual objects, or the back or side portions of the user interface object) in the three-dimensional environment displayed via the first display generation component, and that the user interface object associated with the second user meets the respective criteria (e.g., this change is a result of the action of the second user with respect to the user interface object, rather than the first user moving to a different location relative to the user interface object or the second user), the computer system displays, via the first display generation component, the user interface object that is associated with second user, including the first portion of the user interface object, at a position corresponding to the first location (e.g., as a result of a change in the relative position of the second user and the user interface object (e.g., a change in the relative position between the hand of the second user and the user interface object, or a change in the relative position of the front side of the user interface object and the face of the second user), the user interface object or portion thereof that was not displayed or obscured becomes displayed in the respective view of the three-dimensional environment shown via the first display generation component). This is illustrated in FIGS. 7F-7G using the user interface of the application activated by the user 7102, for example.

In some embodiments, in response to detecting the first change in the spatial relationship between the user interface object and the second user: in accordance with a determination that the respective view of the three-dimensional environment displayed via the first display generation component includes a first location corresponding to the first portion of the user interface object (e.g., the front side or the content side of the user interface object), that the first location is not obscured by other objects or other portions of the user interface object (e.g., other physical or virtual objects, or the back or side portions of the user interface object) in the three-dimensional environment displayed via the first display generation component, and that the user interface object associated with the second user does not meet the respective criteria, the computer system does not display, via the first display generation component, the user interface object that is associated with second user, including the first portion of the user interface object, at the position corresponding to the first location (e.g., the user interface object or portion thereof that was not displayed or obscured is still not displayed in the respective view of the three-dimensional environment shown via the first display generation component, if the respective criteria are not met by the user interface object (e.g., if the action of the second user does not cause the user interface object to move far enough to signal the second user's intent to share the view of the user interface object with the first user)).

Displaying the user interface object that is associated with second user, including the first portion of the user interface object, at a position corresponding to the first location in response to detecting the first change in spatial relationship between the user interface object and the second user and in accordance with a determination that the respective view of the three-dimensional environment includes a first location corresponding to the first portion of the user interface object, that the first location is not obscured by other objects or other portions of the user interface object in the three-dimensional environment, and that the user interface object associated with the second user meets the respective criteria reduces the number of inputs needed to display the user interface object that is associated with the second user including the first portion of the user interface object (e.g., the user does not need to perform additional inputs to display the first portion of the user interface object when the spatial relationship between the user interface object and the second user changes and the first location is not obscured by other objects or other portions of the user interface object). Reducing the number of inputs needed to perform an operation enhances the operability of the device, which, additionally, reduces power usage and improves battery life of the device by enabling the user to use the device more quickly and efficiently.

In some embodiments, detecting the first change in the spatial relationship between the user interface object and the second user includes detecting a threshold amount of spatial separation (e.g., by a threshold distance (e.g., 10 inches) or qualitative threshold (e.g., not in hand, outside of arm's length, etc.)) between the user interface object and a position in the respective view of the three-dimensional environment that corresponds to a location of the second user (e.g., the user interface object is no longer displayed at a location that corresponds to the location of the second user or a portion thereof (e.g., the second user's hand or palm)). This is illustrated in FIGS. 7F-7G using the user interface of the application activated by the user 7102, for example. Displaying the user interface object, including the first portion of the user interface object, that is associated with the second user at a position corresponding to the first location in response to detecting the first change in the spatial relationship that includes a threshold amount of spatial separation between the user interface object and a position in the respective view of the three-dimensional environment that corresponds to a location of the second user and in accordance with a determination that the respective view of the three-dimensional environment includes a first location corresponding to the first portion of the user interface object, that the first location is not obscured by other objects or other portions of the user interface object in the three-dimensional environment, and that the user interface object associated with the second user meets the respective criteria reduces the number of inputs needed to display the user interface object that is associated with the second user including the first portion of the user interface object (e.g., the user does not need to perform additional inputs to display the first portion of the user interface object when the spatial relationship between the user interface object and the second user changes and the first location is not obscured by other objects or other portions of the user interface object). Reducing the number of inputs needed to perform an operation enhances the operability of the device, which, additionally, reduces power usage and improves battery life of the device by enabling the user to use the device more quickly and efficiently.

In some embodiments, while displaying, via the first display generation component, the user interface object that is associated with second user, including the first portion of the user interface object, at the position corresponding to the first location in the respective view of the three-dimensional environment (e.g., while displaying the user interface object via the first display generation component as a result of the respective criteria being met by the user interface object), the computer system detects a second change in the spatial relationship between the user interface object and the second user (e.g., the second change is due to movement of the second user, rather than the movement of the first user). In response to detecting the second change in the spatial relationship between the user interface object and the second user: in accordance with a determination that the respective view of the three-dimensional environment includes a second location corresponding to the first portion of the user interface object, that the second location is not obscured by other objects or other portions of the user interface object in the three-dimensional environment, and that the user interface object associated with the second user does not meet the respective criteria (e.g., this change is a result of the action of the second user with respect to the user interface object, rather than the first user moving to a different location relative to the user interface object or the second user), the computer system ceases to display at least a portion of the user interface object that is associated with second user via the first display generation component, including ceasing to display the first portion of the user interface object, at a position corresponding to the second location in the respective view of the three-dimensional environment (e.g., even though the user interface object remains displayed at a position corresponding to the second location in a respective view of the three-dimensional environment displayed via the second display generation component).

In some embodiments, the second user provides an input to bring the user interface object back into a private mode, e.g., by providing a gesture that recalls the user interface object from a nearby surface or the wall back to the second user's hand, or turning the second user's palm to face toward the second user's face, or away from the first user's face. In some embodiments, in response to detecting the second change in the spatial relationship between the user interface object and the second user: in accordance with a determination that the respective view of the three-dimensional environment includes the second location corresponding to the first portion of the user interface object, that the second location is not obscured by other objects or other portions of the user interface object in the three-dimensional environment, and that the user interface object associated with the second user meets the respective criteria, the computer system maintains display of at least the portion of the user interface object that is associated with second user via the first display generation component, including maintaining display the first portion of the user interface object, at the position corresponding to the second location in the respective view of the three-dimensional environment (e.g., the user interface object and the shared content of the user interface object remain displayed at the position corresponding to the second location in a respective view of the three-dimensional environment displayed via the second display generation component). For example, if the second user provides an input, but the input does not meet the criteria for bringing the user interface object back into a private mode, e.g., by providing a gesture that did not succeed in recalling the user interface object from a nearby surface or the wall back to the second user's hand, or not turning the second user's palm enough to face toward the second user's face, or away from the first user's face, the user interface object and its content remains viewable by the first user after the input. Ceasing to display at least a portion of the user interface object that is associated with the second user, including the first portion of the user interface object, at a position corresponding to the second location in response to detecting the second change in the spatial relationship between the user interface object and the second user and in accordance with a determination that the respective view of the three-dimensional environment includes a second location corresponding to the first portion of the user interface object, that the second location is not obscured by other objects or other portions of the user interface object, and that the user interface object associated with the second user does not meet the respective criteria reduces the number of inputs needed to cease display of the first portion of the user interface object (e.g., the user does not need to perform additional inputs to cease display of the first portion of the user interface object when the spatial relationship between the user interface object and the second user changes, and the user interface object associated with the second user does not meet the respective criteria). Reducing the number of inputs needed to perform an operation enhances the operability of the device, which, additionally, reduces power usage and improves battery life of the device by enabling the user to use the device more quickly and efficiently.

In some embodiments, while displaying, via the first display generation component, a respective view of the three-dimensional environment, wherein the display of at least a portion of the user interface object (e.g., the first portion of the user interface object) is forgone in accordance with a determination that the user interface object does not meet the respective criteria, the computer system detects a first gesture by the second user (e.g., turning of the palm of the second user) that moves the user interface object in the three-dimensional environment (e.g., turning the front side of the user interface object away from the second user's face (e.g., the viewpoint corresponding to the view of the three-dimensional environment displayed via the second display generation component) and/or toward the first user's face (e.g., the viewpoint corresponding to the view of the three-dimensional environment displayed via the first display generation component)) without spatially separating the user interface object from a position in the respective view of the three-dimensional environment that corresponds to a location of the second user (e.g., the user interface object is still displayed at a location that corresponds to the location of the second user or a portion thereof (e.g., the second user's hand or palm, but turned toward the first user or away from the face of the second user by the gesture of the second user)). In response to detecting the first gesture by the second user that moves the user interface object in the three-dimensional environment: in accordance with a determination that the respective view of the three-dimensional environment displayed via the first display generation component includes a third location corresponding to the first portion of the user interface object, that the third location is not obscured by other objects or other portions of the user interface object in the respective view of the three-dimensional environment, and that the user interface object associated with the second user meets the respective criteria (e.g., the respective criteria includes a criterion that is met when the user interface object is facing toward a viewpoint corresponding to the respective view of the three-dimensional environment displayed via the first display generation component, or a criterion that is met when the user interface object is facing away from a viewpoint corresponding to the respective view of the three-dimensional environment displayed via the second display generation component), the computer system displays (e.g., ceasing to forgo display of), via the first display generation component, the user interface object that is associated with the second user, including the first portion of the user interface object, at the position corresponding to the location of the second user in the respective view of the three-dimensional environment. This is illustrated in FIGS. 7F-7G using the user interface of the application activated by the user 7002, for example. Displaying the user interface object that is associated with the second user, including the first portion of the user interface object, at the position corresponding to the location of the second user in the respective view of the three-dimensional environment, in response to detecting the first gesture by the second user that moves the user interface object in the three-dimensional environment, and in accordance with a determination that the respective view of the three-dimensional environment displayed via the first display generation component includes a third location corresponding to the first portion of the user interface object, that the third location is not obscured by other objects or other portions of the user interface object in the respective view of the three-dimensional environment, and that the user interface object associated with the second user meets the respective criteria, reduces the number of inputs needed to display the user interface object associated with the second user at the position corresponding to the location of the second user (e.g., the second user does not need to perform additional inputs to display the first portion of the user interface object in addition to the first gesture by the second user that moves the user interface object). Reducing the number of inputs needed to perform an operation enhances the operability of the device, which, additionally, reduces power usage and improves battery life of the device by enabling the user to use the device more quickly and efficiently.

In some embodiments, the first gesture by the second user includes turning a palm of the second user (e.g., the palm that is holding the user interface object in the view of the three-dimensional environment shown via the second display generation component) toward the first user (and/or turning the palm of the second user away from the face of the second user). Displaying the user interface object that is associated with the second user, including the first portion of the user interface object, at the position corresponding to the location of the second user in the respective view of the three-dimensional environment, in response to detecting the first gesture by the second user that includes turning a palm of the second user toward the first user and moves the user interface object in the three-dimensional environment, and in accordance with a determination that the respective view of the three-dimensional environment displayed via the first display generation component includes a third location corresponding to the first portion of the user interface object, that the third location is not obscured by other objects or other portions of the user interface object in the respective view of the three-dimensional environment, and that the user interface object associated with the second user meets the respective criteria, reduces the number of inputs needed to display the user interface object associated with the second user at the position corresponding to the location of the second user (e.g., the second user does not need to perform additional inputs to display the first portion of the user interface object in addition to the first gesture by the second user that moves the user interface object). Reducing the number of inputs needed to perform an operation enhances the operability of the device, which, additionally, reduces power usage and improves battery life of the device by enabling the user to use the device more quickly and efficiently.

In some embodiments, while displaying, via the first display generation component, a respective view of the three-dimensional environment, wherein at least a portion of the user interface object (e.g., the first portion of the user interface object) is displayed (e.g., not foregone) in accordance with a determination that the user interface object meets the respective criteria, the computer system detects a second gesture by the second user (e.g., turning of the palm of the second user) that moves the user interface object in the three-dimensional environment (e.g., turning the front side of the user interface object toward the second user's face (e.g., the viewpoint corresponding to the view of the three-dimensional environment displayed via the second display generation component) and/or away from the first user's face (e.g., the viewpoint corresponding to the view of the three-dimensional environment displayed via the first display generation component)) without spatially separating the user interface object from a position in the respective view of the three-dimensional environment that corresponds to a location of the second user (e.g., the user interface object is still displayed at a location that corresponds to the location of the second user or a portion thereof (e.g., the second user's hand or palm, but turned away from the first user or toward the face of the second user by the gesture of the second user)). In response to detecting the second gesture by the second user that moves the user interface object in the three-dimensional environment: in accordance with a determination that the respective view of the three-dimensional environment displayed via the first display generation component includes a fourth location corresponding to the first portion of the user interface object, that the fourth location is not obscured by other objects or other portions of the user interface object in the respective view of the three-dimensional environment, and that the user interface object associated with the second user does not meet the respective criteria (e.g., the respective criteria includes a criterion that is met when the user interface object is facing toward a viewpoint corresponding to the respective view of the three-dimensional environment displayed via the first display generation component, or a criterion that is met when the user interface object is facing away from a viewpoint corresponding to the respective view of the three-dimensional environment displayed via the second display generation component), the computer system ceases display, via the first display generation component, of the user interface object that is associated with second user, including the first portion of the user interface object, at the position corresponding to the location of the second user in the respective view of the three-dimensional environment. Ceasing to display the user interface object that is associated with second user, including the first portion of the user interface object, at the position corresponding to the location of the second user in the respective view of the three-dimensional environment in response to detecting the second gesture by the second user that moves the user interface object in the three-dimensional environment and in accordance with a determination that the respective view of the three-dimensional environment displayed via the first display generation component includes a fourth location corresponding to the first portion of the user interface object, that the fourth location is not obscured by other objects or other portions of the user interface object in the respective view of the three-dimensional environment, and that the user interface object associated with the second user does not meet the respective criteria, reduces the number of inputs needed to cease display of the user interface object that is associated with the second user, including the first portion of the user interface object (e.g., the user does not need to perform additional inputs to cease display of the user interface object, in addition to the second gesture that moves the user interface object). Reducing the number of inputs needed to perform an operation enhances the operability of the device, which, additionally, reduces power usage and improves battery life of the device by enabling the user to use the device more quickly and efficiently.

In some embodiments, the second gesture by the second user includes turning a palm of the second user (e.g., the palm that is holding the user interface object in the view of the three-dimensional environment shown via the second display generation component) away from the first user (and/or turning the palm of the second user away from the face of the second user). Ceasing to display the user interface object that is associated with second user, including the first portion of the user interface object, at the position corresponding to the location of the second user in the respective view of the three-dimensional environment in response to detecting the second gesture by the second user that includes turning a palm of the second user away from the first user and moves the user interface object in the three-dimensional environment, and in accordance with a determination that the respective view of the three-dimensional environment displayed via the first display generation component includes a fourth location corresponding to the first portion of the user interface object, that the fourth location is not obscured by other objects or other portions of the user interface object in the respective view of the three-dimensional environment, and that the user interface object associated with the second user does not meet the respective criteria, reduces the number of inputs needed to cease display of the user interface object that is associated with the second user, including the first portion of the user interface object (e.g., the user does not need to perform additional inputs to cease display of the user interface object, in addition to the second gesture that moves the user interface object). Reducing the number of inputs needed to perform an operation enhances the operability of the device, which, additionally, reduces power usage and improves battery life of the device by enabling the user to use the device more quickly and efficiently.

It should be understood that the particular order in which the operations in FIG. 11 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, and 10000) are also applicable in an analogous manner to method 11000 described above with respect to FIG. 11. For example, the gestures, gaze inputs, physical objects, user interface objects, and/or animations described above with reference to method 11000 optionally have one or more of the characteristics of the gestures, gaze inputs, physical objects, user interface objects, and/or animations described herein with reference to other methods described herein (e.g., methods 8000, 9000, and 10000). For brevity, these details are not repeated here.

The operations described above with reference to FIGS. 8, 9, 10, and 11 are, optionally, implemented by components depicted in FIGS. 1-6. In some embodiments, aspects/operations of methods 8000, 9000, 10000, and 11000 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at a computer system including a display generation component and one or more input devices:
   detecting presence of a wrist at a location that corresponds to a position within a view of a three-dimensional environment that is provided via the display generation component;
   in response to detecting the presence of the wrist at the location that corresponds to the position within the view of the three-dimensional environment that is provided via the display generation component:
   in accordance with a determination that first criteria are met by the presence of the wrist at the location that corresponds to the position in the view of the three-dimensional environment that is provided via the display generation component, wherein the first criteria require that an inner side of the wrist is facing toward a viewpoint corresponding to the view of the three-dimensional environment that is provided via the display generation component, displaying, via the display generation component, a first user interface object, including a plurality of representations corresponding to different applications, at a first position within the view of the three-dimensional environment that corresponds to a first location on the wrist;
   while displaying the first user interface object at the first position within the view of the three-dimensional environment that corresponds to the first location on the wrist, detecting that the wrist has changed from satisfying the first criteria to satisfying second criteria, wherein the second criteria require that an outer side of the wrist is facing toward the viewpoint corresponding to the view of the three-dimensional environment that is provided via the display generation component;
   in response to detecting that the wrist has changed from satisfying the first criteria to satisfying the second criteria, switching from displaying the first user interface object at the first position within the view of the three-dimensional environment that corresponds to the first location on the wrist to displaying, via the display generation component, a second user interface object, including a plurality of controls for controlling functions for the computer system, at a second position within the view of the three-dimensional environment that corresponds to a location on a back of a hand that is attached to the wrist, wherein the second user interface object is displayed while the wrist continues to satisfy the second criteria;
   while displaying the second user interface object that includes the plurality of controls for controlling functions of the computer system, detecting a user input directed to a respective control of the plurality of controls; and
   in response to detecting the user input, performing a function corresponding to the respective control.

2. The method of claim 1, including:
   in response to detecting that the wrist has changed from satisfying the first criteria to satisfying the second criteria, displaying one or more notifications corresponding to one or more applications at a third position within the view of the three-dimensional environment that corresponds to a location on the back of the hand that is attached to the wrist.

3. The method of claim 1, including:
   while displaying the plurality of controls for controlling functions for the computer system at the second position within the view of the three-dimensional environment that corresponds to the location on the back of the hand that is attached to the wrist, displaying one or more notifications corresponding to one or more applications at a fourth position within the view of the three-dimensional environment that corresponds to a location on a back side of the wrist.

4. The method of claim 1, including:
   while displaying the plurality of representations corresponding to different applications at the first position within the view of the three-dimensional environment that corresponds to the first location on the wrist and while the inner side of the wrist is facing toward the viewpoint corresponding to the view of the three-dimensional environment, detecting a swipe gesture on or proximate to the inner side of the wrist; and
   in response to detecting the swipe gesture on or proximate to the inner side of the wrist, scrolling the plurality of representations corresponding to different applications in a direction that corresponds to a direction of the swipe gesture on or proximate to the inner side of the wrist.

5. The method of claim 1, including:
   in response to detecting the presence of the wrist at the location that corresponds to the position within the view of the three-dimensional environment that is provided via the display generation component:
   in accordance with a determination that second criteria are met when the presence of a palm that is connected to the inner side of the wrist is detected at a location that corresponds to a position within the view of the three-dimensional environment, displaying a view of a user interface of a first application at a fifth position within the view of the three-dimensional environment that corresponds to at least a portion of the palm connected to the inner side of the wrist.

6. The method of claim 5, wherein the second criteria require that the palm is facing toward the viewpoint corresponding to the view of the three-dimensional environment in order for the second criteria to be met.

7. The method of claim 5, wherein the second criteria require that a gaze input is directed to the palm that is connected to the inner side of the wrist in order for the second criteria to be met.

8. The method of claim 1, wherein the first user interface object includes an affordance that, when activated, causes display of a user interface for selecting at least one application for which a representation is to be added to the first user interface object.

9. The method of claim 1, including:
while displaying the first user interface object at the first position within the view of the three-dimensional environment that corresponds to the first location on the wrist, detecting movement of the wrist; and
in response to detecting the movement of the wrist:
in accordance with a determination that the first criteria continues to be met by the presence of the wrist at a location that corresponds to a position in the view of the three-dimensional environment that is provided via the display generation component, moving the first user interface object, including the plurality of representations corresponding to different applications, within the view of the three-dimensional environment such that the first user interface object continues to be displayed at a position that corresponds to the first location on the wrist.

10. The method of claim 1, including:
while displaying the first user interface object at the first position within the view of the three-dimensional environment that corresponds to the first location on the wrist, detecting a gesture on or proximate to the wrist at a location that corresponds to a respective position of the first user interface object in the view of the three-dimensional environment; and
in response to detecting the gesture on or proximate to the wrist at the location that corresponds to the respective position of the first user interface object in the view of the three-dimensional environment:
in accordance with a determination that the gesture meets third criteria, displaying the plurality of representations corresponding to different applications at a sixth position in the view of the three-dimensional environment that is independent of the location of the wrist.

11. The method of claim 1, including:
while displaying the first user interface object at the first position within the view of the three-dimensional environment that corresponds to the first location on the wrist, and in accordance with a determination that a predetermined touch-sensitive device is present at the first location on the wrist, disabling a touch-sensitive surface of the predetermined touch-sensitive device.

12. The method of claim 1, wherein the plurality of controls for controlling functions for the computer system are distinct from the plurality of representations corresponding to different applications.

13. The method of claim 1, wherein the plurality of controls include a plurality of controls selected from the group consisting of: volume control, ringer control, network connectivity control, battery control, airplane mode control, display brightness control, and media playback controls.

14. A non-transitory computer-readable storage medium storing executable instructions that, when executed by a computer system with one or more processors and a display generation component, cause the computer system to perform operations including:
detecting presence of a wrist at a location that corresponds to a position within a view of a three-dimensional environment that is provided via the display generation component;
in response to detecting the presence of the wrist at the location that corresponds to the position within the view of the three-dimensional environment that is provided via the display generation component:
in accordance with a determination that first criteria are met by the presence of the wrist at the location that corresponds to the position in the view of the three-dimensional environment that is provided via the display generation component, wherein the first criteria require that an inner side of the wrist is facing toward a viewpoint corresponding to the view of the three-dimensional environment that is provided via the display generation component, displaying, via the display generation component, a first user interface object, including a plurality of representations corresponding to different applications, at a first position within the view of the three-dimensional environment that corresponds to a first location on the wrist;
while displaying the first user interface object at the first position within the view of the three-dimensional environment that corresponds to the first location on the wrist, detecting that the wrist has changed from satisfying the first criteria to satisfying second criteria, wherein the second criteria require that an outer side of the wrist is facing toward the viewpoint corresponding to the view of the three-dimensional environment that is provided via the display generation component;
in response to detecting that the wrist has changed from satisfying the first criteria to satisfying the second criteria, switching from displaying the first user interface object at the first position within the view of the three-dimensional environment that corresponds to the first location on the wrist to displaying, via the display generation component, a second user interface object, including a plurality of controls for controlling functions for the computer system, at a second position within the view of the three-dimensional environment that corresponds to a location on a back of a hand that is attached to the wrist, wherein the second user interface object is displayed while the wrist continues to satisfy the second criteria;
while displaying the second user interface object that includes the plurality of controls for controlling functions for the computer system, detecting a user input directed to a respective control of the plurality of controls; and
in response to detecting the user input, performing a function corresponding to the respective control.

15. The non-transitory computer readable storage medium of claim 14, wherein the one or more programs include instructions that when executed by the computer system cause the computer system to:
in response to detecting that the wrist has changed from satisfying the first criteria to satisfying the second criteria, display one or more notifications corresponding to one or more applications at a third position within the view of the three-dimensional environment that corresponds to a location on the back of the hand that is attached to the wrist.

16. The non-transitory computer readable storage medium of claim 14, wherein the one or more programs include instructions that when executed by the computer system cause the computer system to:

while displaying the plurality of controls for controlling functions for the computer system at the second position within the view of the three-dimensional environment that corresponds to the location on the back of the hand that is attached to the wrist, display one or more notifications corresponding to one or more applications at a fourth position within the view of the three-dimensional environment that corresponds to a location on a back side of the wrist.

17. The non-transitory computer readable storage medium of claim 14, wherein the one or more programs include instructions that when executed by the computer system cause the computer system to:

while displaying the plurality of representations corresponding to different applications at the first position within the view of the three-dimensional environment that corresponds to the first location on the wrist and while the inner side of the wrist is facing toward the viewpoint corresponding to the view of the three-dimensional environment, detect a swipe gesture on or proximate to the inner side of the wrist; and in response to detecting the swipe gesture on or proximate to the inner side of the wrist, scroll the plurality of representations corresponding to different applications in a direction that corresponds to a direction of the swipe gesture on or proximate to the inner side of the wrist.

18. The non-transitory computer readable storage medium of claim 14, wherein the one or more programs include instructions that when executed by the computer system cause the computer system to:

in response to detecting the presence of the wrist at the location that corresponds to the position within the view of the three-dimensional environment that is provided via the display generation component:

in accordance with a determination that second criteria are met when the presence of a palm that is connected to the inner side of the wrist is detected at a location that corresponds to a position within the view of the three-dimensional environment, display a view of a user interface of a first application at a fifth position within the view of the three-dimensional environment that corresponds to at least a portion of the palm connected to the inner side of the wrist.

19. The non-transitory computer readable storage medium of claim 18, wherein the second criteria require that the palm is facing toward the viewpoint corresponding to the view of the three-dimensional environment in order for the second criteria to be met.

20. The non-transitory computer readable storage medium of claim 18, wherein the second criteria require that a gaze input is directed to the palm that is connected to the inner side of the wrist in order for the second criteria to be met.

21. The non-transitory computer readable storage medium of claim 14, wherein the first user interface object includes an affordance that, when activated, causes display of a user interface for selecting at least one application for which a representation is to be added to the first user interface object.

22. The non-transitory computer readable storage medium of claim 14, wherein the one or more programs include instructions that when executed by the computer system cause the computer system to:

while displaying the first user interface object at the first position within the view of the three-dimensional environment that corresponds to the first location on the wrist, detect movement of the wrist; and in response to detecting the movement of the wrist:

in accordance with a determination that the first criteria continues to be met by the presence of the wrist at a location that corresponds to a position in the view of the three-dimensional environment that is provided via the display generation component, move the first user interface object, including the plurality of representations corresponding to different applications, within the view of the three-dimensional environment such that the first user interface object continues to be displayed at a position that corresponds to the first location on the wrist.

23. The non-transitory computer readable storage medium of claim 14, wherein the one or more programs include instructions that when executed by the computer system cause the computer system to:

while displaying the first user interface object at the first position within the view of the three-dimensional environment that corresponds to the first location on the wrist, detect a gesture on or proximate to the wrist at a location that corresponds to a respective position of the first user interface object in the view of the three-dimensional environment; and in response to detecting the gesture on or proximate to the wrist at the location that corresponds to the respective position of the first user interface object in the view of the three-dimensional environment:

in accordance with a determination that the gesture meets third criteria, display the plurality of representations corresponding to different applications at a sixth position in the view of the three-dimensional environment that is independent of the location of the wrist.

24. The non-transitory computer readable storage medium of claim 14, wherein the one or more programs include instructions that when executed by the computer system cause the computer system to:

while displaying the first user interface object at the first position within the view of the three-dimensional environment that corresponds to the first location on the wrist, and in accordance with a determination that a predetermined touch-sensitive device is present at the first location on the wrist, disable a touch-sensitive surface of the predetermined touch-sensitive device.

25. The non-transitory computer readable storage medium of claim 14, wherein the plurality of controls for controlling functions for the computer system are distinct from the plurality of representations corresponding to different applications.

26. The non-transitory computer readable storage medium of claim 14, wherein the plurality of controls include a plurality of controls selected from the group consisting of: volume control, ringer control, network connectivity control, battery control, airplane mode control, display brightness control, and media playback controls.

27. A computer system, comprising:
one or more processors;
a display generation component; and
memory storing one or more programs that are configured for execution by the one or more processors, the one or more programs including instructions for:
detecting presence of a wrist at a location that corresponds to a position within a view of a three-dimensional environment that is provided via the display generation component;

in response to detecting the presence of the wrist at the location that corresponds to the position within the view of the three-dimensional environment that is provided via the display generation component:
    in accordance with a determination that first criteria are met by the presence of the wrist at the location that corresponds to the position in the view of the three-dimensional environment that is provided via the display generation component, wherein the first criteria require that an inner side of the wrist is facing toward a viewpoint corresponding to the view of a three-dimensional environment that is provided via the display generation component, displaying, via the display generation component, a first user interface object, including a plurality of representations corresponding to different applications, at a first position within the view of the three-dimensional environment that corresponds to a first location on the wrist;
while displaying the first user interface object at the first position within the view of the three-dimensional environment that corresponds to the first location on the wrist, detecting that the wrist has changed from satisfying the first criteria to satisfying second criteria, wherein the second criteria require that an outer side of the wrist is facing toward the viewpoint corresponding to the view of a three-dimensional environment that is provided via the display generation component;
in response to detecting that the wrist has changed from satisfying the first criteria to satisfying the second criteria, switching from displaying the first user interface object at the first position within the view of the three-dimensional environment that corresponds to the first location on the wrist to displaying, via the display generation component, a second user interface object, including a plurality of controls for controlling functions for the computer system, at a second position within the view of the three-dimensional environment that corresponds to a location on a back of a hand that is attached to the wrist, wherein the second user interface object is displayed while the wrist continues to satisfy the second criteria;
    while displaying the second user interface object that includes the plurality of controls for controlling functions for the computer system, detecting a user input directed to a respective control of the plurality of controls; and
    in response to detecting the user input, performing a function corresponding to the respective control.

28. The computer system of claim 27, wherein the one or more programs include instructions for:
    in response to detecting that the wrist has changed from satisfying the first criteria to satisfying the second criteria, displaying one or more notifications corresponding to one or more applications at a third position within the view of the three-dimensional environment that corresponds to a location on the back of the hand that is attached to the wrist.

29. The computer system of claim 27, wherein the one or more programs include instructions for:
    while displaying the plurality of controls for controlling functions for the computer system at the second position within the view of the three-dimensional environment that corresponds to the location on the back of the hand that is attached to the wrist, displaying one or more notifications corresponding to one or more applications at a fourth position within the view of the three-dimensional environment that corresponds to a location on a back side of the wrist.

30. The computer system of claim 27, wherein the one or more programs include instructions for:
    while displaying the plurality of representations corresponding to different applications at the first position within the view of the three-dimensional environment that corresponds to the first location on the wrist and while the inner side of the wrist is facing toward the viewpoint corresponding to the view of the three-dimensional environment, detecting a swipe gesture on or proximate to the inner side of the wrist; and
    in response to detecting the swipe gesture on or proximate to the inner side of the wrist, scrolling the plurality of representations corresponding to different applications in a direction that corresponds to a direction of the swipe gesture on or proximate to the inner side of the wrist.

31. The computer system of claim 27, wherein the one or more programs include instructions for:
    in response to detecting the presence of the wrist at the location that corresponds to the position within the view of the three-dimensional environment that is provided via the display generation component:
        in accordance with a determination that second criteria are met when the presence of a palm that is connected to the inner side of the wrist is detected at a location that corresponds to a position within the view of the three-dimensional environment, displaying a view of a user interface of a first application at a fifth position within the view of the three-dimensional environment that corresponds to at least a portion of the palm connected to the inner side of the wrist.

32. The computer system of claim 31, wherein the second criteria require that the palm is facing toward the viewpoint corresponding to the view of the three-dimensional environment in order for the second criteria to be met.

33. The computer system of claim 31, wherein the second criteria require that a gaze input is directed to the palm that is connected to the inner side of the wrist in order for the second criteria to be met.

34. The computer system of claim 27, wherein the first user interface object includes an affordance that, when activated, causes display of a user interface for selecting at least one application for which a representation is to be added to the first user interface object.

35. The computer system of claim 27, wherein the one or more programs include instructions for:
    while displaying the first user interface object at the first position within the view of the three-dimensional environment that corresponds to the first location on the wrist, detecting movement of the wrist; and
    in response to detecting the movement of the wrist:
        in accordance with a determination that the first criteria continues to be met by the presence of the wrist at a location that corresponds to a position in the view of the three- dimensional environment that is provided via the display generation component, moving the first user interface object, including the plurality of representations corresponding to different applications, within the view of the three-dimensional environment such that the first user interface object continues to be displayed at a position that corresponds to the first location on the wrist.

36. The computer system of claim 27, wherein the one or more programs include instructions for:

while displaying the first user interface object at the first position within the view of the three-dimensional environment that corresponds to the first location on the wrist, detecting a gesture on or proximate to the wrist at a location that corresponds to a respective position of the first user interface object in the view of the three-dimensional environment; and in response to detecting the gesture on or proximate to the wrist at the location that corresponds to the respective position of the first user interface object in the view of the three- dimensional environment:

in accordance with a determination that the gesture meets third criteria, displaying the plurality of representations corresponding to different applications at a sixth position in the view of the three-dimensional environment that is independent of the location of the wrist.

37. The computer system of claim 27, wherein the one or more programs include instructions for:

while displaying the first user interface object at the first position within the view of the three-dimensional environment that corresponds to the first location on the wrist, and in accordance with a determination that a predetermined touch-sensitive device is present at the first location on the wrist, disabling a touch-sensitive surface of the predetermined touch- sensitive device.

38. The computer system of claim 27, wherein the plurality of controls for controlling functions for the computer system are distinct from the plurality of representations corresponding to different applications.

39. The computer system of claim 27, wherein the plurality of controls include a plurality of controls selected from the group consisting of: volume control, ringer control, network connectivity control, battery control, airplane mode control, display brightness control, and media playback controls.

* * * * *

UNITED STATES PATENT AND TRADEMARK OFFICE
CERTIFICATE OF CORRECTION

PATENT NO. : 11,875,013 B2  
APPLICATION NO. : 17/118487  
DATED : January 16, 2024  
INVENTOR(S) : Lemay et al.

Page 1 of 1

It is certified that error appears in the above-identified patent and that said Letters Patent is hereby corrected as shown below:

On the Title Page

Item (72) Inventors, please delete "Stephen O. Lemay, Palo Alto, CA (US); Gregg S. Suzuki, Daly City, CA (US); Matthew J. Sundstrom, Campbell, CA (US); Jonathan Ive, San Francisco, CA (US): Robert T. Tilton, Los Angeles, CA (US); Jeffrey M. Faulkner, San Francisco, CA (US); Jonathan R. Dascola, San Francisco, CA (US); William A. Sorrentino, III, Mill Valley, CA (US); Kristi E. S. Bauerly, Los Gatos, CA (US); Giancarlo Yerkes, San Carlos, CA (US); Peter D. Anton, San Francisco, CA (US)" and please insert -- Stephen O. Lemay, Palo Alto, CA (US); Gregg S. Suzuki, Daly City, CA (US); Matthew J. Sundstrom, Campbell, CA (US); Jonathan Ive, San Francisco, CA (US): Robert T. Tilton, Los Angeles, CA (US); Jeffrey M. Faulkner, San Francisco, CA (US); Jonathan R. Dascola, San Francisco, CA (US); William A. Sorrentino, III, Mill Valley, CA (US); Kristi E. S. Bauerly, Los Gatos, CA (US); Giancarlo Yerkes, San Carlos, CA (US); Peter D. Anton, San Francisco, CA (US); Alan C. Dye, San Francisco, CA (US) --.

Signed and Sealed this  
Second Day of September, 2025

Coke Morgan Stewart  
*Acting Director of the United States Patent and Trademark Office*